United States Patent
Lewis

(10) Patent No.: US 12,038,629 B1
(45) Date of Patent: *Jul. 16, 2024

(54) PERSONALIZED OPTICS

(71) Applicant: Percept Corporation, Austin, TX (US)

(72) Inventor: Scott W. Lewis, Las Vegas, NV (US)

(73) Assignee: Percept Technologies, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,444

(22) Filed: Aug. 29, 2022

Related U.S. Application Data

(63) Continuation of application No. 16/684,534, filed on Nov. 14, 2019, now Pat. No. 11,428,955, which is a
(Continued)

(51) Int. Cl.
| | | |
|---|---|---|
| *G02C 7/08* | (2006.01) | |
| *G02B 27/01* | (2006.01) | |
| *G02C 5/00* | (2006.01) | |
| *G02C 7/02* | (2006.01) | |
| *G02C 7/04* | (2006.01) | |

(Continued)

(52) U.S. Cl.
CPC ........... *G02C 7/083* (2013.01); *G02B 27/017* (2013.01); *G02C 5/008* (2013.01); *G02C 7/021* (2013.01); *G02C 7/027* (2013.01); *G02C 7/046* (2013.01); *G06F 3/013* (2013.01); *G02B 2027/0178* (2013.01); *G02B 2027/0183* (2013.01);
(Continued)

(58) Field of Classification Search
CPC ........ G02C 7/083; G02C 5/008; G02C 7/021; G02C 7/027; G02C 7/046; G02C 7/04; G02C 7/108; G02C 11/04; G02B 27/017; G02B 2027/0178; G02B 2027/0183; G06F 3/013
USPC .......................................... 463/36
See application file for complete search history.

(56) References Cited

U.S. PATENT DOCUMENTS

| | | | | |
|---|---|---|---|---|
| 11,428,955 | B1* | 8/2022 | Lewis | ..................... G02C 7/101 |
| 2012/0075168 | A1* | 3/2012 | Osterhout | ............... G06F 3/017 |
| | | | | 345/8 |

(Continued)

*Primary Examiner* — Mohammed A Hasan
(74) *Attorney, Agent, or Firm* — Steven Swernofsky

(57) ABSTRACT

Eyewear dynamically adjusts viewing effects to match the wearer, the object or scene being viewed (luminance, color prominence, glare, visual blur/noise), other conditions: sensory parameters (gaze direction, focal length, eye gestures, other eye activity, other senses, wearer inputs), medical conditions, wearer location, environmental parameters, wearer activity, use by the wearer, the wearer's field of view. The eyewear can adjust visual features presented to the wearer, such as changes in refraction, polarization/shading, color, prismatic angles/functions, 3D displays. Eyewear can be tailored to form factor: glasses, contacts, RID, IOL, facemask/helmet, vehicles, windows, screens, scopes, AR/VR devices, nerve sensors, external devices. Eyewear can adjust refraction, polarization/shading, color filtering/injection, false coloring, color change; prismatic angles/functions. Eyewear can respond to wearer activity: police, military, firefighter, emergency responder, search and rescue, vehicle operation, sporting/theme-park events, viewing advertising/storefronts, conversation. Hybrid optimization of eyewear can be personalized to users.

20 Claims, 16 Drawing Sheets

Related U.S. Application Data continuation-in-part of application No. 16/684,479, filed on Nov. 14, 2019, which is a continuation-in-part of application No. 16/264,553, filed on Jan. 31, 2019, now Pat. No. 11,033,227, which is a continuation-in-part of application No. 16/138,941, filed on Sep. 21, 2018, now abandoned, which is a continuation-in-part of application No. 15/942,951, filed on Apr. 2, 2018, now abandoned, which is a continuation-in-part of application No. 15/460,197, filed on Mar. 15, 2017, which is a continuation-in-part of application No. 13/841,550, filed on Mar. 15, 2013, now Pat. No. 11,428,937.

(51) Int. Cl.
*G06F 3/01* (2006.01)
*G02C 7/10* (2006.01)
*G02C 11/04* (2006.01)

(52) U.S. Cl.
CPC .............. *G02C 7/04* (2013.01); *G02C 7/108* (2013.01); *G02C 11/04* (2013.01)

(56) References Cited

U.S. PATENT DOCUMENTS

2015/0309316 A1\* 10/2015 Osterhout ........... G06F 3/03547
345/8
2016/0187654 A1\* 6/2016 Border ............... G02B 27/0172
359/630

\* cited by examiner

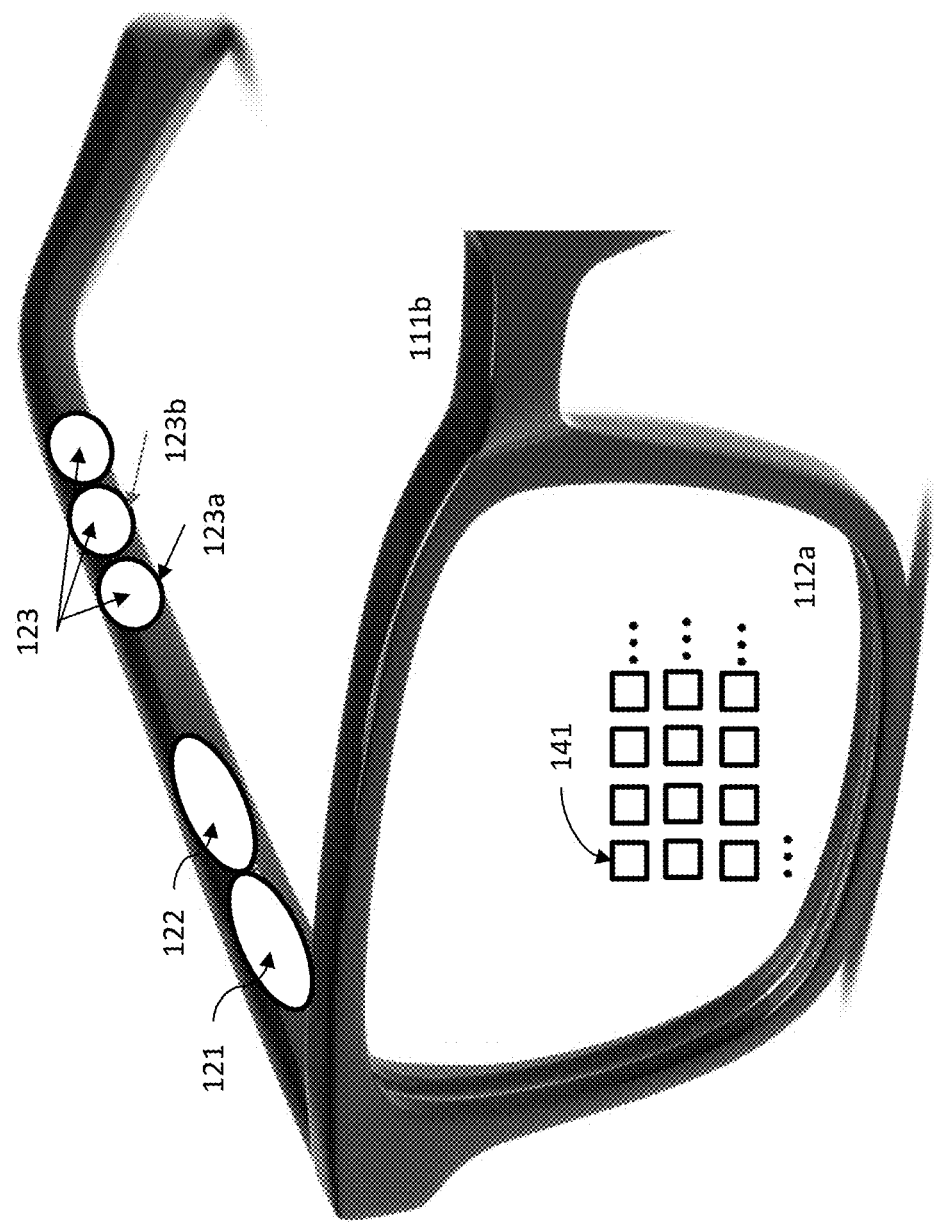
Figure 1A Eyewear 100

Eyewear 100

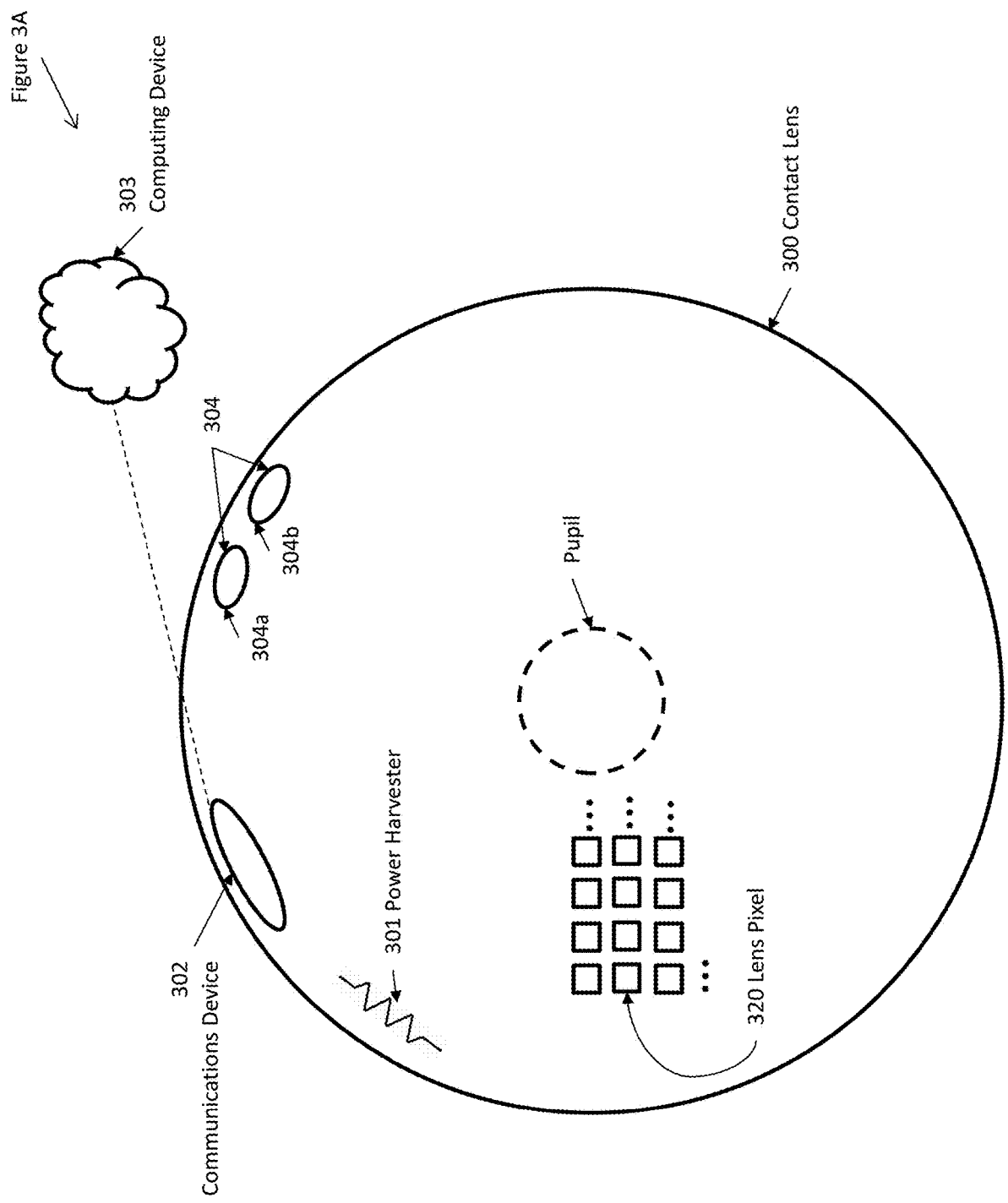

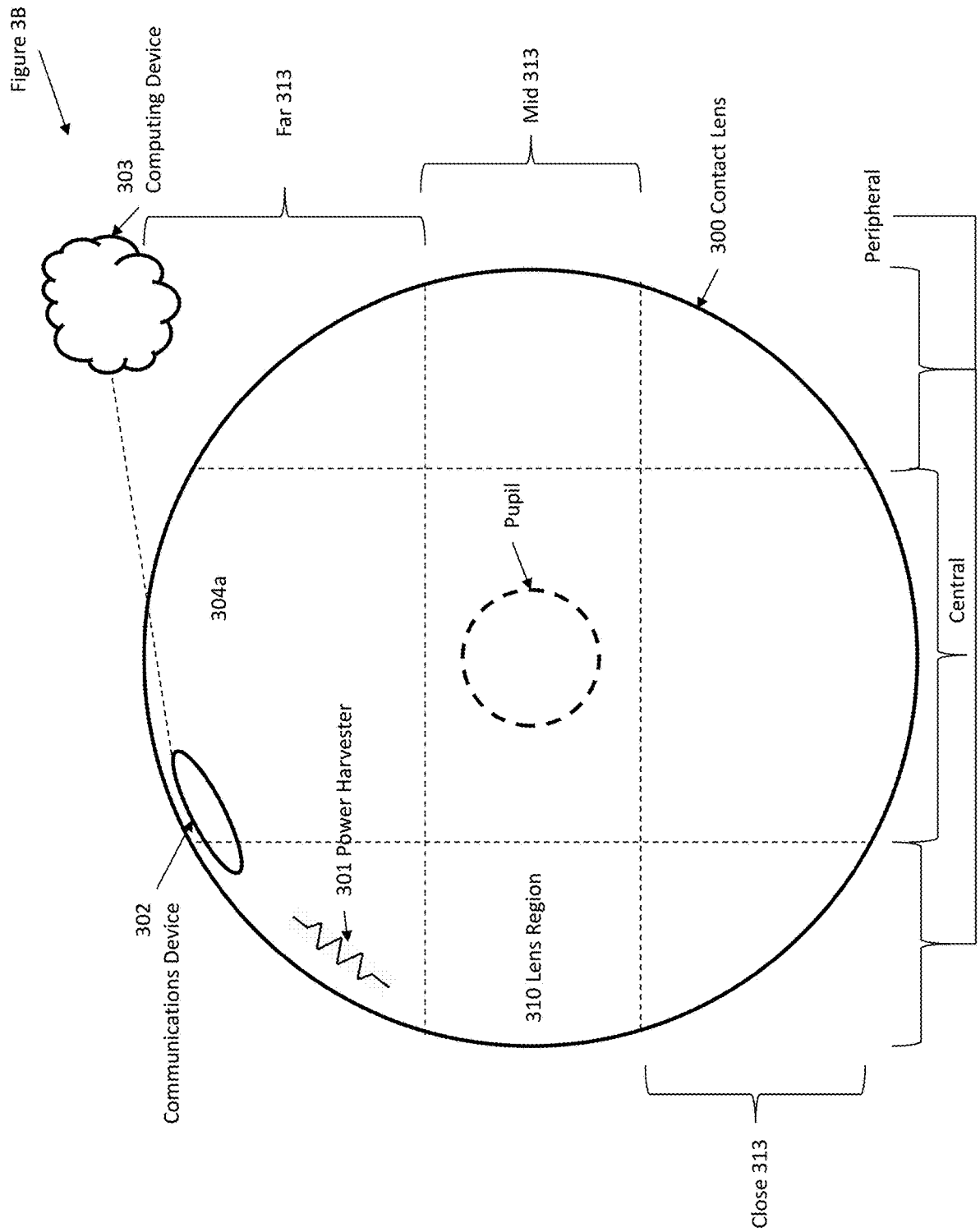

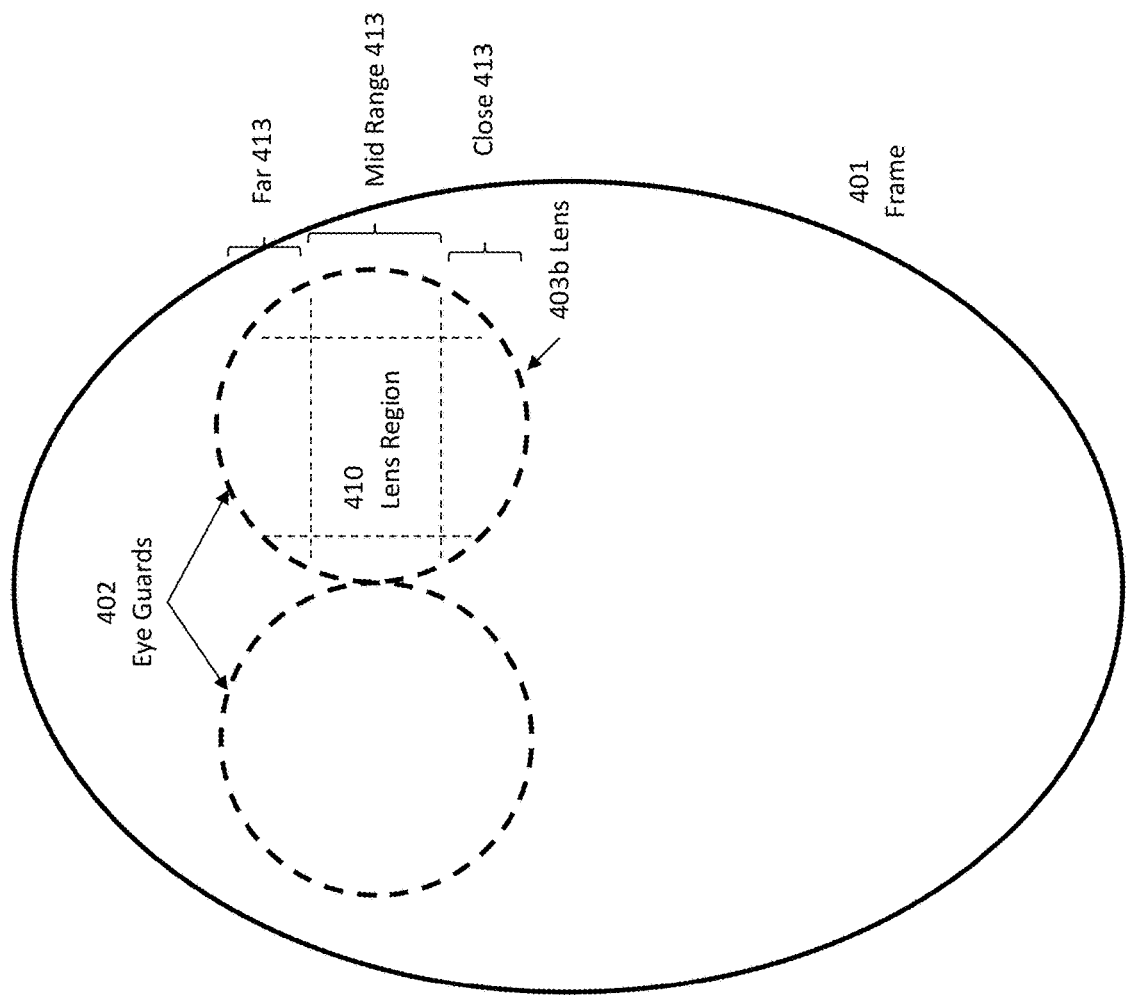

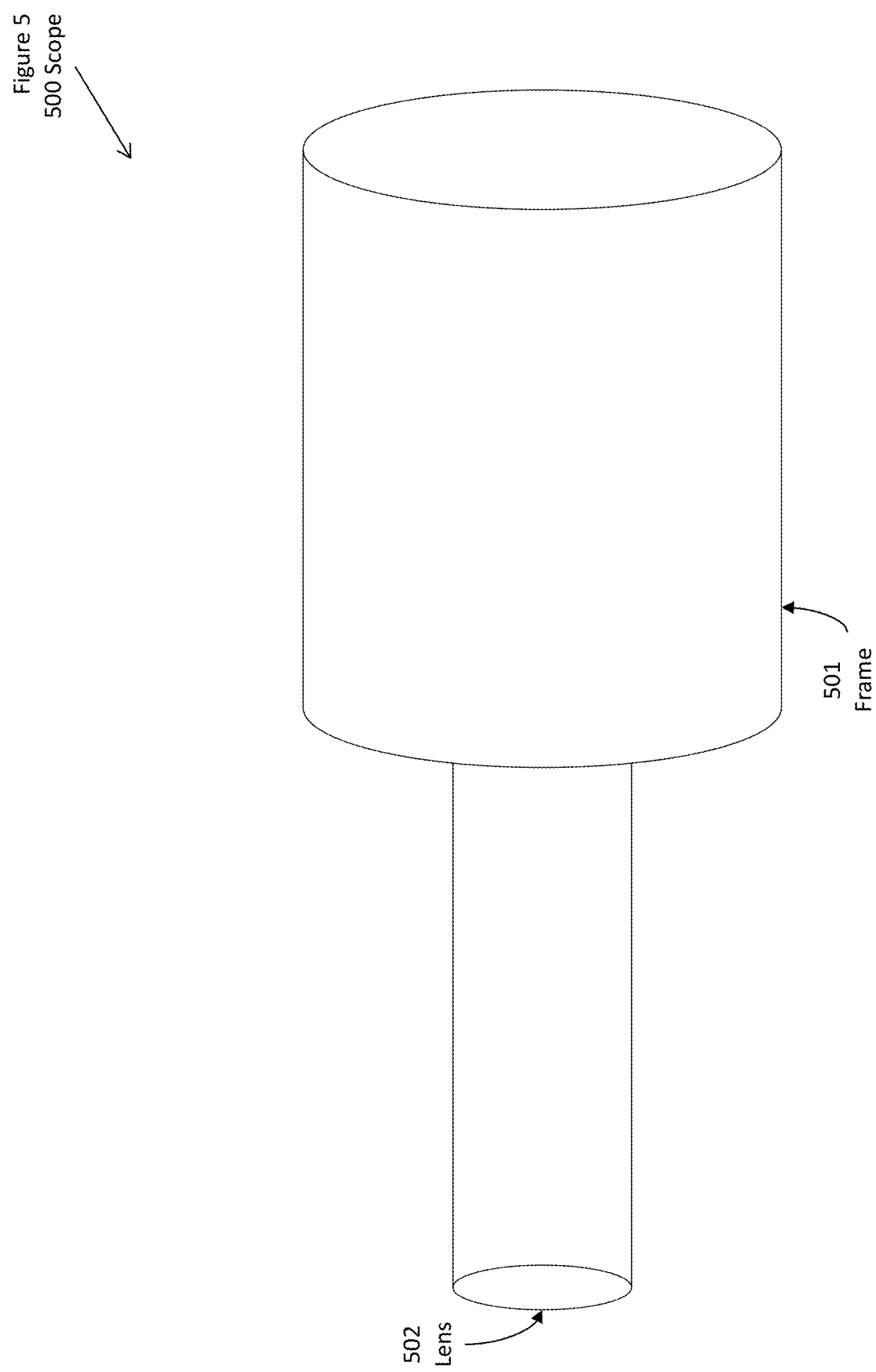

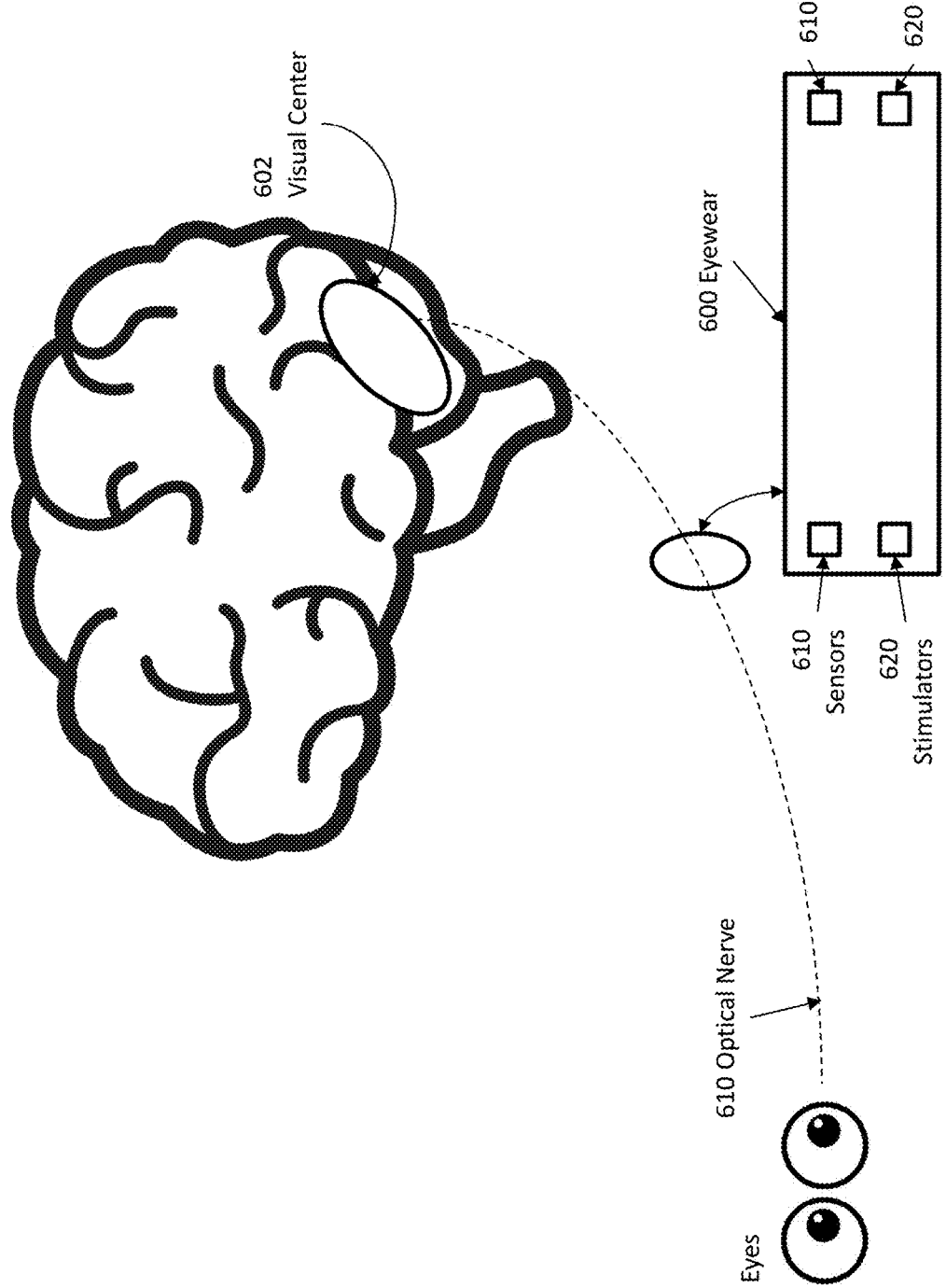

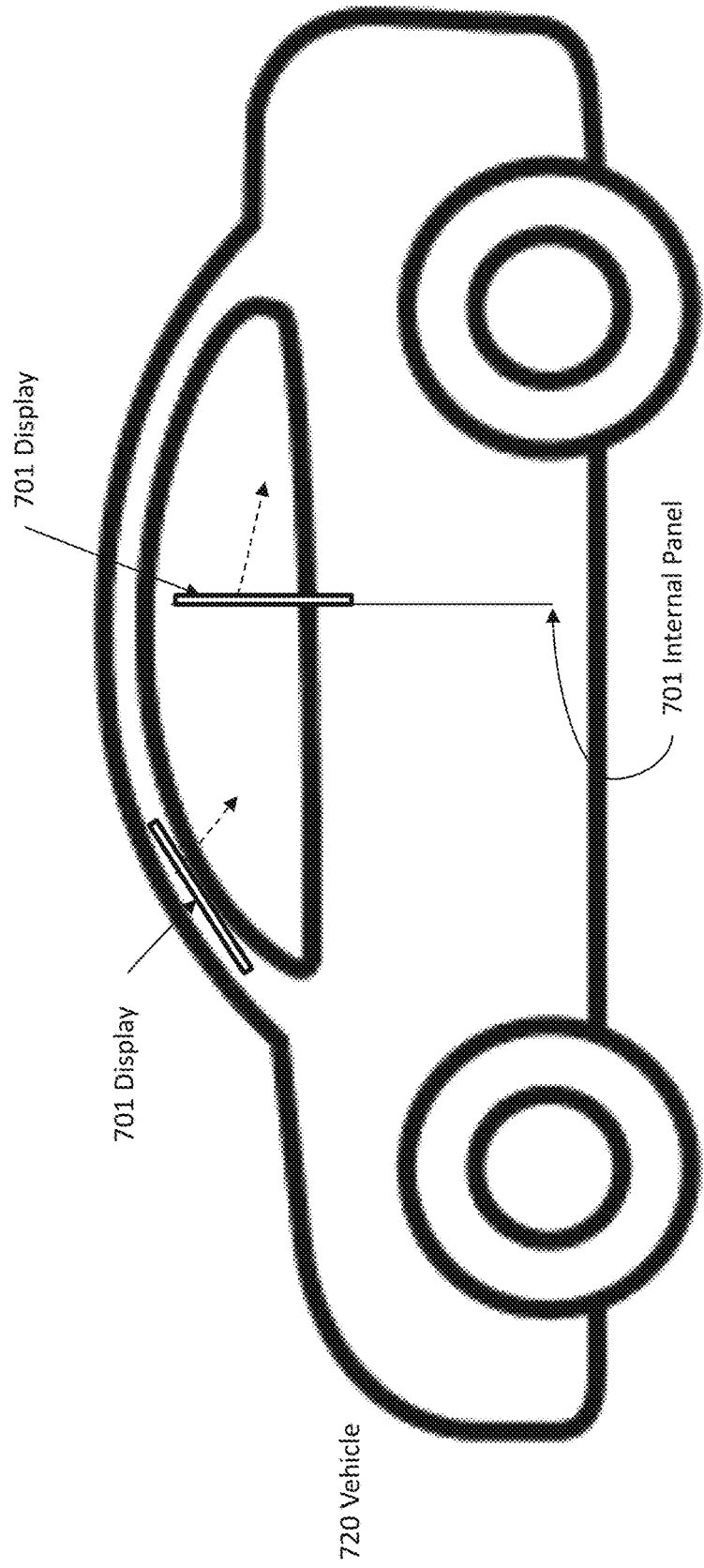

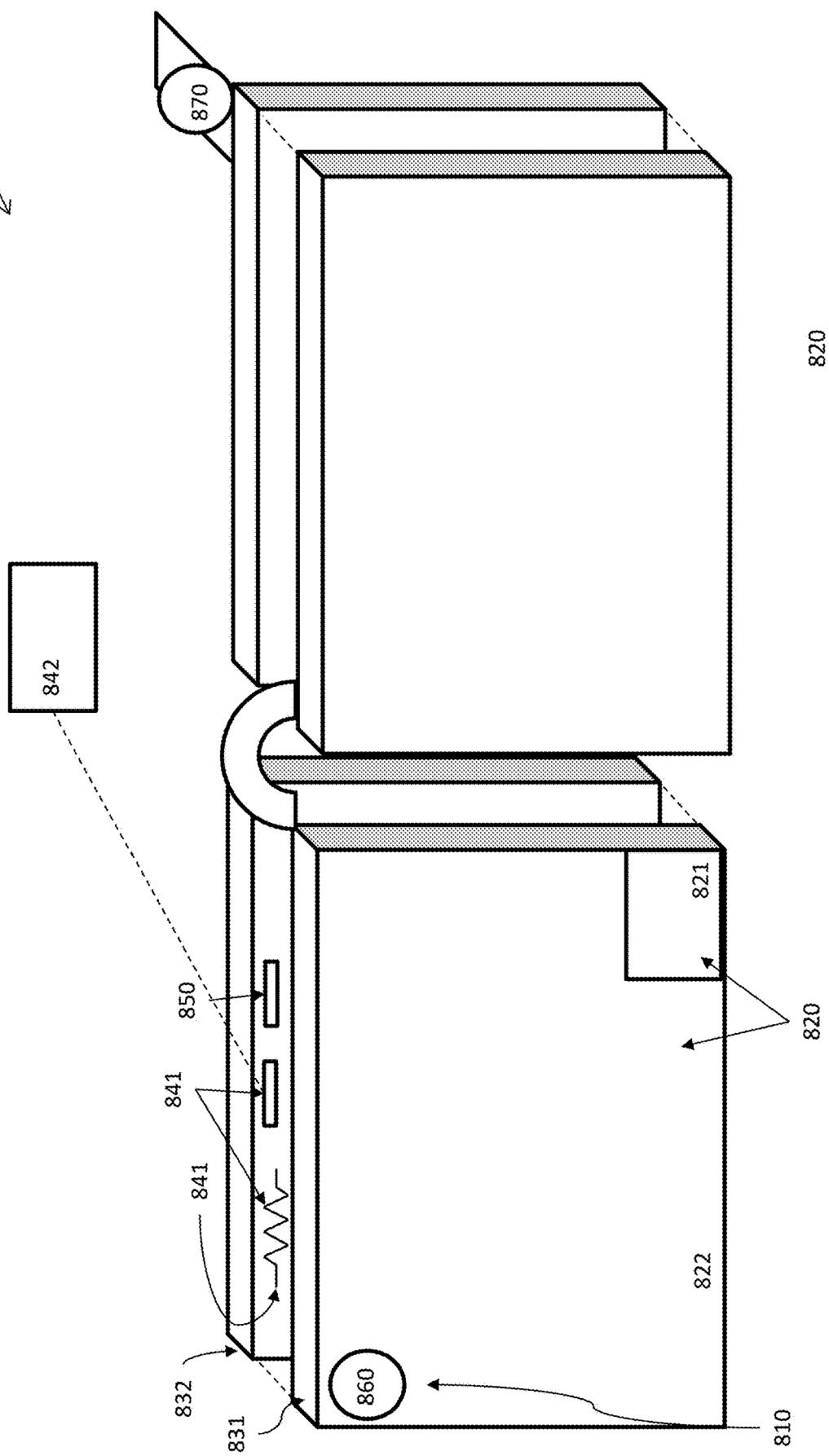

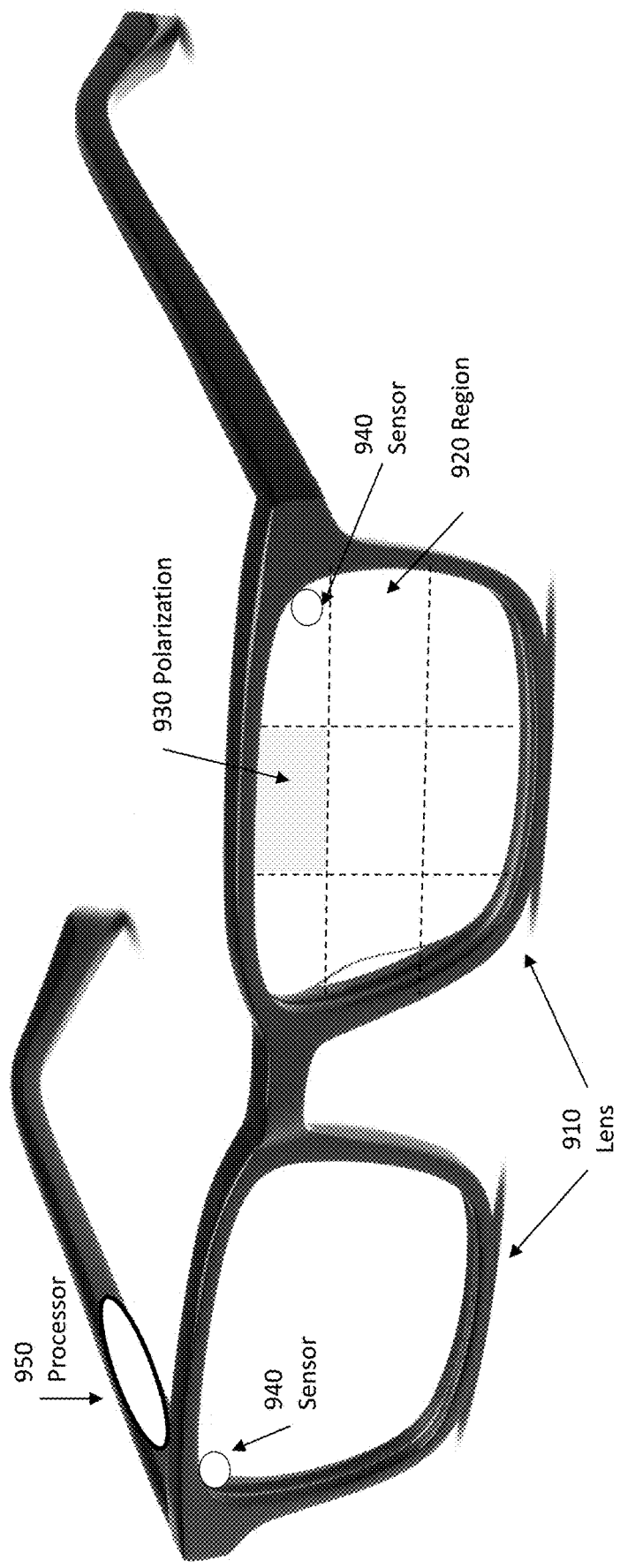

1000 Eyewear

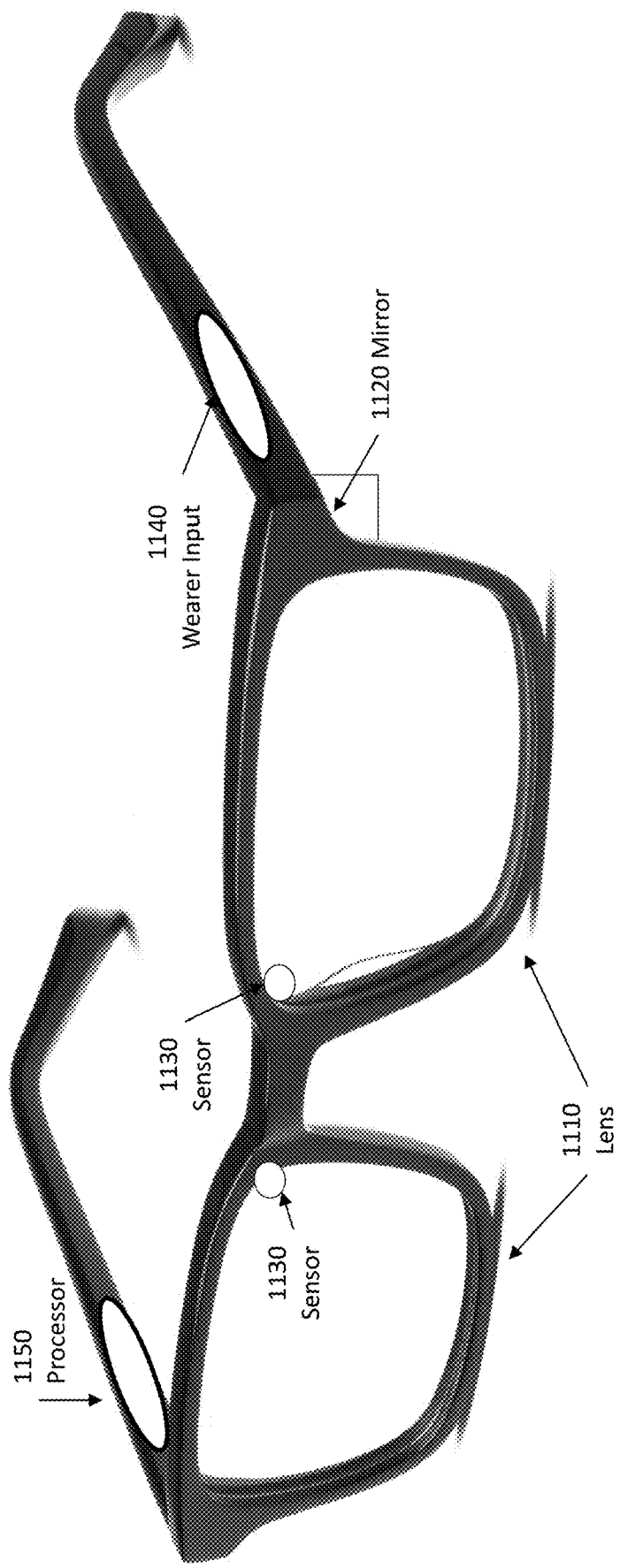

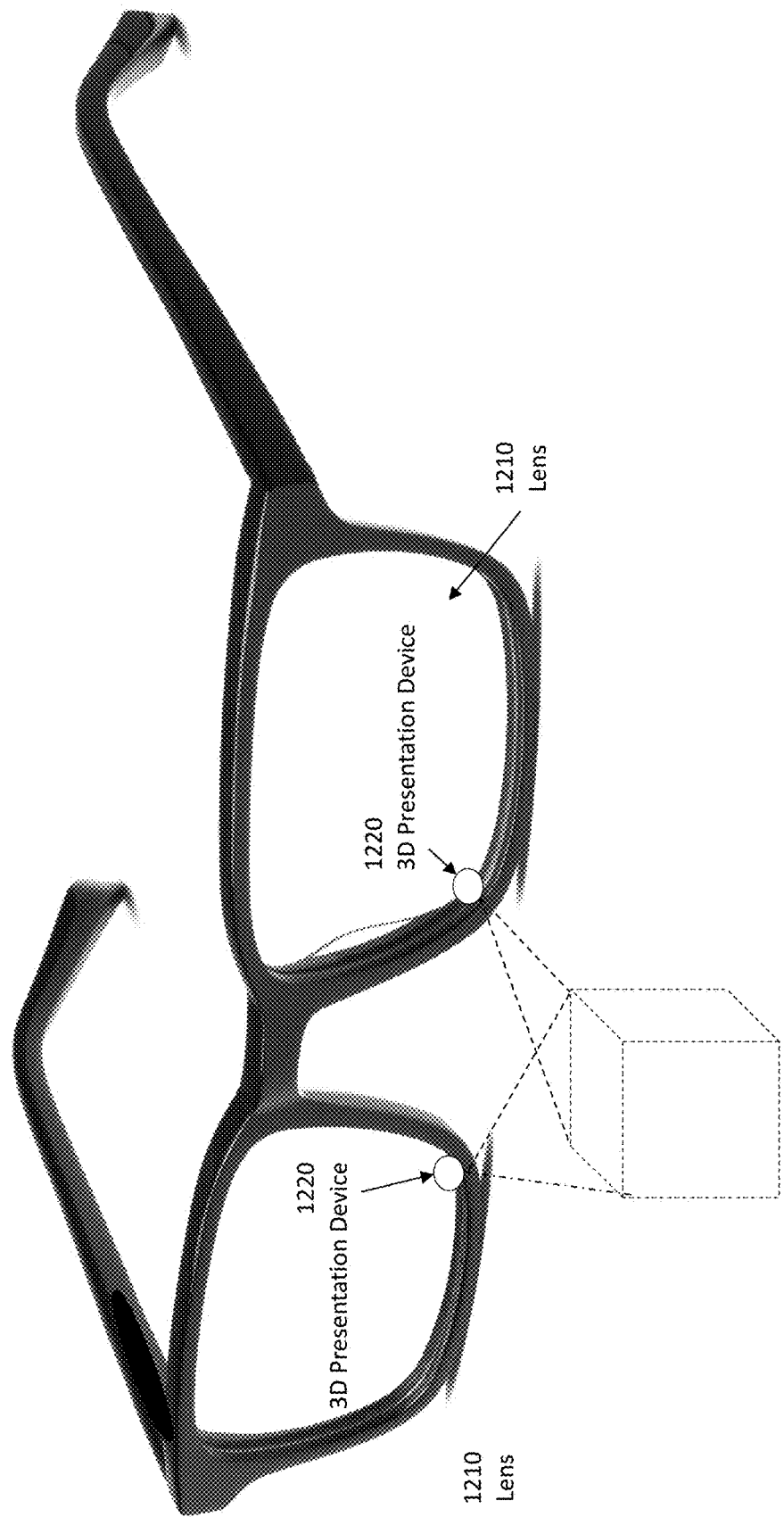

PERSONALIZED OPTICS

INCORPORATED DISCLOSURES

Priority Claim. This Application describes technologies that can be used with inventions, and other technologies, described in one or more of the following documents. This application claims priority, to the fullest extent permitted by law, of these documents.

This Application is a continuation of
  application Ser. No. 16/684,534, filed Nov. 14, 2019, naming inventor Scott LEWIS, titled "Dynamic visual optimization", currently pending;
which is a continuation-in-part of
Application Ser. No. 16/684,479, filed the same day, naming inventor Scott LEWIS, titled "Dynamic visual optimization", currently pending;
Application Ser. No. 16/264,553, filed Jan. 31, 2019, naming inventor Scott LEWIS, titled "Digital eyewear integrated with medical and other services", currently pending;
which is a continuation-in-part of
Application Ser. No. 16/138,941, filed Sep. 21, 2018, naming the same inventor, titled "Digital eyewear procedures related to dry eyes", currently pending;
which is a continuation-in-part of
Application Ser. No. 15/942,951, filed Apr. 2, 2018, naming the same inventor, titled "Digital Eyewear System and Method for the Treatment and Prevention of Migraines and Photophobia", currently pending;
which is a continuation-in-part of
Application Ser. No. 15/460,197, filed Mar. 15, 2017, naming the same inventor, titled "Digital Eyewear Augmenting Wearer's Interaction with their Environment", unpublished, currently pending.
Application Ser. No. 15/460,197, filed Mar. 15, 2017, is a continuation-in-part of
Application Ser. No. 13/841,550, filed Mar. 15, 2013, naming the same inventor, titled "Enhanced Optical and Perceptual Digital Eyewear", currently pending;
and is also a continuation-in-part of
Application Ser. No. 14/660,565, filed Mar. 17, 2015, naming the same inventor, and having the same title, currently pending.
Application Ser. No. 14/660,565, filed Mar. 17, 2015, is a continuation of
Application Ser. No. 14/589,817, filed Jan. 5, 2015, naming the same inventor, and having the same title, currently pending;
which is a continuation of
Application Ser. No. 14/288,189, filed May 27, 2014, naming the same inventor, and having the same title, currently pending;
which is a continuation of
Application Ser. No. 13/965,050, filed Aug. 12, 2013, naming the same inventor, and having the same title, currently pending;
which is a continuation of
Application Ser. No. 13/841,141, filed Mar. 15, 2013, naming the same inventor, and having the same title, now issued as U.S. Pat. No. 8,696,113 on Apr. 15, 2014.

Each of these documents is hereby incorporated by reference as if fully set forth herein. Techniques described in this Application can be elaborated with detail found therein. These documents are sometimes referred to herein as the "Incorporated Disclosures," or variants thereof.

COPYRIGHT NOTICE

A portion of the disclosure of this patent document contains material subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

This background is provided as a convenience to the reader and does not admit to any prior art or restrict the scope of the disclosure or the invention. This background is intended as an introduction to the general nature of technology to which the disclosure or the invention can be applied.

Field of the Disclosure

This Application generally relates to eyewear that dynamically changes to match the wearer and scene being viewed, and other issues.

Related Art

Corrective lenses must match the needs of the wearer; more particularly, those lenses must match the needs of the wearer when viewing a object at a particular distance, or when otherwise providing assistance to the wearer in viewing. However, standardized lenses do not match every wearer, and even lenses that are specific to a particular wearer do not match every viewing distance or provide proper assistance in all circumstances. Accordingly, some corrective lenses provide more than one amount of correction, depending on distance to an object being viewed by the wearer. These are sometimes called "bifocals" or "progressive" lenses; they provide different corrective eye prescriptions depending on the position of the object in the wearer's field of view.

One drawback with bifocals or progressive lenses is that they cannot easily be standardized, as each wearer might have a different amount of correction required at each different distance. However, having bifocals or progressive lenses made-to-order can be expensive, at least in comparison with lenses having a single prescription. Another drawback that can occur is that the distance to an object being viewed might fail to match its location in the wearer's field of view, such as when the object is in an unexpected position or when the object is moving toward or away from the wearer. This can cause inconvenience to the wearer by prompting them to move their head about in an effort to move the object into a position within their field of view that is properly corrected. If the object is moving quickly, it might occur that the wearer cannot do this well enough to anticipate the object's movement.

Another drawback that can occur, both with single-prescription lenses and with bifocals or progressive lenses, is that the wearer's features might change. The wearer's eye prescription can change with time. The effective prescription needed by the wearer can also change with respect to whether the wearer is squinting, or possibly other reasons. This can cause inconvenience to the wearer by failing to provide proper correction after time, or in circumstances that might not have been anticipated by the lens maker.

Each of these issues, as well as other possible considerations, might cause difficulty in aspects of using eyewear that is preferably matched to the wearer and scene being viewed.

SUMMARY OF THE DISCLOSURE

This summary of the disclosure is provided as a convenience to the reader, and does not limit or restrict the scope of the disclosure or the invention. This summary is intended as an introduction to more detailed description found in this Application, and as an overview of techniques explained in this application. The described techniques have applicability in other fields and beyond the embodiments specifically reviewed in detail.

This Application describes a system, and techniques for use, capable of providing eyewear that can dynamically adjust its effect on viewing to match a combination of the wearer, the object or scene being viewed, and possibly other conditions.

In one embodiment, the eyewear can be disposed to be responsive to one or more of:

sensory parameters, such as the wearer's gaze direction or focal length; eye gestures or multiple eye gestures by the wearer; other eye activity by the wearer, such as pupil or iris size, blink rate, squinting, eye twitching or nystagmus, saccades; or other senses such as hearing, smell, or touch (possibly including the wearer triggering a control on the eyewear, conducting a hand or other body gesture, or otherwise);

medical conditions, such as whether the wearer is subject to allergies, "dry eyes" and related conditions, migraines/photophobia or related conditions, sleep deprivation, epilepsy or other seizure concerns, being under the influence of alcohol or other substances, or otherwise;

wearer parameters, such as the wearer's eye activity, or changes thereof; the wearer's location or distance from a selected object, or changes thereof; or otherwise;

environmental parameters, features of the wearer's field of view, such as luminance, color prominence, glare, visual blur or noise, or otherwise; presence of particular objects or people in view, such as persons known to the wearer, or such as weapons (guns, knives, or otherwise); or features of the ambient environment, such as a relationship between the wearer and scene or object being viewed, such as whether the wearer is in motion with respect thereto, or otherwise.

In one embodiment, the eyewear can be disposed to be responsive to wearer activity, such as one or more of:

an activity being conducted by the wearer, such as whether the wearer is engaged in police, military, firefighter, emergency responder, search and rescue activity, or otherwise;

whether the wearer is engaged in operating a vehicle, such as a racing car, a speed boat, an aircraft, another type of vehicle, or otherwise; whether the wearer is engaged in observing a sporting activity or other event, such as a baseball or football game, a live-action or recorded concert, a movie or other presentation, a theme-park event or other interactive experience, an advertisement or store front, an augmented reality (AR) or virtual reality (VR) event or other three-dimensional (3D) experience, or otherwise;

whether the wearer is reading, conversing with another person, viewing a target at a distance, viewing a panorama, or otherwise; or other possible wearer activities.

In one embodiment, the type of eyewear can be disposed to be particular to a use being made by the wearer. For example, wearable eyewear can include one or more of:

glasses, contact lenses, a retinal image display (RID), an intra-ocular lens (IOL), or otherwise;

a helmet, such as might be disposed for use by police, military, firefighter, emergency responder, search and rescue activity, or other personnel;

augmented eyewear, such as a microscope or telescope, a rifle scope or other scope, binoculars, a still or motion-picture camera, "night vision" glasses or other infrared detectors, or otherwise;

nerve sensors or stimulators, such as optic nerve sensors or stimulators, optical cortex or other brain element sensors or stimulators, or otherwise;

whether the eyewear can be used in combination or conjunction with other devices, such as smartphones, smart watches, or other wearable or implantable devices; concert screens or other displays; AR presentations; cameras, scopes, and related devices; wireless or other electromagnetic signals; medical devices; or otherwise.

In one embodiment, the eyewear can be disposed to be responsive to a wearer's field of view (FOV), or a portion of the wearer's FOV, such as whether the wearer's FOV is long-range or short-range, higher or lower, right or left, central or peripheral vision, or otherwise.

In one embodiment, the eyewear can be disposed to adjust visual features presented to the wearer, such as using changes in refraction; changes in polarization or shading; changes in color filtering, color injection, false coloring, or otherwise; changes in prismatic angles or functions; changes in presentation of 3D displays; or otherwise.

In one embodiment, the eyewear can be disposed to present a 3D display on a selected background. For example, the selected background can include a screen, such as a smartphone screen or a screen with respect to another mobile device. For another example, the selected background can include a billboard, a movie theater screen, a theme-park display or other interactive display, an outdoor background, a region of the sky or other natural background, or another region of the wearer's field of view appropriate for a 3D display.

In one embodiment, the eyewear can be disposed to provide color change by the eyewear. For example, this can include a color change by the frame when the eyewear includes glasses, a facemask, helmet, or otherwise. For another example, this can include a color change by a portion of the eyewear, such as associated with the iris so as to not interfere with the wearer's vision, when the eyewear includes a contact lens, or otherwise. For another example, this can include a size change associated with the eyewear, such as associated with the pupil so as to not interfere with the wearer's vision, when the eyewear includes a contact lens, or otherwise. Thus, the color change can include a portion of a contact lens that covers the iris or sclera, but not the pupil. For another example, this can include a color change associated with the pupil or lens, so as to alter a color balance of the wearer's vision, when the eyewear includes a contact lens or implantable lens, or otherwise.

In one embodiment, the eyewear can be disposed to provide hybrid personalization of corrections or enhancement of the user's vision. For example, the hybrid personalization can include one or more alternative corrections or enhancements of the user's vision, in combination or conjunction with techniques for focusing the user's gaze through portions of the eyewear that provide those alternative corrections or enhancements in appropriate circumstances. For example, a region of the eyewear that provides close-range correction or enhancement of the user's vision can be combined with one or more techniques for directing the user's gaze through that portion of the eyewear when the user is focusing on one or more objects at that range.

BRIEF DESCRIPTION OF THE FIGURES

In the figures, like references generally indicate similar elements, although this is not strictly required.

FIG. 3 (collectively including Panel 3A and 3B) shows a conceptual drawing of example eyewear including contact lenses or intra-ocular lenses. Panel 3A shows a conceptual drawing of example contact lenses having multiple active regions related to wearer view. Panel 3B shows a conceptual drawing of example contact lenses having multiple individual pixels related to wearer view.

FIG. 5 shows a conceptual drawing of example eyewear including one or more scopes or sights, including binoculars, microscopes, rifle scopes, spotting scopes, telescopes, analog or digital cameras, rangefinders, or otherwise.

FIG. 6 shows a conceptual drawing of example eyewear including one or more nerve sensors or stimulators.

FIG. 8 shows a conceptual drawing of an example eyewear used to provide hybrid personalization.

FIG. 9 shows a conceptual drawing of an example eyewear used to provide dynamic adjustment of polarization.

FIG. 11 shows a conceptual drawing of an example eyewear used to provide dynamic adjustment with respect to reflection and partial reflection.

FIG. 12 shows a conceptual drawing of an example eyewear used to provide dynamic adjustment with respect to three-dimensional (3D) viewing of a display.

Figure 1B:
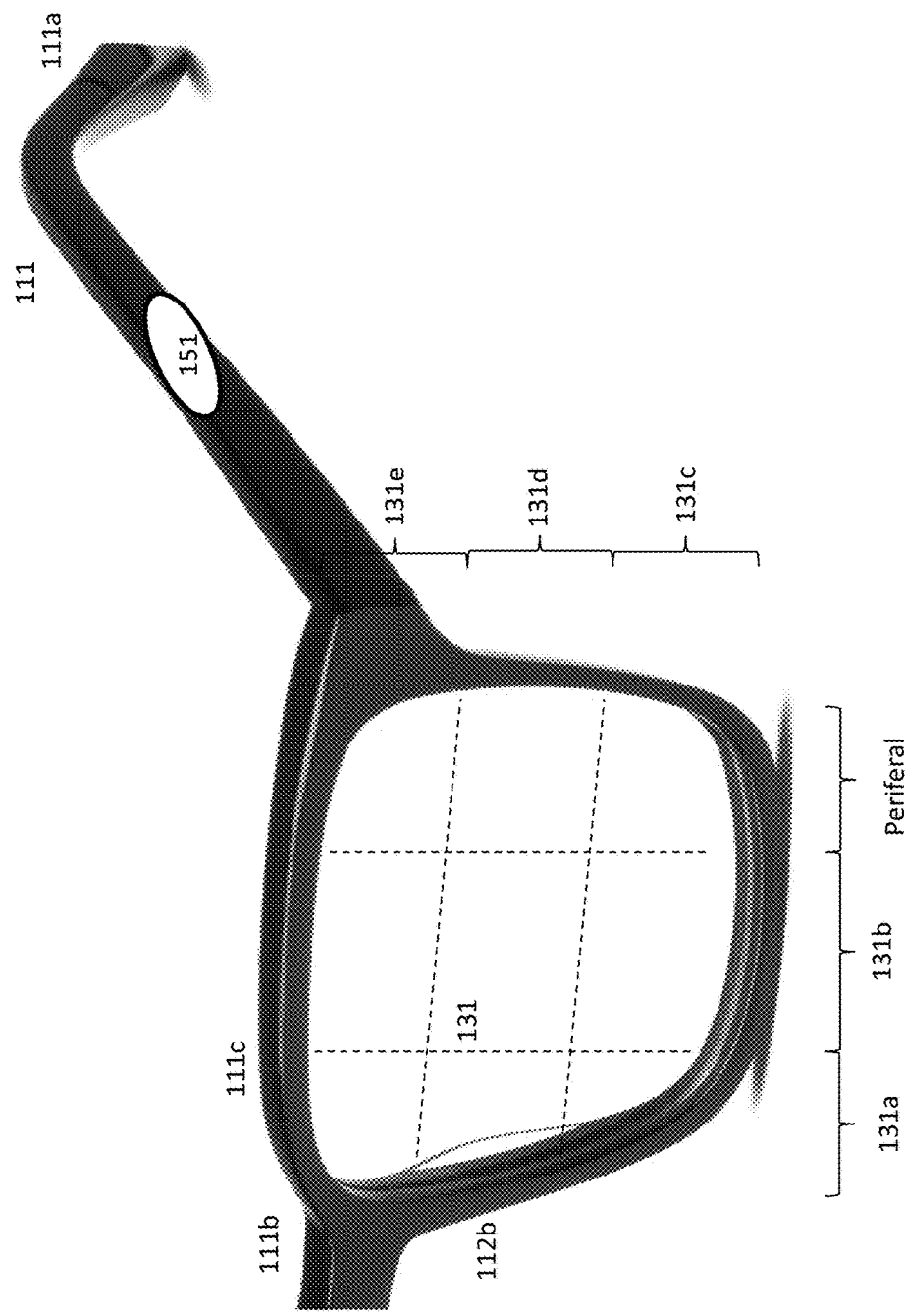
FIG. 1 (collectively including Panel 1A and 1B) shows a conceptual drawing of example eyewear including glasses, such as providing active correction or enhancement. Panel 1A shows a conceptual drawing of example glasses having multiple active regions related to wearer view. Panel 1B shows a conceptual drawing of example glasses having multiple active pixels related to individual wearer view.

After reading this Application, those skilled in the art would recognize that the figures are not necessarily drawn to scale for construction, nor do they necessarily specify any particular location or order of construction.

DETAILED DESCRIPTION

General Discussion

In one embodiment, the eyewear can be responsive to one or more of: sensory parameters, wearer parameters, environmental parameters, or otherwise. For example, sensory parameters can include the wearer's gaze direction or focal length; eye gestures or multiple eye gestures by the wearer; other eye activity by the wearer, such as pupil or iris size, blink rate, squinting, eye twitching or nystagmus, saccades; or other senses such as hearing, smell, or touch (possibly including the wearer triggering a control on the eyewear, conducting a hand or other body gesture, or otherwise). Wearer parameters can include medical conditions, such as whether the wearer is subject to allergies, "dry eyes" and related conditions, migraines/photophobia or related conditions, sleep deprivation, epilepsy or other seizure concerns, being under the influence of alcohol or other substances, or otherwise; the wearer's eye activity, or changes thereof; the wearer's location or distance from a selected object, or changes thereof; or otherwise. Environmental parameters can include features of the wearer's field of view, such as luminance, color prominence, glare, visual blur or noise, or otherwise; presence of particular objects or people in view, such as persons known to the wearer, or such as weapons (guns, knives, or otherwise); or features of the ambient environment, such as a relationship between the wearer and scene or object being viewed, such as whether the wearer is in motion with respect thereto, or otherwise.

In one embodiment, the eyewear can be responsive to wearer activity. Wearer activity can include one or more of: an activity being conducted by the wearer, such as whether the wearer is engaged in police, military, firefighter, emergency responder, search and rescue activity, or otherwise; whether the wearer is engaged in operating a vehicle, such as a racing car, a speed boat, an aircraft, another type of vehicle, or otherwise; whether the wearer is engaged in observing a sporting activity or other event, such as a baseball or football game, a live-action or recorded concert, a movie or other presentation, a theme-park event or other interactive experience, or otherwise, an advertisement or store front, an augmented reality (AR) or virtual reality (VR) event or other three-dimensional (3D) experience, or otherwise; whether the wearer is reading, conversing with another person, viewing a target at a distance, viewing a panorama, or otherwise; or other possible wearer activities.

In one embodiment, the type of eyewear can be particular to a use being made by the wearer. For example, wearable eyewear can include glasses, contact lenses, a retinal image display (RID), an intra-ocular lens (IOL), or otherwise. For another example, wearable eyewear can include a helmet, such as might be disposed for use by police, military, firefighter, emergency responder, search and rescue activity, or other personnel. For another example, eyewear can include augmented eyewear, such as a microscope or telescope, a rifle scope or other scope, binoculars, a still or motion-picture camera, "night vision" glasses or other infrared detectors, or otherwise. For another example, eyewear can include nerve sensors or stimulators, such as optic nerve sensors or stimulators, optical cortex or other brain element sensors or stimulators, or otherwise. For another example, the eyewear can be used in combination or conjunction with other devices, such as smartphones, smart watches, or other wearable or implantable devices; concert screens or other displays; AR presentations; cameras, scopes, and related devices; wireless or other electromagnetic signals; medical devices; or otherwise.

In one embodiment, the eyewear can be responsive to a wearer's field of view (FOV), or a portion of the wearer's FOV, such as whether the wearer's FOV is long-range or short-range, higher or lower, right or left, central or peripheral vision, or otherwise.

In one embodiment, the eyewear can adjust visual features presented to the wearer, such as using changes in refraction; changes in polarization or shading; changes in color filtering, color injection, false coloring, color change by the eyewear, or otherwise; changes in prismatic angles or functions; changes in presentation of 3D displays; or otherwise.

In one embodiment, the eyewear can include multiple lenses to provide hybrid personalization. A first lens can provide a first adjustment of visual features presented to the wearer, such as correction or enhancement of the wearer's vision, while a second lens can provide a second adjustment of visual features presented to the wearer, possibly electronically induced, such as changes in refraction, changes in shading/inverse-shading, chromatic alteration (or other changes in color, color balance, color gamut, or false coloring, or otherwise), changes in polarization, changes in prismatic angles or functions; changes in presentation of 3D displays; or otherwise.

In one embodiment, the eyewear can include an electrically controlled polarizer disposed to alter an angle of polarization in real time. For example, the polarizer can be adjusted in real time in response to changes in a relative angle between the wearer's eye and a direction of infalling glare. When light is reflected from a surface, it can become polarized in a plane. This can have the effect that a planar polarizer can be adjusted so as to reduce or eliminate the amount of light allowed through the polarizer to the wearer's eye. In such cases, the electrically controlled polarizer can alter the plane of personalization in response to a sensor for determining an angle at which the glare is viewed. The sensor can include a gyroscope or a magnetometer, or another device suitable to determine a relative orientation of the eyewear with respect to the infalling glare. Alternatively, the sensor can be disposed inside the eyewear and include a light sensor, an infrared (IR) sensor, a camera, or another device suitable to determine an amount of infalling glare.

In one embodiment, the eyewear can include an electrically controlled magnifier disposed to alter an amount of magnification, such as in real time. For example, the magnifier can be adjusted, such as in real time, in response to eye gaze direction by the wearer's eye, in response to eye gestures or other inputs by the wearer, or in response to object recognition by the eyewear. When the wearer looks at a particular object, their gaze direction and focal length can be determined and can identify a particular object. The eyewear can also identify the object using object recognition. Alternatively, when the wearer provides an eye gesture or other input, the wearer can designate a particular object and direct the eyewear to identify that object. In such cases, the eyewear can determine, such as in response to the wearer's input, an amount of magnification desired by the wearer and can adjust an amount of magnification of that object provided by the eyewear.

In one embodiment, the eyewear can provide dynamic adjustment with respect to three-dimensional (3D) viewing of a display. For example, the display can include a smartphone or mobile device display, a phablet or tablet display, a computer display, a wearable or implantable device display, a gaming device display, a video display, or otherwise. In such cases, the eyewear can determine when the wearer is looking at, or otherwise directing their gaze toward, the display, and can determine whether the display is disposed to provide a 3D presentation. When the display is disposed to provide a 3D presentation and the wearer alters their gaze from/to the display, the eyewear can turn on/off a 3D presentation in response thereto. For example, when the eyewear is disposed to provide a 3D presentation at the display and the wearer moves their gaze from the display, the eyewear can turn off its 3D presentation and allow the wearer to see their normal field of view (FOV) without any 3D adjustment. When the wearer moves their gaze to the display, the eyewear can turn on its 3D presentation and allow the wearer to see the display using 3D viewing.

In one embodiment, the eyewear can be disposed to provide color change by the eyewear. For example, this can include a color change by the frame when the eyewear includes glasses, a facemask, helmet, or otherwise. For another example, this can include a color change by a portion of the eyewear, such as associated with the iris so as to not interfere with the wearer's vision, when the eyewear includes a contact lens, or otherwise. For another example, this can include a size change associated with the eyewear, such as associated with the pupil so as to not interfere with the wearer's vision, when the eyewear includes a contact lens, or otherwise. Thus, the color change can include a portion of a contact lens that covers the iris or sclera, but not the pupil. For another example, this can include a color change associated with the pupil or lens, so as to alter a color balance of the wearer's vision, when the eyewear includes a contact lens or implantable lens, or otherwise.

In one embodiment, the eyewear can combine two or more such functions, such as in response to an input from the wearer designating that those functions should be combined, or such as in response to the eyewear recognizing a circumstance in which the wearer typically requests that those functions should be combined. For example, the wearer can designate that those functions should be combined using an eye gesture or other input. For another example, the eyewear can recognize a circumstance in which the wearer typically requests that those functions should be combined in response to a machine learning technique, such as a statistical response to sensory parameters, wearer parameters, environmental parameters, or otherwise. In such cases, the sensory parameters or wearer parameters can include information with respect to the wearer's medical or other status; the environmental parameters or can include information with respect to the scene in the wearer's field of view (FOV). The eyewear can also be responsive to other information, or to a combination of factors, such as the eyewear being more/less sensitive to selected parameters (or to particular wearer inputs) when sensory parameters or wearer parameters indicate particular medical or other status, or otherwise.

Terms and Phrases

The following terms and phrases are exemplary only, and not limiting.

The phrases "this application", "this description", and variants thereof, generally refer to any material shown or suggested by any portions of this Application, individually or collectively, and including all inferences that might be drawn by anyone skilled in the art after reviewing this Application, even if that material would not have been apparent without reviewing this Application at the time it was filed.

The term "eyewear", and variants thereof, generally refers to any device coupled to a wearer's (or other user's) input senses, including without limitation: glasses (such as those including lens frames and lenses), contact lenses (such as so-called "hard" and "soft" contact lenses applied to the surface of the eye, as well as lenses implanted in the eye), retinal image displays (RID), laser and other external lighting images, "heads-up" displays (HUD), holographic displays, electrooptical stimulation, artificial vision induced using other senses, transfer of brain signals or other neural signals, headphones and other auditory stimulation, bone conductive stimulation, wearable and implantable devices, and other devices disposed to influence (or be influenced by) the wearer. For example, the digital eyewear can be wearable by the user, either directly as eyeglasses or as part of one or more clothing items, or implantable in the user, either above or below the skin, in or on the eyes (such as contact lenses), or otherwise. The digital eyewear can include one or more devices operating in concert, or otherwise operating with other devices that are themselves not part of the digital eyewear.

The phrase "real time", and variants thereof, generally refer to timing, particularly with respect to sensory input or adjustment thereto, operating substantially in synchrony with real world activity, such as when a user is performing an action with respect to real world sensory input. For example, "real time" operation of digital eyewear with respect to sensory input generally includes user receipt of sensory input and activity substantially promptly in response to that sensory input, rather than user receipt of sensory input in preparation for later activity with respect to other sensory input.

The phrases "sensory input", "external sensory input", and variants thereof, generally refer to any input detectable by a human or animal user. For example, sensory inputs include audio stimuli such as in response to sound; haptic stimuli such as in response to touch, vibration, or electricity; visual stimuli such as in response to light of any detectable frequency; nasal or oral stimuli such as in response to aroma, odor, scent, taste, or otherwise; other stimuli such as balance; or otherwise.

The phrases "shading", "shading/inverse-shading", "inverse-shading", and variants thereof, generally refer to any technique for altering a sensory input, including but not limited to:
 altering a total luminance associated with an image, such as by reducing luminance at substantially each pixel in the image;
 altering a luminance associated with a portion of an image, such as by reducing luminance at a selected set of pixels in the image;
 altering a luminance associated with a portion of an image, such as by increasing luminance at a selected portion of the image, to brighten that portion of the image, to highlight a border around or near that portion of the image, to improve visibility of that portion of the image, or otherwise;
 altering a loudness associated with an auditory signal, such as by reducing loudness at substantially each portion of the auditory signal;
 altering a loudness associated with a portion of an auditory signal, such as by reducing loudness at a selected set of times or frequencies in that auditory signal;
 altering a loudness associated with a portion of an auditory signal, such as by increasing loudness at a selected set of times or frequencies in that auditory signal, to improve listening to that portion of the image, or otherwise;
 altering a selected set of frequencies associated with an image, such as to change a first color into a second color, for the entire image, for a portion of the image, or otherwise;
 altering a selected set of frequencies associated with an image, such as to provide a "false color" image of a signal not originally viewable by the human eye, such as to provide a visible image in response to an IR (infrared) or UV (ultraviolet) or other information ordinarily not available to human senses;
 altering a sensory input other than visual or auditory sensory inputs, such as reducing/increasing an intensity of a haptic input, of an odor, or of another sense.

The phrases "signal input", "external signal input", and variants thereof, generally refer to any input detectable by digital eyewear or other devices. For example, in addition to or in lieu of sensory inputs and external sensory inputs, signal inputs can include—
 information available to digital eyewear in response to electromagnetic signals other than human senses, such as signals disposed in a telephone protocol, a messaging protocol such as SMS or MMS or a variant thereof, an electromagnetic signal such as NFC or RFID or a variant thereof, an internet protocol such as TCP/IP or a variant thereof, or similar elements;
 information available to digital eyewear in response to an accelerometer, a gyroscope, a GPS signal receiver, a location device, an ultrasonic device, or similar elements;
 information available to digital eyewear in response to a magnetometer, a medical imaging device, an MRI device, a tomography device, or similar elements;
 or otherwise.

The phrase "mobile device", and variants thereof, generally refers to any relatively portable device disposed to receive inputs from and provide outputs to, one or more users. For example, a mobile device can include a smartphone, an MP3 player, a laptop or notebook computer, a computing tablet or phablet, or any other relatively portable device disposed to be capable as further described herein. The mobile device can include input elements such as a capacitive touchscreen; a keyboard; an audio input; an accelerometer or haptic input device; an input coupleable to an electromagnetic signal, to an SMS or MMS signal or a variant thereof, to an NFC or RFID signal or a variant thereof, to a signal disposed using TCP/IP or another internet protocol or a variant thereof, to a signal using a telephone protocol or a variant thereof; another type of input device; or otherwise.

The term "random", and variants thereof, generally refers to any process or technique having a substantially nonpredictable result, and includes pseudorandom processes and functions.

The phrase "remote device", and variants thereof, generally refers to any device disposed to be accessed, and not already integrated into the accessing device, such as disposed to be accessed by digital eyewear. For example, a remote device can include a database or a server, or another device or otherwise, coupled to a communication network, accessible using a communication protocol. For another example, a remote device can include one or more mobile devices other than a user's digital eyewear, accessible using a telephone protocol, a messaging protocol such as SMS or MMS or a variant thereof, an electromagnetic signal such as NFC or RFID or a variant thereof, an internet protocol such as TCP/IP or a variant thereof, or otherwise.

The phrase "user input", and variants thereof, generally refers to information received from the user, such as in response to audio/video conditions, requests by other persons, requests by the digital eyewear, or otherwise. For example, user input can be received by the digital eyewear in response to an input device (whether real or virtual), a gesture (whether by the users' eyes, hands, or otherwise), using a smartphone or controlling device, or otherwise.

The phrase "user parameters", and variants thereof, generally refers to information with respect to the user as determined by digital eyewear, user input, or other examination about the user. For example, user parameters can include measures of whether the user is able to distinguish objects from audio/video background signals, whether the user is currently undergoing an overload of audio/video signals (such as from excessive luminance or sound), a measure of confidence or probability thereof, a measure of severity or duration thereof, other information with respect to such events, or otherwise.

After reviewing this Application, those skilled in the art would recognize that these terms and phrases should be interpreted in light of their context in the specification.

Figures and Text

FIG. 1—Active Correction or Enhancement

FIG. 1 (collectively including Panel 1A and 1B) shows a conceptual drawing of example eyewear including glasses. Panel 1A shows a conceptual drawing of example glasses having multiple active regions related to wearer view. Panel 1B shows a conceptual drawing of example glasses having multiple active pixels related to individual wearer view.

Active Correction or Enhancement—Regions

Panel 1A shows a conceptual drawing of example glasses having multiple active regions related to wearer view.

In one embodiment, an example eyewear 100 can include glasses 110 disposed for use by the wearer (not shown), including elements shown in the figure, such as one or more of:

- a frame 111, such as possibly including earpieces 111a, a nosepiece 111b, or lens holders 111c;
- at least one lens 112, such as possibly a right lens 112a (shown in Panel 1A), or a left lens 112b (shown in Panel 1B).

In one embodiment, the frame 111 can enclose, or hold, one or more electronic elements shown in the figure, such as one or more of:

- a computing device 121, such as possibly including a processor, memory or mass storage, a power supply, a clock circuit, or other elements used with computing devices;
- a communication device 122, such as possibly including a wireless or wired communicate element, a communication protocol stack, or other elements used with communication devices;
- one or more sensors 123, such as possibly including one or more of: wearer sensors 123a disposed to receive information about the wearer (or their current condition), ambient sensors 123b disposed to receive information about an environment near the wearer (or its current condition), or other sensors.

For example, the sensors 123 can include one or more visually evoked potential (VEP) elements disposed to measure a potential of the wearer's visual region of the brain. The VEP elements can be disposed using a set of electrodes disposed on the wearer's scalp, or on a headset or headband, on the wearer's forehead, on the back of the wearer's neck, or otherwise. The sensors 123 can also include elements disposed to measure an electroencephalogram (EEG), an amount of skin moisture, a skin temperature, a galvanic skin response, other elements disposed to measure the wearer's emotional state, or otherwise.

For another example, the sensors 123 can include one or more devices disposed to perform electroencephalography (EEG), electrooculography (EOG), electroretinography (ERG), optical computed tomography (OCT), or other measures with respect to eye function. For example, anxiety or depression can be determined in response to ERG. For another example, cardiac risk can be determined in response to OCT. For another example, the computing device 121 can be disposed to use other measures with respect to eye function, such as in combination with one or more artificial intelligence (AI) or machine learning (ML) techniques, to predict one or more measures of efficacy of treatment, quality of life after treatment, or otherwise, with respect to monitoring, predicting, preventing, diagnosing, or treating medical conditions.

For another example, the sensors 123 can include an electric field element disposed to measure a dipole moment of the eye. The dipole moment of the eye is weak but present; it is aligned at a known angle with respect to a gaze direction. This can have the effect that the element disposed to measure a dipole moment of the eye can measure a gaze direction, without requiring any input to, or view of, the pupil or iris.

For another example, the sensors 123 can include a gaze direction sensor (not shown), such as an element disposed to measure a reflection of an electromagnetic signal, such as infrared (IR) light directed at the eye and reflected in response to a direction of the pupil or the lens thereof. In such cases, the gaze direction sensor can provide a signal indicating a direction at which the wearer is looking, such as whether the wearer is looking up/down, right/left, centrally/peripherally, or through what region of the lens the wearer's gaze is directed. In such cases, the sensors 123 can also include a pupillometer, such as an element disposed to measure a size of the pupil, such as a camera or other device disposed to distinguish a size of the pupil. A size of the pupil can be used to determine a focal length at which the wearer is directing a gaze, such as at a distance, mid-range, or near range.

For another example, the sensors 123 can include one or more devices mounted on a vehicle, such as a vehicle being controlled by the wearer (such as a racing car or an aircraft). For example, the sensors 123 can be disposed surrounding the vehicle, directed at fields of view (FOV) not ordinarily available to the wearer when operating the vehicle. The sensors 123 can be mounted on the vehicle and directed to the sides or rear of the vehicle, at the front of the vehicle and directed at angles from the wearer's FOV, or otherwise. The sensors 123 can be mounted on the vehicle and disposed so as to move relative to the vehicle, such as when the vehicle is turning, climbing or diving, accelerating or decelerating, or otherwise.

For another example, the sensors 123 can include one or more remote devices, such as mounted on aircraft, drones, other vehicles, other distant stations, or otherwise. In such cases, the sensors 123 can be disposed to transmit information to the computing device 121, so as to control the lenses 112. In additional such cases, the sensors 123 can be disposed to transmit information from an over-the-horizon field of view (FOV), otherwise not ordinarily available to the wearer.

In one embodiment, the lens holders 111c can be disposed to maintain one or more lenses 112, such as lenses used to correct vision on behalf of the wearer, lenses used to enhance vision on behalf of the wearer, or otherwise. For example, lenses 112 used to correct vision can have one or more lens prescriptions associated therewith, disposed to correct for myopia, presbyopia, astigmatism, or other wearer vision artifacts. For another example, lenses 112 used to enhance vision can include a zoom feature disposed to present the wearer with a zoomed-in or zoomed-out view of the wearer's field of view (FOV), or can include other features disposed to present the wearer with other vision enhancements described in the Incorporated Disclosures, or otherwise.

The lenses 112 can include multiple lens regions 131, each disposed to correct vision or enhance vision on behalf of the wearer. For example, the lens regions 131 can include a central vision region 131a, disposed to provide distinct corrections or enhancements to vision in a region where the wearer is looking at objects using their central vision, or one or more peripheral vision regions 131b, disposed to provide distinct corrections or enhancements to vision in a region where the wearer is looking at objects using their peripheral vision. For another example, the lens regions 131 can include a close-vision region 131c, disposed to provide distinct corrections or enhancements to vision in a region where the wearer is looking at a close object, a mid-range vision region 131d, disposed to provide distinct corrections or enhancements to vision in a region where the wearer is looking at a mid-range object, or a distant vision region 131e, disposed to provide distinct corrections or enhancements to vision in a region where the wearer is looking at a distant object.

In one embodiment, each lens region 131 can be individually controlled, such as by the computing device 121, or otherwise. This can have the effect that the wearer's vision can be corrected or enhanced in each region where the wearer might look. For example, the close-vision region 131c can be disposed with a distinct prescription from the mid-range vision region 131d. This can have the effect that when the wearer looks at a close object, their vision can be corrected or enhanced with respect to the prescription assigned to the close-vision region 131c, or when the wearer looks at a mid-range object, vision can be corrected or enhanced with respect to the prescription assigned to the mid-range vision region 131d. For another example, the central vision region 131a can be disposed with a distinct prescription from the peripheral vision region 131b. This can have the effect that when the wearer looks directly at an object, their vision can be corrected or enhanced with respect to the prescription assigned to the central vision region 131a, or when the wearer uses their peripheral vision, their vision can be corrected or enhanced with respect to the prescription assigned to the peripheral vision region 131b.

In one embodiment, when the wearer moves their head, the computing device 121 can determine, such as using an accelerometer or a gyroscope (which can be included with the sensors 123), a wearer's head movement. The computing device 121 can also determine, such as using a dynamic eye gaze tracker (which can be included with the sensors 123), a gaze direction. This information can allow the computing device 121 to determine whether the wearer is intending to look at a close object, a mid-range object, or a distant object; similarly, this information can allow the computing device 121 to determine whether the wearer is using their central vision or peripheral vision. In response thereto, the computing device 121 can control the correction or enhancement associated with one or more of the lens regions 131. This can have the effect that the eyewear 100 adjusts its correction or enhancement to match the wearer's intended use thereof.

In another embodiment, when the wearer shifts their gaze, the computing device 121 can determine, such as using a focal length detector (which can be included with the sensors 123), a distance to an object being viewed by the wearer. This information can allow the computing device 121 to determine whether the wearer is intending to look at a close object, a mid-range object, or a distant object. In response thereto, the computing device 121 can control the correction or enhancement associated with one or more of the lens regions 131. This can have the effect that the eyewear 100 adjusts its correction or enhancement to match the wearer's intended use thereof.

In one embodiment, the lens regions 131 can overlap, such as shown in the figure. An example might occur when close-range overlaps with both central/peripheral vision. In such cases, the intersection of multiple lens regions 131, or the union of multiple lens regions 131, as appropriate, can be invoked by the computing device 121, so as to provide the wearer with the correction or enhancement to match the wearer's intended use of the eyewear 100.

Active Correction or Enhancement—Pixels

Panel 1B shows a conceptual drawing of example glasses having multiple active pixels related to individual wearer view.

In one embodiment, an example eyewear 100 can include glasses 110 disposed for use by the wearer (not shown), including elements shown in the figure, such as one or more of:
- a frame 111, such as possibly including earpieces 111a, a nosepiece 111b, or lens holders 111c;
- at least one lens 112, such as possibly a right lens 112a (shown in Panel 1A), or a left lens 112b (shown in Panel 1B).

The lenses 112 can include multiple lens pixels 141, each disposed to correct vision or enhance vision on behalf of the wearer. In one embodiment, each lens pixel 141 can include an individual region (such as the multiple lens regions 131, only typically smaller), disposed to provide distinct corrections or enhancements to vision in the region where the wearer's gaze direction intersects the lens pixel. Similar to the lens regions 131 described with respect to Panel 1A, each lens pixel 141 can be individually controlled, such as by the computing device 121, or otherwise. This can have the effect that the wearer's vision can be corrected or enhanced for each direction where the wearer might look.

In one embodiment, the computing device 121 can associate a distinct set of lens pixels 141 for use as a separate one of the multiple lens regions 131. The computing device 121 can control the prescription with respect to each such lens region 131 by controlling each of the lens pixels 141 associated with that particular lens region. Similar to the possibility of overlap of lens regions 131, a set of lens pixels 141 can be associated with more than one such lens region. This can have the effect that when the computing device 121 determines that the wearer is using a particular lens region 131, it can select the set of lens pixels associated with that lens region, even if those lens pixels are also associated with another lens region. Similar to overlap of lens regions 131, the intersection of multiple sets of lens pixels 141, or the union of multiple sets of lens pixels 141, as appropriate, can be invoked by the computing device 121, so as to provide the wearer with the correction or enhancement to match the wearer's intended user of the eyewear 100. When the computing device 121 can determine the wearer's intended user of the eyewear 100, and can determine the particular lens pixel 141 that the wearer's gaze direction passes through, the computing device can invoke only that one lens pixel, possibly updating the particular lens pixel to invoke as the wearer's gaze direction might change.

The set of lens pixels 141 associated with each such lens region 131 can be adjusted by the computing device 121. This can have the effect that the set of lens pixels 141 associated with each such lens region 131 can be altered from time to time.

Predictive Techniques

In one embodiment, the computing device 121 can maintain a record of wearer activity with respect to use of the lens regions 131, so as to identify which portions of the lenses 112 should be associated with which lens regions 131 to provide the wearer with the best possible experience with using the eyewear 100. For example, when the computing device 121 determines that the wearer is most likely to need a particular prescription for a selected portion of the lenses 112, the computing device can adjust the prescription for that particular portion of the lenses so as to provide the wearer with that prescription when the wearer is using that portion of the lenses.

In one embodiment, the computing device 121 can determine the wearer's most likely prescription in response to a predictive technique, such as using artificial intelligence (AI) or machine learning (ML). For example, the computing device 121 can train a recurrent neural network (RNN) to predict the wearer's most likely prescription in response to each lens region 131 and each other set of circumstances, such as information obtained from the sensors 123. Alternatively, the computing device 121 can determine a set of regression parameters to predict the wearer's most likely prescription in response to each lens region 131 and each other set of circumstances. The computing device 121 can use other and further AI or ML techniques, or other techniques, or otherwise, to make the desired prediction.

Similar to predictive techniques with respect to the lens regions 131, the computing device 121 can determine the wearer's most likely prescription in response to one or more predictive techniques, such as using artificial intelligence (AI) or machine learning (ML) with respect to each lens pixel 141, with respect to association of lens pixels 141 with particular lens regions 131, or otherwise. In such cases, the computing device 121 can assign individual lens pixels 141 to selected lens regions 131, in response to one or more predictive techniques. Also similarly, the computing device 121 can adjust the set of lens pixels 141 associated with each lens region 131 in response to a predictive technique in response to wearer actions, such as the wearer moving their head when their gaze direction should be re-associated with a different lens region 131.

In one embodiment, the computing device 121 can determine the wearer's most likely medical condition, such as in response to the sensors 123. For example, blink rate and other parameters with respect to the wearer's eye activity can be used to determine whether the wearer is excessively anxious, depressed, sleepdeprived, or otherwise needs to rest. In such cases, the eyewear 100 can be disposed to urge the wearer to take a break and rest. This can have the effect that safety is improved, such as for commercial pilots and other pilots, long-haul truckers and other long-distance drivers, police officers, military personnel, firefighters, emergency responders, medical personnel, and other personnel often subject to long hours or stressful circumstances. Alternatively, the eyewear 100 can be disposed to urge the wearer to take a break or to obtain a stimulant, such as caffeine, sugar, a meal, or otherwise.

Environment Features

In one embodiment, an example eyewear 100 can be responsive to environment features, such as: features of wearer's field of view (FOV), features of objects or scenes within the wearer's FOV, other features of the ambient environment, or otherwise.

For example, features of the wearer's field of view can include one or more of: ambient light, such as total luminance, luminance in a particular region thereof (such as in a region of peripheral vision), prominence of particular colors (such as excessive or inadequate red, green, or blue), glare, ultraviolet (UV), or otherwise. For another example, features of the wearer's field of view can include the presence of infrared (IR) frequencies, such as for use with "night vision" eyewear. For another example, features of the wearer's field of view can include particular frequency mixtures, such as: sunlight, indoor lighting, excessive UV, particularly when inappropriate for the time of day.

For example, features of the wearer's field of view can include identifying particular objects, such as weapons (guns, knives, or otherwise), possibly using object recognition. For another example, features of the wearer's field of view can include identifying particular people, such as a friends, teammates, co-workers, search/rescue targets, criminal suspects, accident victims or medical patients, or otherwise.

For example, features of the wearer's ambient environment can include the wearer's location (including whether the wearer is within a particular area (such as within a known geofence), or whether the wearer is within a selected distance of a known object); the absence or presence of known electromagnetic signals, such as identify-friend-or-foe (IFF) signals for particular persons or equipment; atmospheric conditions, such as weather, pollution conditions, or allergens.

Electromagnetic Signals and Predictive Actions

When the wearer's ambient environment includes an IFF signal, the eyewear 100 can determine whether to adjust features of the wearer's field of view (FOV) in response to the IFF signal. For example, when the IFF signal indicates a warning that a stun grenade (sometimes called a "flashbang grenade") is about to be triggered in the local area, the eyewear 100 can adjust the wearer's FOV to (A) heavily shade infalling light so as to protect the wearer eyes against the extreme light emitted by the flashbang grenade, and (B) heavily protect the wearer's ears against the extreme sound emitted by the flashbang grenade.

When the wearer's ambient environment includes a signal describing an object, the eyewear 100 can determine whether to adjust feature of the wearer's field of view (FOV) in response to the object. Alternatively, the eyewear 100 does not need to explicitly wait for an explicit signal indicating describing the object; the eyewear can use a predictive technique, such as an artificial intelligence (AI) or machine learning (ML) technique to, in response to the ambient environment or other factors, to determine that the object is about to enter the wearer's FOV, so as to prepare itself accordingly to adjust the wearer's FOV.

(Dark Tunnel)

For example, the signal can indicate that the wearer is about to enter or to exit a dark tunnel, particularly when driving at relatively high speed. In such cases, the signal with respect to entering or exiting a dark tunnel can be emitted by a transmitter at or near the entrance or exit of the tunnel, or can be received with respect to a general location detector, such as a GPS device.

When the signal indicates that the wearer is a driver of a vehicle and is about to enter a dark tunnel, particularly when driving at relatively high speed, the eyewear 100 can adjust the wearer's FOV to (A) remove any shading against sunlight so as to allow the driver to see within the dark tunnel, and (B) enhance the wearer's vision within the dark tunnel, such as by enhancing any lighting within the tunnel, adjusting for any visual blur or noise due to the vehicle moving quickly within the dark tunnel, (C) adjust the wearer's prescription so as to account for the relative closeness of the walls of the dark tunnel, and (D) enhance the wearer's vision within the dark tunnel by adding to the light (by injecting light) in areas of the wearer's FOV where the dark tunnel is in shadow. The eyewear 100 can make similar adjustments to account for entering any similar darkened region, such as a canyon shadowed against sunlight.

Similarly, when the wearer's vehicle exits the tunnel (or other darkened region such as a canyon shadowed against sunlight), the eyewear 100 can adjust the wearer's FOV to (A) replace shading against sunlight so as to allow the driver to see when exiting the dark tunnel, and especially to remove glare from sudden sunlight from exiting the dark tunnel, (B) remove any enhancement of lighting so as to not exacerbate the effect of sudden sunlight, (C) adjust the wearer's prescription so as to account for the relative distance of roadway outside the dark tunnel (or other darkened region), and (D) remove any light injection so as to not overload the wearer's vision.

(Sudden Lighting Changes)

The eyewear 100 can similarly alert the wearer and adjust the wearer's field of view (FOV) in response to sudden changes in lighting condition, whether those sudden changes are due to known objects, known terrain features, or other known effects. For example, when the eyewear 100 detects a sudden change in lighting condition, the eyewear can adjust the wearer's FOV in response to that sudden change. Since the eyewear 100 can operate electronically, while the wearer's eye operates using the pupil and iris, this can have the effect that that the wearer's FOV can be adjusted much faster by the eyewear than by the wearer's eye muscles. The eyewear 100 can operate to respond to sudden changes in lighting condition in approximately 1.5 milliseconds, while the pupil and iris might take as long as 300 to 400 milliseconds to respond. Accordingly, the eyewear can protect the wearer against sudden changes in lighting more effectively than the wearer's eye itself. In such cases, the eyewear 100 does not need to explicitly wait for a sudden change in lighting condition; the eyewear can use a predictive technique, such as an artificial intelligence (AI) or machine learning (ML) technique to, in response to the ambient environment or other factors, to determine that a sudden change in lighting condition is imminent, so as to prepare itself accordingly to adjust the wearer's FOV.

Figure 7A:
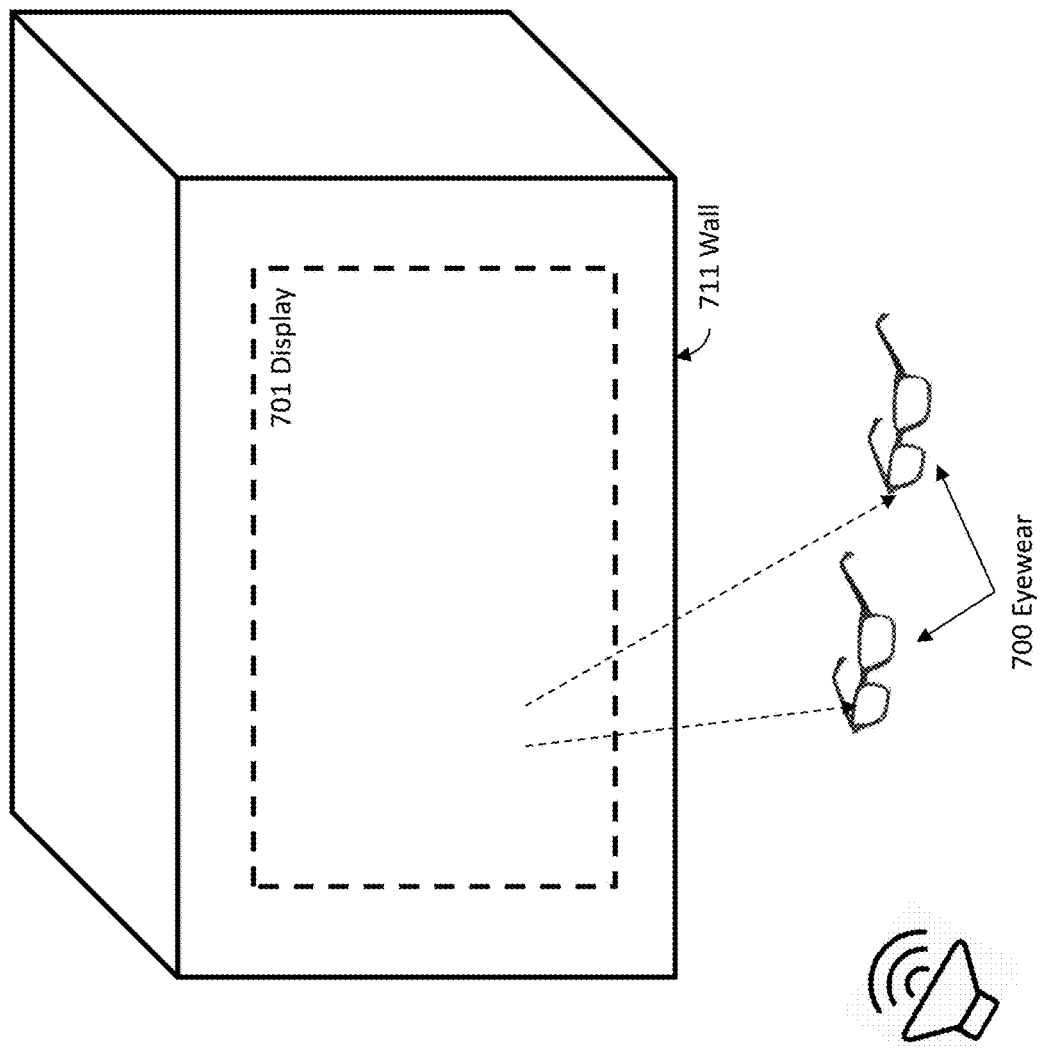
FIG. 7 (collectively including Panel 7A and 7B) shows a conceptual drawing of eyewear used with an example display. Panel 7A shows a conceptual drawing of the example display disposed on or in a building or structure. Panel 7B shows a conceptual drawing of the example display disposed in a vehicle.

For another example, the signal can indicate that the wearer is about to view a display, such as a display described with respect to FIG. 7. In such cases, the signal with respect to viewing a display can be emitted by a transmitter on or near the display, or can be received with respect to a general location detector such as a GPS device.

(Viewing a Display)

When the signal indicates that the wearer is about to view a display, such as when the wearer is driving, and the display includes a billboard or surface that enters the wearer's field of view (FOV), the eyewear 100 can adjust the wearer's FOV to augment the wearer's vision to inject an image at the location of the display. For example, the image injected onto the display can include information with respect to news, road conditions or weather; one or more advertisements, such as in response to demographic or social information about the wearer, or information about which the wearer has expressed interest, or otherwise.

When the signal indicates that the wearer is viewing a display, such as a display associated with a smartphone or other mobile device, or another selected background, the eyewear 100 can adjust the wearer's field of view (FOV) to include a three-dimensional (3D) display on the display superposed on the selected background. For example, the eyewear 100 can adjust the wearer's FOV to present a 3D display on the smartphone's display when the wearer looks at the smartphone. For another example, the eyewear 100 can adjust the wearer's FOV to present a 3D display on another selected background, such as a billboard, a movie theater screen, a theme-park display or other interactive display, an outdoor background, a region of the sky or other natural background, or another region of the wearer's field of view appropriate for a 3D display.

(Viewing an Object)

When the signal indicates that the wearer is about to view an object, such as when the wearer is moving in a theme-park ride or other entertainment attraction, and the object is about to enter the wearer's field of view (FOV), the eyewear 100 can adjust the wearer's FOV to augment the wearer's vision to inject an image at the location of the object. For example, the image injected at the location of the object can replace the wearer's view of the object with a different object. This can have the effect that the viewable entertainment attraction can be replaced with a different attraction without substantial physical change. For another example, the image injected at the location of the object can augment the wearer's view of the object with an additional texture, such as a seasonal decoration. This can have the effect that the viewable entertainment attraction can be modified in response to a time of day, day of the week, or season of the year, without substantial physical change.

For another example, the signal can indicate that the wearer is about to view an object, such as when the wearer is moving in a store, shopping mall, or other commercial area, and such as when the object is a product (or a display with respect to a service) in which wearer might be interested. In such cases, the signal with respect to the object can be emitted by a transmitter on or near the object, or can be received with respect to a general location detector such as a GPS device.

When the signal indicates that a product (or a display with respect to a service), in which the wearer might be interested, is about to enter the wearer's field of view (FOV), the eyewear 100 can adjust the wearer's FOV to augment the wearer's vision to inject an image at or near the location of the object. For example, the image can include (A) information about the product or service, such as a price or sale price, a product specification, a comparison with another product, a set of multiple views of the object, a view of the object in another color or style, or otherwise; (B) information about customer reviews of the product or services, such as positive or negative reviews that have been deemed helpful by other customers, or otherwise; (C) information about example uses, other products or services that can be used together, other products or services that have been purchased together, or otherwise; (D) an advertisement, such as one targeted to the wearer or related to topics in which the wearer is interested. In such cases, the eyewear 100 can adjust the wearer's FOV at such times when the wearer is directing their gaze or focus at the object itself, rather than the generalized area in which the object can be seen.

When the signal indicates that a product (or a display with respect to a service), in which the wearer might be interested, is being viewed by the wearer, the eyewear 100 can adjust the wearer's view of the object to augment the wearer's vision in response to input from the wearer. For example, the wearer can indicate a particular use in which the wearer is interested, in response to which the eyewear 100 can adjust the wearer's view of the object to show the object in the context of that particular use. For example, when the wearer is viewing a product or service for which ordinary store lighting is not the best suited, the eyewear 100 can adjust the wearer's view of the object to show the context in which the wearer intends to use the object.

Examples can include:— when the object includes sportswear or swimwear, or similar clothing, the eyewear 100 can adjust the wearer's view to show how the object might look in full sunlight at a beach or pool, or otherwise;

when the object includes club wear or party clothing, or similar clothing, the eyewear 100 can adjust the wearer's view to show how the object might look in a bar or club, a party environment, or otherwise;

when the object includes makeup or other beauty accessories, the eyewear 100 can adjust the wearer's view to show how the object might look in a context with respect to one or more intended uses, such as in daytime or night time, indoors or outdoors, in bright or dark environments, or otherwise.

Medical Parameters

In one embodiment, an example eyewear 100 can be responsive to medical conditions of the wearer, such as whether the wearer is subject to allergies, "dry eyes" and related conditions, migraines/photophobia or related conditions, sleep deprivation, epilepsy or other seizure concerns, being under the influence of alcohol or other substances, or otherwise.

For example, the eyewear 100 can determine whether the wearer is subject to allergies in response to whether there is any mucus buildup on the wearer's eyes or tear ducts, or other parameters with respect to allergies.

For another example, the eyewear 100 can determine whether the wearer is subject to "dry eyes" in response to to whether the wearer exhibits red sclera (such as from display of blood vessels at the sclera), short tear film breakup time, thin tear films, or other parameters with respect to dry eyes, and features described with respect to the Incorporated Disclosures, particularly including application Ser. No. 16/138,941, filed Sep. 21, 2018, naming the same inventor, titled "Digital eyewear procedures related to dry eyes", currently pending.

For another example, the eyewear 100 can determine whether the wearer is subject to migraines/photophobia or related conditions in response to features described with respect to the Incorporated Disclosures, particularly including application Ser. No. 15/942,951, filed Apr. 2, 2018, naming the same inventor, titled "Digital Eyewear System and Method for the Treatment and Prevention of Migraines and Photophobia", currently pending.

For another example, the eyewear 100 can determine whether the wearer is subject to epilepsy or other seizure concerns, stroke or transient ischemia, traumatic brain injury (TBI), or being under the influence of alcohol or other substances, in response to the wearer's eye activity, such as pupil or iris size, blink rate, eye twitching or nystagmus, saccade rates and distances, eye rotation, other measurable features of the wearer's eye activity or facial activity, or otherwise. The eyewear 100 can determine the actual values of these or other measures, comparison with a baseline "normal" rate for the wearer or for ordinary patients, comparison with a baseline "normal" rate for the wearer under ordinary conditions (such as with respect to blink rate and related measures), or otherwise. The eyewear 100 can also determine first and other derivatives of those values, first order and other statistical measures of those values, correlations of pairs of those values, medical information with respect to those values, or otherwise.

For another example, the eyewear 100 can determine medical parameters with respect to the wearer's retina, such as whether the wearer's rods or cones are activated; whether the wearer's eyes are operating in photopic, mesopic, scotopic modes; a measure of activity of the wearer's fovea; or otherwise.

In one embodiment, the eyewear 100 can, with respect to one or more medical conditions, attempt to predict those medical conditions, prevent those medical conditions, diagnose those medical conditions (such as when they are beginning or occurring), monitor those medical conditions (as they being, proceed, finish, or recur), treat those medical conditions (possibly with the assistance of the wearer), or otherwise.

For example, the eyewear 100 can perform prediction, prevention, diagnosis, treatment, or otherwise, using one or more artificial intelligence (AI) or machine learning (ML) techniques, such as those described with respect to the Incorporated Disclosures, particularly including application Ser. No. 15/942,951, filed Apr. 2, 2018, naming the same inventor, titled "Digital Eyewear System and Method for the Treatment and Prevention of Migraines and Photophobia", currently pending. In such cases, the eyewear 100 can perform prediction, prevention, diagnosis, treatment, or otherwise, with respect to medical conditions other than migraines or photophobia; for example, the eyewear 100 can perform these functions with respect to ADD or ADHD, Alzheimer's disease, autism spectrum disorder, bipolar disorder, cancer, cardiovascular risk, dementia, depression, "dry eyes", epilepsy or seizure disorders, eye fasciculations, hallucinations, Parkinson's disease, PTSD, schizophrenia, sleep disorders or circadian disorders (including "night shift" and "jet lag"), stroke or transient ischemia, traumatic brain injury (TBI), other medical conditions, or otherwise.

In such cases, the eyewear 100 can obtain, such as from a medical database or other remote source, a set of high-resolution longitudinal data with respect to a relatively large population. The high-resolution data can be used to generate an AI or ML model that the computing device 121 can apply to relatively low-resolution data obtained from the eyewear 100. The computing device 121 can apply the AI or ML model to the relatively low-resolution data obtained from the eyewear 100, so as to provide an in-the-field on-the-fly diagnosis with respect to the wearer.

For another example, the eyewear 100 can perform prediction, prevention, diagnosis, treatment, or otherwise, using one or more AI or ML techniques, such as those described with respect to the Incorporated Disclosures, particularly including application Ser. No. 16/264,553, filed Jan. 31, 2019, naming inventor Scott LEWIS, titled "Digital eyewear integrated with medical and other services", currently pending.

User Feedback

In one embodiment, an example eyewear 100 can include glasses 110 disposed for use by the wearer (not shown) and can be responsive to user input. User input can provide information to the computing device 121, such as indicating that the user is attempting a particular viewing activity, as user input indicating that the user accepts/rejects a selected prescription for a particular gaze direction, or as a command directing the computing device to perform a selected action. For example, user input can include one or more of:

- eye activity, such as possibly including eye gestures, facial gestures;
- manual activity, such as possibly including manual gestures, touch controls;
- external device activity, such as possibly including external screens, mobile devices, smartphones, smart watches, or computing devices (such as mice or keyboards, trackpads or computer styluses, or capacitive touch devices);
- other bodily activity, such as voice control, or possibly measurable by a wearable or implantable device;
- or otherwise.

(Eye Gestures)

For example, eye gestures can include one or more of: blinking one or more times, blinking rapidly with respect to an ordinary blink rate, glancing in a particular direction (such as glancing up/down, right/left, or doing so repeatedly), squinting one or more times, squinting rapidly with respect to an ordinary squint rate, or otherwise. Facial gestures can include movement of the ears (such as wiggling the ears), eyebrows (such as raising or lowering one or more eyebrows), mouth (such as opening or closing the mouth), teeth, tongue (such as touching controls coupled to the teeth), use of the wearer's voice, or other facial features, or otherwise.

(Manual Activity)

For another example, manual activity can include hand gestures (possibly aided by a glove or other sensor), hand gestures conducted within the wearer's field of view (FOV), other bodily movement within the wearer's FOV (such as movement by the wearer's wrist, arm, elbow, leg, knee, or otherwise). Manual activity can include touch controls 151 (such as on the eyewear 100 or on an external device). In such cases, the touch controls 151 can include one or more buttons, sliders, switches, or capacitive sensors, and can be mounted on or near the eyewear frame 111. Alternatively, touch controls 151 can be mounted on an external device, such as an external screen, a mobile device, a smartphone, a smart watch, another wearable, a control panel for another device (such as a computing device or a vehicle), or otherwise.

In such cases, when a touch control 151 is mounted on a vehicle, it can be disposed on a steering wheel for a racing car, a control yoke for a speedboat, a control stick for an aircraft, a set of ski poles when skiing or a set of buttons when snowboarding, a controller for a gaming system, or otherwise. The eyewear 100 can be disposed to allow the wearer to use a touch control or other control disposed on the steering wheel, control yoke, control stick, ski poles, snowboard buttons, gaming system controller, or otherwise. The eyewear 100 can also be disposed to allow the wearer to use an eye gesture, hand gesture, or other gesture, to control the eyewear 100 itself, such as for shading/inverse-shading, or to control the vehicle or gaming system, such as to increase or decrease speed, alter direction, or control other functions thereof. The eyewear 100 can also be disposed to use one or more artificial intelligence (AI) or machine learning (ML) techniques to identify circumstances when shading/inverse-shading is desirable for the wearer, or when the wearer is subject to a medical condition or other debilitating circumstance, such as "dry eyes", migraine/photophobia or related conditions, epilepsy or seizures, or otherwise.

(Medical Conditions)

For another example, a wearable or implantable device can be disposed to measure a bodily function, such as heart rate, movement, walking distance, or otherwise. In such cases, the wearable or implantable device can use the measure of the bodily function to provide feedback to the eyewear 100. Feedback to the eyewear 100 can indicate that the wearer is in medical distress or is otherwise subject to a medical condition, including whether the wearer is subject to a cardiac or stroke event, whether the wearer is subject to excessive stress, whether the wearer is subject to a migraine, whether the wearer is subject to a seizure, or otherwise. In such cases, the eyewear 100 can use the communication device 122 to alert emergency responders, medical personnel, search and rescue personnel, or volunteers who are nearby and able to help. Moreover, the eyewear 100 can be disposed to respond to medical conditions such as stress, migraine, or otherwise, by adjusting the wearer's prescription to assist in treatment of eyestrain, headache or migraine, "dry eye" conditions, or otherwise.

(Voice Commands)

For another example, the eyewear 100 can be disposed to respond to the wearer's voice commands, such as by using one or more artificial intelligence (AI) or machine learning (ML) techniques to recognize voice commands, parse those commands, and perform the actions requested by the wearer. In such cases, the eyewear 100 can be disposed to respond to a wakeup word, so as to only respond to voice commands when the wearer deliberately intends the eyewear 100 to respond, and not to respond to voice commands when the wearer is merely talking to another person (or themselves).

(Gaze Direction)

In one embodiment, an example eyewear 100 can be responsive to the wearer's gaze direction, so as to illuminate a location, an object, or a person, at which the wearer is looking. For example, the eyewear 100 can include sensors 123 including a gaze detector (not shown), disposed to determine a direction at which the wearer is directing their gaze, and a pupillometer (not shown), disposed to determine a size of the pupil and accordingly a focal length.

In one embodiment, the gaze detector can be coupled to a lamp (not shown), disposed to illuminate in an outward direction at a region of the wearer's field of view where the wearer is looking. For example, when the wearer moves their gaze across their field of view, the lamp can move an illumination effect with the wearer's gaze direction. This can have the effect that the wearer's field of view is illuminated where the wearer is looking, without the wearer having to move their hand (when holding a lamp) or their head (when wearing a lamp) to point the lamp toward an object of interest.

Moreover, the lamp can be disposed to present its illumination effect in only the portion of the wearer's field of view at which the wearer's gaze is directed, such as to illuminate the location, object, or person, of interest to the wearer, without having to illuminate a larger region that includes the region of interest to the wearer.

In one embodiment, the pupillometer, or another focal length detector, can be disposed to determine a distance at which the wearer is looking. This can have the effect that the eyewear 100 can determine a specific location, object, or person, of interest to the wearer, rather than a solid angle within the wearer's field of view. For example, when a specific object of interest to the wearer is nearby, the lamp can be disposed to focus on that nearby object. This can have the effect that that only that nearby object would be illuminated, not objects about which the wearer is not interested.

In one embodiment, the illumination effect can be disposed (A) to enhance context sensitivity when viewing the object of interest, such as when the object has better contrast with respect to its background; (B) to enhance visual acuity when viewing the object of interest, such as when the object is subject to less visual blur or noise, motion blur, peripheral blur, or other effects that debilitate visual acuity; (C) to enhance visibility of a feature of the object, such as an edge thereof, a face thereof, writing on the object, or otherwise;

In one embodiment, the illumination from the lamp can be polarized. This can have the effect that the illuminated object does not present glare to the wearer, even when the object is highly reflective or otherwise shiny. In another embodiment, the illumination from the lamp can be a blinking light or a strobe light. This can have the effect that the wearer can view the object of interest without debilitating their night vision, or while identifying the object to another viewer.

In one embodiment, the illumination from the lamp can include a color effect, such as having a color distinct from the object or its background. For example, the illumination can emphasize the object by altering its color with respect to its background, or by altering the color of the background in the region of the object. For another example, the illumination can emphasize the object by altering the contrast of its color with respect to its background, or by altering the color contrast of the portion of the background in the region of the object.

In one embodiment, the illumination from the lamp can include an augmented reality or virtual reality effect, such as a heads-up display (HUD) in which the object of interest is highlighted, or such as a virtual reality pointer directed at the object of interest.

In one embodiment, the lamp can be directed at the wearer's eye, such as at the wearer's pupil or retina. This can have the effect of adjusting the wearer's pupil or retina, such as to cause the wearer to see the object of interest more brightly or darkened. For example, the lamp can be directed at the wearer's pupil, such as to cause the pupil to contract and the object to be darkened. This can have the effect of emphasizing the object when otherwise presented against a brightly lit background. For another example, the lamp can be directed at another portion of the wearer's eye, such as to cause the pupil to expand and the object to be brightened.

In one embodiment, the lamp can be directed at the wearer's eye, such as at the wearer's pupil or retina, with the purpose of activating a particular mode of the wearer's vision. For example, the wearer's vision can be activated in a mesopic, photopic, or scotopic mode. In another embodiment, the lamp can be directed at the wearer's eye, such as at the wearer's pupil or retina, with the purpose of adjusting the size of the wearer's pupil (A) to ameliorate visual aberration, such as when visual aberration occurs after LASIK surgery or other eye surgery, or (B) to promote night adaptation of the wearer's vision, such as by adjusting the wearer's pupil to become narrower even when the wearer enters a darkened region.

User feedback can also include combinations of multiple user inputs, such as multiple eye gestures, multiple manual inputs, multiple external device inputs, combinations of different types of user inputs, or otherwise. For example, combinations of eye gestures can include activity such as "blink twice and glance left".

Action by Eyewear

In one embodiment, an example eyewear 100 can be disposed to correct vision or enhance vision on behalf of the wearer. The eyewear 100 can be disposed to alter refraction, polarization/shading, color, prismatic angles/functions, or otherwise.

For example, the eyewear 100 can be disposed to correct or enhance the wearer's vision by altering the amount of refraction (such as an optometry prescription) in response to factors described herein. The eyewear 100 can be disposed to alter the amount of refraction in response to whether the wearer's gaze direction or focal length, or whether the wearer's field of view (FOV) includes a recognized object, with a particular distance. In such cases, the eyewear 100 can be disposed to alter the amount of refraction to correct or enhance the wearer's vision to optimize the wearer's ability to clearly see at the particular distance or to clearly see the recognized object.

As further described herein with respect to predictive techniques, such as artificial intelligence (AI) or machine learning (ML) techniques, the eyewear 100 can be disposed to alter the amount of refraction in response to a predicted distance at which the wearer is most likely to be focusing when their gaze direction intersects a particular lens region 131 or lens pixel 141 of the lenses 112. Having learned the wearer's behavior, the eyewear 100 can be disposed to select the amount of refraction statically, thus, without regard to the nature of the objects or scene in the wearer's field of view (FOV). Alternatively, having learned the wearer's behavior, the eyewear 100 can be disposed to select the amount of refraction dynamically in response to a focus distance determined with respect to the wearer, such as by measurement of the wearer's pupil or iris size, contraction, or widening.

For another example, the eyewear 100 can be disposed to correct or enhance the wearer's vision by altering the amount of polarization/shading of light entering the wearer's eyes through the lenses 112. In such cases, the eyewear 100 can alter the amount of polarization/shading in a particular gaze direction to alleviate glare, can alter the amount of polarization/shading in a particular vision region to alleviate excess luminance or UV light, or otherwise. When the wearer changes their gaze direction or focal length so as to view an object with a different amount of brightness, the eyewear 100 can alter the amount of polarization/shading in response thereto, so as to match the amount of polarization/shading to the brightness of the object being viewed by the wearer. When the wearer exhibits features associated with medical conditions or other conditions, such as in response to blink rate, pupil or iris size, squinting, redness or showing blood vessels on the sclera, inadequate tear films or tear film breakup time, other eye features (or significant changes therein), or otherwise, the eyewear 100 can respond to those conditions by altering the amount of polarization/shading of light entering the wearer's eyes through the lenses 112. Similarly, the eyewear can adjust infalling light so as to induce photopic, mesopic, or scotopic activity of the eye's rods and cones.

For another example, in addition to, or in lieu of, responding to the wearer's eye activity, the eyewear 100 can be disposed to alter the amount of polarization/shading of light entering the wearer's eyes in response to a prediction of an amount of infalling light likely to enter the wearer's eyes. In such cases, the eyewear 100 can determine its prediction in response to one or more artificial intelligence (AI) or machine learning (ML) techniques, possibly in response to a direction the wearer is facing, a location the wearer is positioned, a time of day, a season of the year, a measure of ambient lighting or detection of a number of ambient artificial lights, or otherwise. When performing shading, the eyewear 100 can electronically control the lenses 112, such as particular lens regions 131 or lens pixels 141.

For another example, the eyewear 100 can be disposed to correct or enhance the wearer's vision by altering the amount of color filtering, color injection, false coloring, or color changes. In such cases, when the eyewear 100 determines that the amount of infalling ambient light is excessive, or is excessive for a particular color or in a particular frequency range, or is unbalanced with respect to color, the eyewear 100 can adjust the amount of filtering for that color or frequency range to limit the amount of infalling light to a reasonable amount. In such cases, the eyewear 100 can reduce an amount of blue just before sleep. Similarly, the eyewear 100 can also detect infalling ultraviolet (UV) light, absorb that UV, and inject a false color in lieu thereof, using one or more electromagnetic or photochromatic techniques. In such cases, the eyewear 100 can alter the color balance of infalling light so as to allow artists, such as graphic designers or web developers, to generate color schema that are accurate when viewed in their intended environment.

When the eyewear 100 determines that the amount of infalling light is inadequate for a particular color, or in the case of migraines, attempts to treat the migraine effect by injecting some amount of that color (such as green), the eyewear 100 can adjust the amount of filtering, or can directly inject that color into the wearer's field of view (FOV), such as by using color LEDs to directly inject selected colors. For example, red LEDs can be used to inject red pixels, green LEDs can be used to inject green pixels, blue LEDs can be used to inject blue pixels, or white LEDs can be used to inject white pixels. When the amount of infalling light is inadequate for the wearer to clearly see color (such as when the wearer's rods are activated but their cones are not), the eyewear 100 can provide a false-coloring of the FOV to show features of interest to the wearer, such as when the eyewear 100 is operated using or in lieu of "night vision" goggles that detect infrared (IR), or when false coloring is used with object recognition, or otherwise. Similarly, the eyewear 100 can alter the color balance of infalling light to prompt the wearer's eye to operate in a photopic, mesopic, or scotopic mode.

When the eyewear 100 determines that the wearer is subject to an inadequate blink rate, or an excessive blink rate, the eyewear 100 can adjust the amount of color at selected frequencies injected into the wearer's field of view (FOV). For example, color injection can be used to control an amount of melatonin produced by the brain. Blue light decreases an amount of melatonin produced by the brain, which is why blue light can interfere with sleep. Melatonin causes the eye to decrease blink rate, so an excessive blink rate can be controlled by color injection, at least in part. For another example, color injection can be used to control an amount of dopamine produced by the brain. Blue light increases an amount of dopamine produced by the brain. Dopamine causes the eye to increase blink rate, so an inadequate blink rate can be controlled by color injection, at least in part.

For another example, the eyewear 100 can be disposed to correct or enhance the wearer's vision by altering the amount of prismatic angle imposed by the lenses 112. In such cases, when the wearer's activity indicates that the wearer intends to look down, such as at a keyboard or smartphone, the eyewear 100 can be disposed to alter the amount of prismatic angle imposed by the lenses 112 so as to allow the wearer to see the keyboard or smartphone without any unnecessary head movement. Similarly, when the wearer's activity indicates that the wearer intends to look up, such as at a screen, presentation, window, or distant object, the eyewear 100 can be disposed to alter the amount of prismatic angle imposed by the lenses 112 so as to allow the wearer to see that object without any unnecessary head movement.

Active Color Change by Eyewear—Frame

For another example, the eyewear 100 can be disposed to change a color of its frame, such as from a relatively clear color to a relatively opaque color, or the reverse, or from a relatively cool color (blue) to a relatively warm color (red or orange), or the reverse. For example, the color change can be responsive to a wearer condition; to a color determined in response to an electromagnetic signal, such as a signal from the computing device 121 or from a wearer input; to a color determined in response to an environmental condition; or otherwise.

(Medical Condition)

For example, the wearer condition can include one or more of: a medical condition, such as the wearer suffering from a dry eye condition, a migraine/photophobia or a neurological condition in response thereto, or otherwise. In such cases, the wearer condition can be determined in response to a computing device processing outputs from sensors coupled to the wearer, from an input from the wearer, or otherwise.

In one embodiment, when the wearer is undergoing a medical condition for which the wearer needs assistance, medical or otherwise, the eyewear 100 can be disposed to change color to alert the wearer, and nearby persons, about the medical condition. For example, when the wearer is undergoing a coronary attack or a stroke, it can be desirable to alert emergency responders and medical personnel, and it can be desirable for volunteers to assist the wearer in being transported to an ambulance or hospital with haste. In such cases, the eyewear 100 can change color to alert the wearer and nearby persons to do so.

In such cases, the eyewear 100 can emit an electromagnetic signal, thus changing "color" to a frequency outside normal human vision. The electromagnetic signal can include a coded message which can be received by another device, such as another set of eyewear 100, a smartphone or other mobile device, or another type of device, which can be disposed to receive the electromagnetic signal and send a message to alert emergency responders and medical personnel that the wearer needs assistance and is in transit to an ambulance or hospital.

(Wearer Emotional State)

In one embodiment, the eyewear 100 can change color to indicate the wearer's emotional state or mood, such as when the wearer is (A) excessively tired, (B) under the influence of alcohol or other substances, (C) subject to a diabetic complication or other issue, (D) an unexpected lack of energy, or an emotional state or mood otherwise indicating that the wearer needs assistance or should not be operating heavy machinery. In such cases, the wearer or nearby persons can take appropriate action to assist the wearer, such as by calling for a taxi or otherwise bringing them home.

(Ambient Condition)

For example, the wearer's field of view (FOV) can include one or more of: an amount of luminance (whether excessive or inadequate), an amount of glare, an amount of sensory noise or cognitive stimulation (whether excessive or inadequate), or otherwise. In such cases, the effect of the wearer's FOV can be determined in response to one or more of: a computing device processing inputs from the wearer's field of view FOV, a computing device processing the wearer's response to the wearer's FOV, an input from the wearer with respect to the wearer's FOV, or otherwise.

(Matching Other Objects)

For example, the eyewear 100 can be disposed to make itself brighter or dimmer in response to the ambient environment. This can have the effect that the eyewear 100 can adjust its color with respect to the ambient environment, either by reducing/increasing its contrast with the ambient environment to become less/more prominent. Similarly, the eyewear 100 can be disposed to make itself less/more prominent with respect to an external device, such as (A) the wearer's clothing or accessories, or (B) another person's eyewear, clothing or accessories.

This can have the effect that multiple persons can intentionally match the colors of their eyewear 100, so as to easily identify members of a group, such as a tour group. In such cases, the eyewear 100 can communicate with other eyewear so as to determine whether all members of the tour group are present, or whether some statistical measure, such as whether members of the tour group are within a localized area. Similarly, one or more eyewear 100 can change color in a time-varying manner, such as by cycling among two or more different colors, such as (A) to improve the visibility of the eyewear, (B) to send a coded message to an electronic device, or otherwise.

For another example, the eyewear 100 can be disposed to change color in response to an external signal, such as an electromagnetic signal from another eyewear, a smartphone or other mobile device, or another type of device.

(Environmental Condition)

For example, the environmental condition can include one or more of: a weather condition, an amount or severity of allergens or pollutants; or another environmental condition (such as a presence of smoke inhalation or soot, a presence of absorbable/inhalable hazards, a presence of hazardous biological/chemical substances, a presence of an ambient drug hazard, a presence of a pathogen, or otherwise). In such cases, the environmental condition can be determined in response to a computing device processing inputs from the wearer's field of view (FOV), a computing device processing the wearer's response to the wearer's FOV, an input from the wearer with respect to the wearer's FOV, or otherwise. In such cases, the weather condition (or the amount or severity of allergens or pollutants) can be determined in response to a sensor disposed to detect those conditions, in response to a GPS or other location device disposed to identify the wearer's location and obtain a report of those conditions for that location, an input from the wearer with respect to those conditions, or otherwise.

For example, the environmental condition can include one or more of: a wearer's field of view (FOV), a weather condition, an amount or severity of allergens or pollutants; or another environmental condition. In such cases, the environmental condition can be determined in response to a computing device processing inputs from the wearer's FOV, a computing device processing the wearer's response to the wearer's FOV, an input from the wearer with respect to the wearer's FOV, or otherwise. In such cases, the weather condition (or the amount or severity of allergens or pollutants) can be determined in response to a sensor disposed to detect those conditions, in response to a GPS or other location device disposed to identify the wearer's location and obtain a report of those conditions for that location, an input from the wearer with respect to those conditions, or otherwise.

For example, the frame 111 can be coated with an LCD material, an LED material, an OLED material, a PLED (polarized LED) material, a phosphorescent material, or a related material responsive to an electromagnetic signal or an electronic signal, in response to an environmental factor such as temperature or pollutants, or otherwise. The electromagnetic signal or electronic signal can be received from the computing device, from a wearer condition sensor, from an environmental sensor (including a sensor disposed to detect a color balance or other condition of a scene, an object or person identified in the scene, or otherwise), from a wearer input sensor, or otherwise.

For example, the eyewear 100 can be disposed to have the new frame color set at the time of sale; this can have the effect that a smaller number of stock keeping units (SKUs) can be maintained by a seller while maintaining a degree of flexibility for sales. For another example, the eyewear 100 can be disposed to have the new frame color set at a time when the eyewear is lent or issued to the wearer, such as when 3D glasses are provided to the wearer at a show; in such cases, it can be advantageous for clerks issuing eyewear to wearers to be able to easily identify which eyewear is associated with which wearer's tickets to see the show. Similarly, in such cases, it can be advantageous for clerks issuing eyewear to wearers to be able to easily set parameters for the eyewear, while concurrently setting the color of the eyewear to identify that the eyewear has been set with those parameters.

For another example, when a display is disposed so as to allow viewers with different eyewear 100 to view different presentations, it can be convenient for clerks to present eyewear to viewers that have external colors associated with the presentation the viewer will see. This can have the effect that clerks can easily determine whether eyewear 100 for an adult presentation is being worn by a child, or whether the eyewear is otherwise improperly associated with the viewer.

For another example, the eyewear 100 can be disposed to change its frame color in response to the wearer's control, in response to an amount or color balance of ambient light (such as sunlight, indoor light, an amount of UV light, or otherwise), in response to a time of day or day of the week, in response to a change in the wearer's appearance, in response to the wearer's emotional affect or mood, or otherwise. In such cases, when the wearer desires to use the eyewear 100 in a particular context, the wearer can adjust the eyewear so as to match the context, such as by making the eyewear lighter when the wearer desires to emphasize their eyes and darker when the wearer desires the opposite.

For example, the wearer's emotional affect or mood can be determined in response to the wearer's body temperature or skin temperature, in response to the wearer's pupil size or eye motions (or frequency thereof), in response to the wearer's heart rate or blood pressure (or stability thereof), in response to the wearer's galvanic skin response, in response to other medical conditions, in response to one or more inputs from the wearer, or otherwise.

For example, the wearer's appearance can be determined in response to the wearer's hair color (such as when it is dyed or gelled or otherwise styled, bleached by sunlight or stage-lit or otherwise altered, or subject to different lighting conditions, or otherwise); in response to the wearer's eye color or skin color; in response to a color of the wearer's outfit (such as clothing or jewelry); in response to whether the wearer is wearing cosplay/costuming or face paint, makeup or broadcast makeup, or suntan lotion; or otherwise.

In one embodiment, the eyewear can be disposed to provide an active color change in response to one or more factors, so as to signal to observers that the wearer has a particular condition, such as a medical condition, a wearer activity, or a wearer focus on a particular portion of their field of view. For example, a glasses frame can be disposed to change color without interfering with the wearer's field of view (FOV), while communicating to the wearer or to others a wearer's emotional affect or mood, medical condition, or to match an environment in which the wearer is participating. For example, the glasses frame can match the wearer's hair color or eye color (even if one or more of those has been altered to match a social occasion), to match the wearer's outfit, or to match ambient lighting.

In one embodiment, the eyewear can be disposed to provide an active color change when disposed in one or more distinct form factors: a glasses frame; a facemask or helmet; a heads-up display (HUD), a window screen, a vehicle window or windshield, or otherwise. For example, the glasses frame, facemask, or helmet, can be disposed to change color without interfering with the wearer's field of vision (FOV). For another example, the facemask or helmet, HUD, window screen, or vehicle window or windshield, can be disposed to change color so as to alter the wearer's FOV, such as to alter the color balance of ambient light.

Active Color Change by Eyewear—Lens

Similar to frame color, the eyewear 100 can be disposed to include one or more contact lenses 300, one or more of which can be disposed to change color, such as described with respect to the frame 111. The eyewear 100 can also be disposed to include photochromatic lenses 112, which can be disposed to change color, as described with respect to the frame 111. The lenses 112 can also be disposed to change color in response to a gaze direction or focal length, so as to not to impose an artificial color on the wearer's view through the pupil. The lenses 112 can also be disposed with a color that is adjustable in response to the wearer's iris color, so as to combine the iris color with the lenses' color to form a selected color.

For another example, the eyewear 100 can be disposed to change color or shading in response to a gaze direction or size of the wearer's pupil, so as to not to interfere with the wearer's vision. In such cases, when the wearer's pupil increases/decreases in size, the eyewear 100 can alter the portions in which it provides color or shading so as to avoid obscuring the width of the wearer's pupil. Similarly, when the wearer's pupil moves to change gaze direction, the eyewear 100 can alter the portions in which it provides color or shading so as to avoid obscuring the direction of the wearer's pupil.

For another example, the eyewear 100 can be disposed to deliberately alter the color balance of the wearer's field of view (FOV), so as to alter the color balance seen by the wearer. In such cases, the eyewear 100 can alter the color it provides in the region (or for the set of pixels) associated with the wearer's pupil, so as to alter the color balance of the wearer's FOV when the eyewear includes a lens 112 disposed in a glasses frame, a facemask, or helmet; when the eyewear includes contact lenses, an intra-ocular lens or other implantable device; or otherwise.

For another example, the eyewear 100 can be disposed to deliberately alter an amount of shading or inverse-shading of the wearer's field of view (FOV), so as to alter an amount of luminance of light infalling to the wearer's pupil or onto the wearer's retina. In such cases, the eyewear 100 can alter the amount of shading/inverse-shading it provides in the region (or for the set of pixels) associated with the wearer's pupil, so as to alter the amount of luminance or light contrast with respect to the wearer's FOV. Similarly, the eyewear 100 can alter the amount of shading/inverse-shading it provides so as to assure that the wearer obtains sufficient contrast between objects that the wearer can identify those objects even in relatively dim lighting (such as at night) or excessively bright lighting (such as in bright ambient light, when the object is brightly backlit, or when the object is subject to glare).

Possible Use Cases

In one embodiment, the eyewear 100 can be disposed to perform shading using the lenses 112 by one or more of: (A) darkening one or more lens regions 131 or lens pixels 141 through which the wearer is viewing a light source; (B) urging the wearer's pupil or iris to contract, such as by injecting light into the pupil, by triggering an electronic signal to prompt the iris muscle to contract, by inducing a puff of air to prompt the iris muscle to contract, or otherwise; (C) or by darkening one or more concentric rings of lens regions 131 or lens pixels 141, with the effect that the wearer's pupil is artificially restricted in width, thus effectively contracted; or otherwise. This can have the effect that the wearer receives less infalling light on their retina, thus darkening their view.

In one embodiment, the eyewear 100 can be disposed to perform shading in response to detecting epilepsy or seizure, measuring a rate of oscillation with respect to a seizure event, and fully shading away all infalling light in synchrony with the seizure event, so as to effectively remove any further trigger of the seizure event. This can have the effect that a seizure event can be treated, at least in part.

Similarly, the eyewear 100 can be disposed to combine restriction of light injected into the pupil or iris, so as to focus infalling light on the center of the retina (the macula), with a disc or ring of light being allowed to flow through to the retina's rods. This can have the effect that the wearer's night vision can be improved, as the wearer's rods would be activated, while also allowing the wearer's color vision to be used, as the wearer's cones would be activated. This can also have the effect of providing a treatment for Parkinson's disease, at least in part. Allowing color into the eye can also have the effect of providing a treatment for autism or dementia, at least in part.

In one embodiment, the eyewear 100 can be disposed to specifically urge the wearer's pupil or iris to contract by either (A) urging the wearer's pupil or iris muscle to contract, as described just above; (B) or by darkening one or more concentric rings of lens regions 131 or lens pixels 141, with the effect that the wearer's pupil is artificially restricted in width, thus effectively contracted, as described just above; (C) applying an electromagnetic field to the optic nerve, as further described herein with respect to FIG. 6; or otherwise. This can have the effect that that the wearer's pupil or iris is urged to contract, which can be useful when conducting LASIK eye surgery or for adjusting pupil size after LASIK surgery.

In one embodiment, the eyewear 100 can be disposed to perform inverse-shading using the lenses 112 by one or more of: (A) darkening one or more lens regions 131 or lens pixels 141 through which the wearer is viewing their field of view (FOV), with the exception of an object, display or screen that is being inverse-shaded; (B) injecting light into the wearer's eye where their gaze would be directed at the selected inverse-shaded object, display or screen, similar to when the inverse-shaded object is glowing or phosphorescent; or otherwise. This can have the effect that the selected inverse-shaded object, display or screen is brighter than its background in the wearer's FOV.

In one embodiment, the eyewear 100 can be disposed to promote the wearer reading by one or more of: (A) performing enhanced refraction in one or more lens regions 131 or sets of lens pixels 141 in areas of the wearer's field of view (FOV) through which the wearer would read a book or other readable object, causing a horizontal line to be available for viewing at a higher magnification; (B) performing a prismatic effect using the lenses 112 to alter the angle through which light is bent when passing through the lenses, with the effect that the wearer sees objects as if "looking down" even when the wearer's gaze direction is straight ahead; (C) darkening one or more lens regions 131 or sets of lens pixels 141 in areas of the wearer's field of view other than in a region through which the wearer would read a book, leaving a horizontal line available for viewing; or otherwise. This can have the effect that the wearer is urged to alter their gaze direction toward the book, thus performing a similar function as "reading glasses". Similarly, the eyewear 100 can be disposed to promote the wearer reading by darkening one or more lens regions 131 or lens pixels 141 in areas of the wearer's FOV, leaving a vertical line available for viewing. This can have the effect that that the wearer is urged to alter their gaze direction along the line they are reading, selecting each word in turn.

In one embodiment, the eyewear 100 can be disposed to provide an augmented reality (AR) or virtual reality (VR) display of an eye chart, a peripheral vision test, or another eye test. Using the eyewear 100, an optometrist or other medical personnel can conduct an eye exam to determine a prescription for the wearer, such as whether the wearer needs a prescription to address myopia, presbyopia, astigmatism, or otherwise. The eyewear 100 can also be disposed with a camera directed at the wearer's retina, so as to determine whether the image provided by the AR or VR display is in focus on the wearer's retina. This can have the effect that the optometrist or other medical personnel can conduct the eye exam without requiring the wearer to select which image is best in focus.

In one embodiment, the eyewear 100 can be disposed to provide an augmented reality (AR) or virtual reality (VR) display of the wearer's field of view (FOV), such as when the wearer is a police officer or military personnel, a firefighter or other emergency responder, search/rescue personnel, a physician or other medical personnel, or a volunteer assisting a nearby person in need of aid.

For example, when the wearer is a police officer or military personnel, the eyewear 100 can be disposed to use one or more artificial intelligence (AI) or machine learning (ML) techniques to recognize selected types of objects, such as weapons (guns, knives, or otherwise), that might be dangerous to the wearer. In such cases, the eyewear 100 can (A) inverse-shade the dangerous object, so as to emphasize its location to the wearer; (B) provide an augmented reality (AR) or virtual reality (VR) display of information with respect to the dangerous object, so as to urge the wearer not to fail to recognize that object. Similarly, the eyewear 100 can be disposed to use an AI or ML technique to recognize when the object is moving, or is within reach of a person's hand, or otherwise becomes significantly more dangerous.

For another example, when the wearer is a police officer or military personnel, the eyewear 100 can be disposed to receive electromagnetic signals from a flashbang grenade when the grenade is triggered. At or just before the grenade is set to emit light and sound, the eyewear 100 can completely shade that light and sound, thus protecting the police or military from effects of the grenade. This can have the effect that police and military can use flashbang grenades to stun any opposition, without having to assure that they are not subject to their effects. Similarly, police and military can use light or sound as offensive devices and tactics against persons they seek to subdue. In a related example, police vehicle lights can reach 500 lux in brightness, sufficient to temporarily blind suspects. In such cases, the police vehicle lights can emit an electromagnetic signal when turned on, which can be received by the eyewear 100 so as to completely shade that light, thus protecting the police or military from effects of the extreme light. This can have the effect that the police or military can use vehicle lights against persons they seek to subdue, without having to temporarily blind themselves while so doing.

For another example, when the wearer is a police officer or military personnel, the eyewear 100 can be disposed to exchange electromagnetic signals with firearms, such as police pistols or military pistols or rifles. Firearms can be set with a "safety" mechanism on or off. In such cases, police or military firearms can be disposed to send electromagnetic signals to the eyewear 100 so as to indicate whether the safety is on or off, and to receive electromagnetic signals from the eyewear 100 so as to set the safety on or off. The eyewear 100 can be disposed so as to allow police or military personnel to identify whether the safety is on or off using an augmented reality (AR) indicator in their field of view (FOV), and to set the safety to be on or off using an eye gesture, hand gesture, or other action. This can have the effect that police or military personnel can both (A) be assured when the safety is on or off with respect to their firearms, and (B) be assured that they can set the safety on or off without having to actually touch the firearm.

For another example, when the wearer is a police officer or military personnel, the eyewear 100 can be disposed to exchange electromagnetic signals with firearms, so as to identify in what direction and at what target the firearm is directed. In such cases, firearms can be disposed to send electromagnetic signals to the eyewear 100, so as to indicate in what direction the firearm is pointed. The computing device 121 can use this information to determine a line of sight and a current target for the firearm, and can inject this information using an augmented reality (AR) indicator in their field of view (FOV). This can have the effect that police or military personnel can identify at whom they are aiming without revealing that information to an opponent with a laser pointer. The computing device 121 can inject an AR indicator into their FOV to show what would be seen through the firearm's gun sights, even if the officer is not actually so positioned. This can also have the effect that police or military personnel can identify when they are inopportunely aiming at another officer or at an innocent civilian. In such cases, the police or military can inform the computing device 121, such as using an eye gesture, which persons are not proper targets, and the computing device 121 can control the firearm so as to prevent accidents.

For another example, when the wearer is a police officer or search/rescue personnel, the eyewear 100 can be disposed to use one or more artificial intelligence (AI) or machine learning (ML) techniques to identify one or more persons (such as suspects or rescuees), such as in response to one or more facial recognition techniques, or otherwise. In such cases, the eyewear 100 can, in response to identifying those persons, can (A) inverse-shade the dangerous object, so as to emphasize its location to the wearer; (B) provide an provide an augmented reality (AR) or virtual reality (VR) display of information with respect to the recognized person; (C) apply an electromagnetic field to the optic nerve, as further described herein with respect to FIG. 6; or otherwise.

For another example, when the wearer is a firefighter or other emergency responder, the eyewear 100 can be disposed to use one or more artificial intelligence (AI) or machine learning (ML) techniques to recognize selected types of events. In such cases, the selected types of events can include (for firefighters) objects that are significantly hotter than expected, such as in response to an infrared (IR) sensor, areas that have dangerous gases or other toxins, such as in response to a chemical sensor, or otherwise. In such cases, the selected types of events can include (for emergency responders) patients whose vital signs are abnormal, such as in response to a blood oxygen sensor, a blood pressure or pulse rate sensor, or otherwise.

For another example, the eyewear 100 can identify one or more persons in need of aid by a volunteer, such as using one or more artificial intelligence (AI) or machine learning (ML) techniques, such as those described with respect to the Incorporated Disclosures, particularly application Ser. No. 16/264,553, filed Jan. 31, 2019, naming inventor Scott LEWIS, titled "Digital eyewear integrated with medical and other services", currently pending.

Figure 2:
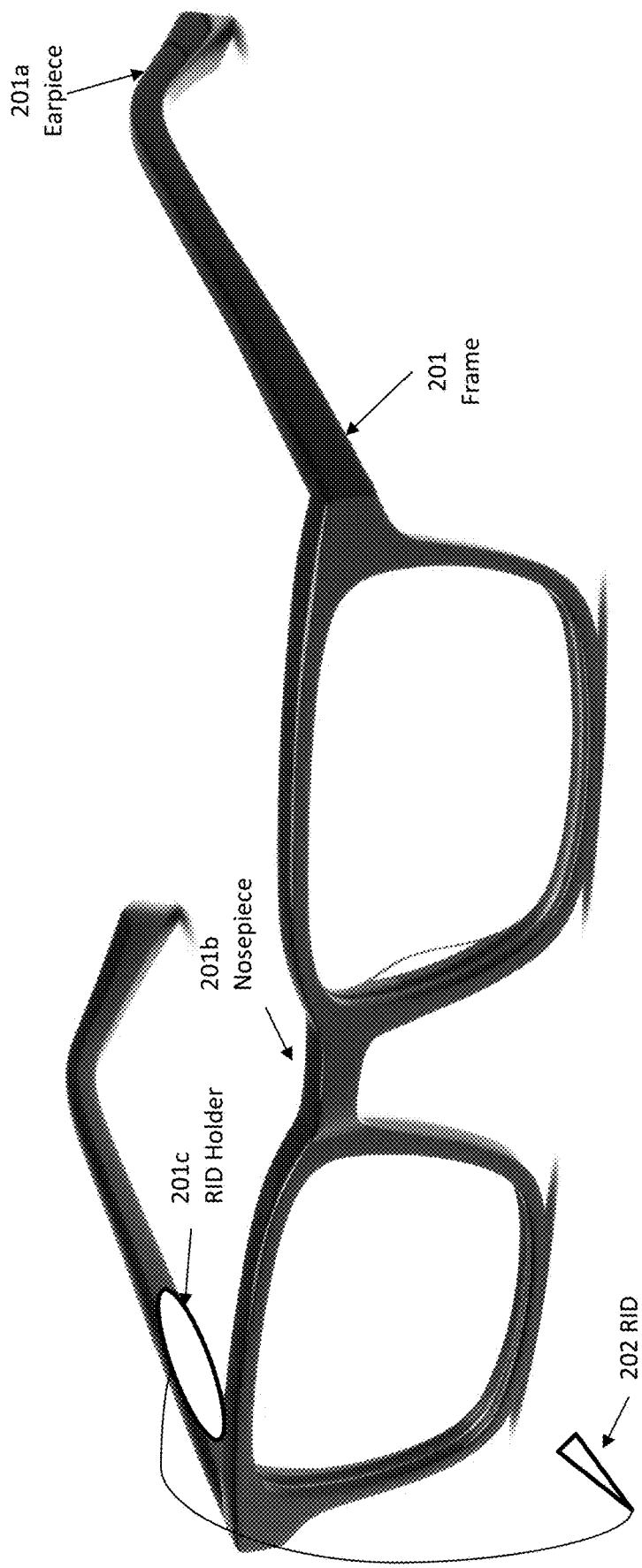
FIG. 2 shows a conceptual drawing of example eyewear including a retinal image display.

FIG. 2—Retinal Image Display

FIG. 2 shows a conceptual drawing of example eyewear including a retinal image display (RID).

In one embodiment, an example eyewear 100 can include elements shown in the figure, such as one or more of:
  a frame 201, such as possibly including one or more earpieces 201a, a nosepiece 201b, or a RID holder 201c;
  at least one RID 202, such as possibly for a right eye or a left eye.

In one embodiment, the RID 202 can provide an alternative image, to replace the image available to the wearer's eye, or a supplemental image to add to the image available to the wearer's eye.

To replace the image available to the wearer's eye, the lens 112 (shown in FIG. 1) in front of the wearer's eye can be opaqued, and the RID 202 can provide the alternative image directly to the wearer's retina. To opaque the lens 112 in front of the wearer's eye, the computing device 121 can adjust, with respect to the lens, one or more of: shading, polarization, color filtering, prismatic adjustment, or otherwise.

For example, the lens 112 can be adjusted by changing
  an amount of shading sufficient to make the lens opaque to a natural field of view (FOV) but not sufficient to prevent the wearer from seeing the retinal image;
  an amount of polarization sufficient to make the lens opaque to a natural FOV, while adjusting the RID 202 with an inverse amount of polarization;
  an selected set of color frequencies sufficient to filter out most of the natural FOV, while adjusting the RID 202 to inject those color frequencies into the retina;
  an amount or function of prismatic adjustment sufficient to cause the eye to not see the natural FOV, while adjusting the RID 202 with an inverse amount of prismatic adjustment;
  or otherwise.

To supplement the image available to the wearer's eye, the lens 112 in front of the wearer's eye can be allowed to remain clear, and the RID 202 can provide the supplemental image directly to the wearer's retina.

FIG. 3—Contact Lenses or Intra-Ocular Lenses

FIG. 3 (collectively including Panel 3A and 3B) shows a conceptual drawing of example eyewear including contact lenses or intra-ocular lenses. Panel 3A shows a conceptual drawing of example contact lenses having multiple active regions related to wearer view. Panel 3B shows a conceptual drawing of example contact lenses having multiple individual pixels related to wearer view.

Contact Lenses

Similar to Panel 1A or 1B (FIG. 1), an example eyewear 100 can include one or more contact lenses 300 disposed for use by the wearer (not shown) by affixing the contact lenses to the wearer's eyes. The contact lenses 300 can include one or more lenses 300, such as possibly a right lens 300a or a left lens 300b. The contact lenses 300 can include elements shown in the figure, such as one or more of:
  a power harvester 301, such as possibly an antenna disposed to receive ambient electromagnetic energy. In one embodiment, the power harvester 301 can include an antenna tuned to receive electromagnetic energy from a cellular phone network, a Wi-Fi network, a 60 Hz power system, or otherwise;
  a communication device 302, such as possibly including a wireless antenna disposed to transmit or receive information using the power harvester 301, a clock circuit, or other elements used with communication devices;
  a computing device 303, such as possibly coupled wirelessly to the communication device 302, and possibly including a processor, memory or mass storage, a second power supply, or other elements used with computing devices;
  one or more sensors 304, such as possibly embedded in the contact lenses 300 or coupled to the computing device 303, and possibly including one or more of: wearer sensors 304a disposed to receive information about the wearer (or their current condition), ambient sensors 304b disposed to receive information about an environment near the wearer (or its current condition), or other sensors.

In one embodiment, the one or more sensors 304 can also include a magnetic (or magnetizable) ring, or a set of magnetic (or magnetizable) elements at the edge of the contact lenses 300. This can have the effect that when the wearer's gaze direction changes, the position of the contact lenses 300 also changes to match a vector from the retina through the pupil and iris. The computing device 303 can be disposed to detect the position of the contact lenses 300, such as using a capacitive sensor, a magnetometer, another electromagnetic device, or otherwise.

In one embodiment, the one or more sensors 304 can also include one or more outward-facing photovoltaic cells, or similar electronic elements, such as affixed to the contact lenses 300 or elsewhere on the eye, so as to become covered by the eyelid when the wearer blinks. Similarly, the one or more sensors 304 can also include one or more inward-facing photovoltaic cells, or similar electronic elements, such as affixed to the contact lenses 300 or elsewhere on the eye, so as to obtain an image of the retina, which will be blanked out when the wearer blinks. This can have the effect that the sensors 304 can determine a blink rate for the wearer without any complex elements selected to identify when a blink occurs or whether the blink is a complete blink (thus, not a partial blink).

Intra-Ocular Lenses

Similar to Panel 3A or 3B (described below), an intra-ocular lens (not shown) can be implanted in the wearer's eye, such as by replacing or augmenting the natural lens of the wearer's eye.

For example, the intra-ocular lens can be disposed to be static, such as by determining its shape at the time of implantation, or by causing the amount of refraction by the intra-ocular lens to be set by one or more fuses or other electronic components, the values of which can be set at the time of implantation.

For another example, the intra-ocular lens can be disposed to be alterable by the computing device 121, such as by causing the amount of refraction by the intra-ocular lens to be set by one or more fuses or other electronic components, the values of which can be altered by an electromagnetic signal from the computing device 121 or another device. Similar to the contact lenses 300, the intra-ocular lens can be powered by electromagnetic harvesting, or a related technique.

Multiple Active Regions

Panel 3A shows a conceptual drawing of example contact lenses having multiple active regions related to wearer view.

Similar to Panel 1A (FIG. 1), the contact lenses 300 can be used to correct vision on behalf of the wearer, enhance vision on behalf of the wearer, or otherwise. For example, similarly, the contact lenses 300 can correct for myopia, presbyopia, astigmatism, or other wearer vision artifacts. Also similarly, the contact lenses 300 can enhance vision can include a zoom feature disposed to present the wearer with a zoomed-in or zoomed-out view of the wearer's field of view (FOV), or can include other features disposed to present the wearer with other vision enhancements described in the Incorporated Disclosures, or otherwise.

Similar to Panel 1A (FIG. 1), the contact lenses 300 can include multiple lens regions 310, each disposed to correct vision or enhance vision on behalf of the wearer. For example, the multiple lens regions 310 can include a close-vision region 311, a mid-range vision region 312, a distant vision region 313, or otherwise. Also similarly, each lens region 310 can be individually controlled, such as by the computing device 303, or otherwise. This can have the effect that the wearer's vision can be corrected or enhanced in each region where the wearer might look.

As described with respect to Panel 1A (FIG. 1), when the wearer moves their head, the computing device 303 can determine, such as using an accelerometer or a gyroscope (which can be included with the sensors 304), a wearer's head movement. Similarly, the computing device 303 can also determine, such as using a dynamic eye gaze tracker (which can be included with the sensors 304), a gaze direction. Also similarly, this information can allow the computing device 303 to determine a distance of the object at which the wearer is intending to look; similarly, this information can allow the computing device 303 to determine whether the wearer is using their central vision or peripheral vision, and to control the correction or enhancement associated with one or more of the lens regions 310.

As described with respect to Panel 1A (FIG. 1), when the wearer shifts their gaze, the computing device 303 can determine, such as using a focal length detector (which can be included with the sensors 304), a distance to an object being viewed by the wearer. Similarly, this information can allow the computing device 303 to determine a distance of the object at which the wearer is intending to look. Also similarly, the computing device 303 can control the correction or enhancement associated with one or more of the lens regions 310. This can have the effect that the eyewear 100 adjusts its correction or enhancement to match the wearer's intended use thereof.

Multiple Active Pixels

Panel 3B shows a conceptual drawing of example contact lenses having multiple individual pixels related to wearer view.

Similar to Panel 1B (FIG. 1), the contact lenses 300 can include multiple lens pixels 320, each disposed to correct vision or enhance vision on behalf of the wearer. For example, similarly, each lens pixel 320 can include an individual region (such as the multiple lens regions 310, only typically smaller), disposed to provide distinct corrections or enhancements to vision in the region where the wearer's gaze direction intersects the lens pixel. Also similarly to the lens regions 310, each lens pixel 320 can be individually controlled, such as by the computing device 303, or otherwise. This can have the effect that the wearer's vision can be corrected or enhanced for each direction where the wearer might look.

Similar to Panel 1B (FIG. 1), the computing device 303 can associate a distinct set of lens pixels 320 for use as a separate one of the multiple lens regions 310. For example, the computing device 303 can control the prescription with respect to each such lens region 310 by controlling each of the lens pixels 320 associated with that particular lens region. Also similarly to the possibility of overlap of lens regions 310, a set of lens pixels 320 can be associated with more than one such lens region. This can have the effect that when the computing device 303 determines that the wearer is using a particular lens region 310, it can select the set of lens pixels associated with that lens region, even if those lens pixels are also associated with another lens region. Similar to overlap of lens regions 310, the intersection of multiple sets of lens pixels 320, or the union of multiple sets of lens pixels 320, as appropriate, can be invoked by the computing device 303, so as to provide the wearer with the correction or enhancement to match the wearer's intended user of the eyewear 100. As described with respect to Panel 1B (FIG. 1), when the computing device 303 can determine the wearer's intended user of the eyewear 100, and can determine the particular lens pixel 320 that the wearer's gaze direction passes through, the computing device can invoke only that one lens pixel, possibly updating the particular lens pixel to invoke as the wearer's gaze direction might change.

Similar to Panel 1B (FIG. 1), the set of lens pixels 320 associated with each such lens region 310 can be adjusted by the computing device 303. This can have the effect that the set of lens pixels 320 associated with each such lens region 310 can be altered from time to time.

Figure 4A:
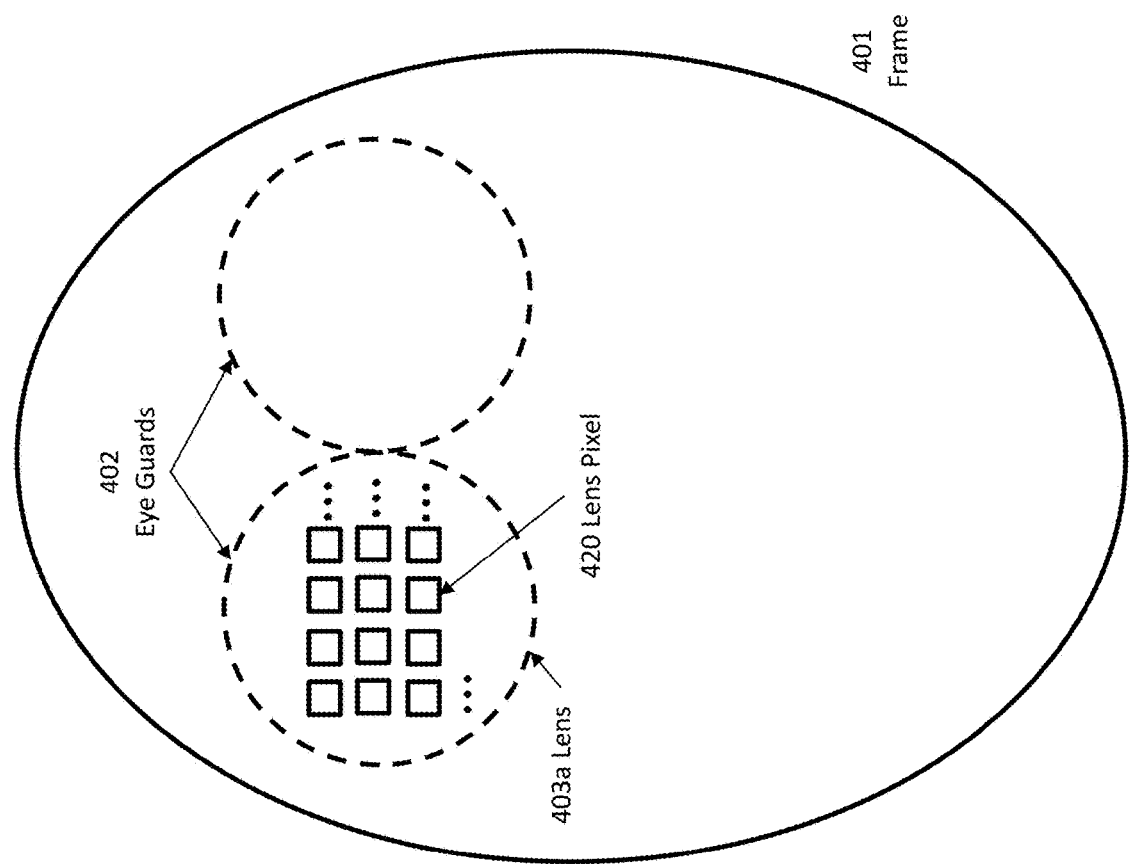
FIG. 4 (collectively including Panel 4A and 4B) shows a conceptual drawing of example eyewear including a facemask or helmet. Panel 4A shows a conceptual drawing of an example facemask or helmet having multiple active regions related to wearer view. Panel 4B shows a conceptual drawing of an example facemask or helmet having multiple individual pixels related to wearer view.

FIG. 4—Facemask or Helmet

FIG. 4 (collectively including Panel 4A and 4B) shows a conceptual drawing of example eyewear including a facemask or helmet. Panel 4A shows a conceptual drawing of an example facemask or helmet having multiple active regions related to wearer view. Panel 4B shows a conceptual drawing of an example facemask or helmet having multiple individual pixels related to wearer view.

In one embodiment, an example eyewear 100 can include a facemask or helmet 400 disposed for use by the wearer (not shown), including elements shown in the figure, such as one or more of:
- a frame 401, such as possibly including a headgear 401 (such as a front piece for a facemask, or a head guard for a helmet) or an eye guard 402;
- at least one lens 403, such as possibly a right lens 403a (shown in Panel 4A), or a left lens 403b (shown in Panel 4B), such as disposed in the eye guard 402 or integrated into the eye guard 402 as part of its solid form.

Similar to the eyewear 100 described with respect to FIG. 1, the frame 401 can enclose, or hold, one or more electronic elements shown in the figure, such as one or more of:
- a computing device 121 (FIG. 1), such as possibly including a processor, memory or mass storage, a power supply, a clock circuit, or other elements used with computing devices;

a communication device 122 (FIG. 1), such as possibly including a wireless or wired communicate element, a communication protocol stack, or other elements used with communication devices;

one or more sensors 123 (FIG. 1), such as possibly including one or more of: wearer sensors 123*a* (FIG. 1) disposed to receive information about the wearer (or their current condition), ambient sensors 123*b* (FIG. 1) disposed to receive information about an environment near the wearer (or its current condition), or other sensors.

As described with respect to the glasses 110 (FIG. 1) the one or more lenses 403, can be used to correct or enhance vision on behalf of the wearer, or otherwise. For example, the lenses 403 can be used to correct vision using one or more lens prescriptions associated therewith, disposed to correct for myopia, presbyopia, astigmatism, or other wearer vision artifacts. For another example, the lenses 403 can be used to enhance vision can include a zoom feature disposed to present the wearer with a zoomed-in or zoomed-out view of the wearer's field of view (FOV), or can include other features disposed to present the wearer with other vision enhancements described in the Incorporated Disclosures, or otherwise.

Multiple Active Regions

Panel 4A shows a conceptual drawing of an example facemask or helmet having multiple active regions related to wearer view.

Similar to Panel 1A (FIG. 1), the lenses 403 can be used to correct vision on behalf of the wearer, enhance vision on behalf of the wearer, or otherwise. For example, similarly, the lenses 403 can correct for myopia, presbyopia, astigmatism, or other wearer vision artifacts. Also similarly, the lenses 403 can enhance vision can include a zoom feature disposed to present the wearer with a zoomed-in or zoomed-out view of the wearer's field of view (FOV), or can include other features disposed to present the wearer with other vision enhancements described in the Incorporated Disclosures, or otherwise.

Similar to Panel 1A (FIG. 1), the lenses 403 can include multiple lens regions 410, each disposed to correct vision or enhance vision on behalf of the wearer. For example, the multiple lens regions 410 can include a close-vision region 411, a mid-range vision region 412, a distant vision region 413, or otherwise. Also similarly, each lens region 410 can be individually controlled, such as by the computing device 121, or otherwise. This can have the effect that the wearer's vision can be corrected or enhanced in each region where the wearer might look.

As described with respect to Panel 1A (FIG. 1), when the wearer moves their head, the computing device 121 can determine, such as using an accelerometer or a gyroscope (which can be included with the sensors 123), a wearer's head movement. Similarly, the computing device 121 can also determine, such as using a dynamic eye gaze tracker (which can be included with the sensors 123), a gaze direction. Also similarly, this information can allow the computing device 121 to determine a distance of the object at which the wearer is intending to look; similarly, this information can allow the computing device 121 to determine whether the wearer is using their central vision or peripheral vision, and to control the correction or enhancement associated with one or more of the lens regions 410.

As described with respect to Panel 1A (FIG. 1), when the wearer shifts their gaze, the computing device 121 can determine, such as using a focal length detector (which can be included with the sensors 123), a distance to an object being viewed by the wearer. Similarly, this information can allow the computing device 121 to determine a distance of the object at which the wearer is intending to look. Also similarly, the computing device 121 can control the correction or enhancement associated with one or more of the lens regions 410. This can have the effect that the facemask 400*a* or helmet 400*b* adjusts its correction or enhancement to match the wearer's intended use thereof.

Multiple Active Pixels

Panel 4B shows a conceptual drawing of an example facemask or helmet having multiple individual pixels related to wearer view.

Similar to Panel 1B (FIG. 1), the lenses 403 can include multiple lens pixels 420, each disposed to correct vision or enhance vision on behalf of the wearer. For example, similarly, each lens pixel 420 can include an individual region (such as the multiple lens regions 410, only typically smaller), disposed to provide distinct corrections or enhancements to vision in the region where the wearer's gaze direction intersects the lens pixel. Also similarly to the lens regions 410, each lens pixel 420 can be individually controlled, such as by the computing device 121, or otherwise. This can have the effect that the wearer's vision can be corrected or enhanced for each direction where the wearer might look.

Similar to Panel 1B (FIG. 1), the computing device 121 can associate a distinct set of lens pixels 420 for use as a separate one of the multiple lens regions 410. For example, the computing device 121 can control the prescription with respect to each such lens region 410 by controlling each of the lens pixels 420 associated with that particular lens region. Also similarly to the possibility of overlap of lens regions 410, a set of lens pixels 420 can be associated with more than one such lens region. This can have the effect that when the computing device 121 determines that the wearer is using a particular lens region 410, it can select the set of lens pixels associated with that lens region, even if those lens pixels are also associated with another lens region. Similar to overlap of lens regions 410, the intersection of multiple sets of lens pixels 420, or the union of multiple sets of lens pixels 420, as appropriate, can be invoked by the computing device 121, so as to provide the wearer with the correction or enhancement to match the wearer's intended user of the eyewear 100. As described with respect to Panel 1B (FIG. 1), when the computing device 121 can determine the wearer's intended user of the eyewear 100, and can determine the particular lens pixel 420 that the wearer's gaze direction passes through, the computing device can invoke only that one lens pixel, possibly updating the particular lens pixel to invoke as the wearer's gaze direction might change.

Similar to Panel 1B (FIG. 1), the set of lens pixels 420 associated with each such lens region 410 can be adjusted by the computing device 121. This can have the effect that the set of lens pixels 420 associated with each such lens region 410 can be altered from time to time.

FIG. 5—Scopes or Sights

FIG. 5 shows a conceptual drawing of example eyewear including one or more scopes or sights, including binoculars, microscopes, rifle scopes, spotting scopes, telescopes, analog or digital cameras, rangefinders, or otherwise.

In one embodiment, an example eyewear 100 can include elements shown in the figure, such as one or more scopes or sights, including binoculars, microscopes, rifle scopes, spotting scopes, telescopes, analog or digital cameras, rangefinders, or otherwise. In such cases, each scope or sight can include a frame 501 disposed to maintain at least one lens 502 in position for sighting, such as in a frame holding lenses suitable for long-distance magnification (such as when used with binoculars, microscopes, rifle scopes, spotting scopes, telescopes, or otherwise), or other functions.

Similar to the eyewear 100 described with respect to FIG. 1, the frame 501 can enclose, or hold, one or more electronic elements shown in the figure, such as one or more of: a computing device, a communication device, one or more sensors, or otherwise.

Also similar to the eyewear 100 described with respect to FIG. 1, the one or more lenses 502, can be used to correct or enhance vision on behalf of the wearer, or otherwise.

Also similar to the eyewear 100 described with respect to FIG. 1, the one or more lenses 502, can include multiple active regions (not shown), such as close-vision regions, mid-range vision regions, distant vision regions, central vision regions, peripheral vision regions, or otherwise. Also similarly, each lens region (not shown) can be individually controlled, such as by the computing device, or otherwise. This can have the effect that the wearer's vision can be corrected or enhanced in each region where the wearer might look.

Also similar to the eyewear 100 described with respect to FIG. 1, the one or more lenses 502, can include multiple active pixels (not shown), each possibly associated with one or more of the multiple active regions. Also similarly, the set of lens pixels associated with each such lens region can be adjusted by the computing device. This can have the effect that the set of lens pixels associated with each such lens region can be altered from time to time.

In one embodiment, an example eyewear 100 can include one or more scopes or sights, analog or digital cameras, or otherwise, disposed to view a scene from a distant location or from a different angle as would be seen by the wearer. For example, a motion picture camera can be mounted on a vehicle, such as a racing car or an aerobatic aircraft, with an output electromagnetic signal from the camera being transmitted to the eyewear 100 or injected into the wearer's field of vision (FOV). This can have the effect that the wearer would be able to use the eyewear 100 to see the image as provided by the scopes, cameras, or otherwise. In such cases, the wearer would be able to use the eyewear 100 to see an event, such as a sporting event, a dangerous event, or another event, without having to have line-of-sight on the objects or scene of the event.

FIG. 6—Nerve Sensors/Stimulators

FIG. 6 shows a conceptual drawing of example eyewear including one or more nerve sensors or stimulators.

In one embodiment, an example eyewear 600 can include one or more nerve sensors or stimulators, disposed to affect nerve signals on the optic nerve 601, in a vision section 602 of the brain, in another section of the brain, or otherwise. The nerve sensors or stimulators can include elements shown in the figure, such as one or more of:

- one or more electromagnetic sensors 610, disposed to receive electromagnetic signals from the optic nerve 601, the vision section 602 of the brain, another section of the brain, or otherwise;
- one or more electromagnetic stimulators 620, disposed to provide and insert electromagnetic signals into the optic nerve 601, into the vision section 602 of the brain, into another section of the brain, or otherwise;
- or otherwise.

For example, the electromagnetic sensors 610 can be disposed to receive electromagnetic signals from the optic nerve 601, to couple those electromagnetic signals, or processed variants thereof, to a computing device (not shown). In such cases, the electromagnetic sensors 610 can determine which signals from the optic nerve 601 are associated with which portions of an image viewed by the wearer. Similarly, the electromagnetic sensors 610 can be disposed to receive electromagnetic signals from the vision section of the brain, another section of the brain, or otherwise.

In such cases, a computing device (not shown) can compare electromagnetic signals from particular portions (not shown) of the optic nerve 601 with the wearer's experience of a viewed image (not shown). With information gleaned from the comparison, the computing device can determine an image viewed by the wearer in response to the electromagnetic signals from the optic nerve 601. Similarly, the computing device can compare reception of electromagnetic signals from particular portions of the vision section of the brain, from particular portions of another section of the brain, or otherwise.

In such cases, a computing device can compare electromagnetic signals injected into particular portions of the optic nerve 601 with the wearer's experience of a viewed image, such as an alteration of a natural viewed image. With information gleaned from the comparison, the computing device can determine how to make adjustments to a natural viewed image, such as in response to an augmented reality (AR) image or signal. Similarly, the computing device can compare injection of electromagnetic signals into particular portions of the vision section of the brain, into particular portions of another section of the brain, or otherwise.

It might occur that the electromagnetic signals associated with particular portions of the optic nerve 601, the vision section 602 of the brain, or another section of the brain, could be different for distinct wearers. In such cases, the computing device can determine an association of portions of the viewed image with portions of the optic nerve 601, the vision section 602 of the brain, or another section of the brain, or otherwise, for each individual wearer.

For another example, the electromagnetic sensors 610 can apply an electromagnetic field to the optic nerve 601, or to a visual portion of the brain, to encourage the wearer's eye to gaze in a selected direction. This can have the effect of ameliorating amblyopia ("lazy eye"), exotropia (misaligned eye or "wall eye"), and possibly other directional issues with respect to the eyes. This can also have the effect of encouraging the wearer to look at a particular area or object, such as a target; this can be useful with respect to police officers, military personnel, and in advertising.

Similarly, the electromagnetic sensors 610 can apply an electromagnetic field to the optic nerve 601, or to a visual portion of the brain, to encourage the wearer's pupil or iris to contract or to expand. This can have the effect that the wearer's eye is protected against excessive infalling light (such as sudden brightness or glare), or excessive infalling light of a particular color or frequency range (such as excessive blue or UV).

FIG. 7—Used with Display

FIG. 7 (collectively including Panel 7A and 7B) shows a conceptual drawing of eyewear used with an example display. Panel 7A shows a conceptual drawing of the example display disposed on or in a building or structure. Panel 7B shows a conceptual drawing of the example display disposed in a vehicle.

Eyewear Used with a Display

In one embodiment, multiple sets of eyewear 700 can be used with a display 701, such as an stationary display 701a (in or on a building or structure) or a moving display 701b (in or on a vehicle). For example, the display 701 can be disposed so as to be viewable by an audience, such as in a public arena. The display 701 can be operated at a refresh rate (frames per second or fields per second) higher than a rate desirable by viewers (such as a refresh rate of 120 Hz, 170 Hz, 240 Hz, 360 Hz, or otherwise), while each set of eyewear 700 can present to its wearer only a selected subset of the frames being presented by the display 701. This can have the effect that each wearer of a separate set of eyewear 700 can receive a separate subset of the frames being presented by the display 701, thus a separate (motion picture) presentation.

For example, the display 701 can be operated at a refresh rate four times (4×) or eight times (8×) an ordinary refresh rate for a motion picture presentation, thus providing a possibility of four separate motion picture presentations being displayed concurrently. In such cases, one such presentation can be associated with an ordinary motion picture, for which eyewear 700 is available to viewers at no extra cost or only a nominal extra cost;

one such presentation can be associated with a motion picture that is reserved for children or other sensitive viewers, such as a presentation that has been edited to remove one or more of: sex, violence, conflict, frightening images, other adult themes, or otherwise (such as a non-conflict version, a non-violent version, a "G"-rated version, a "PG"-rated version, an "R"-rated version, an "X"-rated version, of substantially the same motion picture);

one such presentation can be associated with a motion picture that has been edited to remove "triggering" images or scenes, such as images or scenes that have a substantial effect on wearers with epilepsy, PTSD, psychological sensitivities, images offensive to particular social groups, other triggering images or scenes, or otherwise;

one such presentation can be associated with a motion picture that is a "premium" version of the motion picture, such as a "director's cut", a version having additional story elements, a version having superior special effects, or otherwise;

or otherwise.

For example, the display 701 can be operated with two, three, or more different presentations, such as those different possibilities described above. A first presentation can include a "G"-rated version, having only "G"-rated scenes; a second "R"-rated presentation can include all the "G"-rated scenes plus other more explicit scenes; a third presentation can include all the "G"-rated scenes plus other more explicit scenes distinct from the "R"-rated presentation or in addition thereto. In such cases, wearers using "G"-rated eyewear 100 would see only the "G"-rated presentation, wearers using "R"-rated eyewear would see only the "R"-rated presentation, and wearers using "X"-rated eyewear would see only the "X"-rated presentation. However, at least some scenes can be shared between pairs of those presentations, and possibly some scenes can be shared among all those presentations.

After reading this Application, those skilled in the art would recognize that the display 701 can present a wide variety of different types of presentations, both including the possible presentations described above, as well as other possibilities. For example, the display 701 can be disposed to present a first version of a motion picture image in ordinary circumstances, or an alternative second version of the motion picture image in circumstances where legal restrictions limit the motion picture images allowed to be shown. This can have the effect that multiple versions of a motion picture image can be distributed, even when the unrestricted version would be banned or otherwise restricted in particular jurisdictions.

For another example, the display 701 can be operated at a refresh rate two times (2×) or four times (4×) an ordinary refresh rate for a motion picture presentation, thus providing a possibility of a three-dimensional (3D) motion picture image being displayed. In such cases, a set of eyewear 700 can be disposed to present selected frames to different ones of the wearer's eyes. The selected frames can differ slightly, such as with respect to point of view (POV). This can have the effect that that the wearer's brain can integrate the selected frames, with the wearer seeing a 3D image. For example, a 3D motion picture image can be presented to the wearer by interlacing whether the right lens is open, the left lens is open, both lenses are open, or neither lens is open. This also can have the effect that multiple separate 3D images can be provided to different wearers concurrently.

To present a 3D image, the selected frames can be distinguished by one or more of:

time division multiple access, with a portion of the selected frames, such as about half of them, are presented for a POV for the wearer's right eye and a portion are presented for a POV for the wearer's left eye;

color division multiple access, with the portion presented for the wearer's right eye being saturated by a first color (which is filtered by the eyewear's right lens) and the portion presented for the wearer's left eye being saturated by a second color (which is filtered by the eyewear's left lens);

polarization division multiple access, with the portion presented for the wearer's right eye being polarized in a first manner (such as polarized vertically or right-circularly polarized), which is filtered by the eyewear's right lens, and the portion presented for the wearer's left eye being polarized in a second manner (such as polarized horizontally or left-circularly polarized), which is filtered by the eyewear's left lens;

or otherwise.

Each of these techniques can have the effect that the wearer's brain integrates the selected frames into a 3D motion picture image.

For another example, the display 701 can be operated in response to movement by the wearer, such as with respect to a theme-park entertainment event or ride. In such cases, when the wearer enters a designated zone, such as within a tunnel or other location without natural light, the display 701 can switch from presenting an ordinary two-dimensional (2D) motion picture image to presenting a 3D motion picture image. Similarly, the display 701 can be operated in response to an ambient light level experienced by the wearer, such as with respect to a daytime or night-time event. In such cases, when the time changes from a daytime event to a night-time event, the display 701 can switch from presenting an ordinary two-dimensional (2D) motion picture image to presenting a 3D motion picture image.

Stationary Display

Panel 7A shows a conceptual drawing of the example display disposed in or on a building or structure.

As shown in the figure, the display 701 can be mounted or projected in or on a surface of a building or structure 710, such as a movie theatre screen, an external or internal wall 711 of a building, on a temporary backdrop, on a fog for laser shows or other picture shows, onto a water surface, or otherwise. In such cases, an audience disposed to view the presentation can use eyewear 700 to obtain an enhanced, or otherwise edited, motion picture image.

Moving Display

Panel 7B shows a conceptual drawing of the example display disposed in or on a vehicle.

As shown in the figure, the display 701 can be mounted or projected in or on a surface of a vehicle 720, such as an external window (which could possibly be used for advertising), an internal display (which could possibly be used for entertainment), a windshield (which could possibly be used for a heads-up display, or "HUD", for a driver or navigator). In such cases, a driver or navigator can obtain information with respect to manipulating the vehicle, passengers can obtain information with respect to entertainment or travel, or otherwise.

Alternatively, an audience disposed to view the vehicle can use eyewear 700 to obtain an enhanced, or otherwise edited, motion picture image. This can have the effect that the vehicle can provide advertising or other information to the audience. For example, the vehicle can include a blimp or other lighter-thanair aircraft, onto which a motion picture image is displayed, similar to the display 701 described with respect to Panel 7A. An audience, such as a set of people attending a sports event, can view the vehicle 720 and each obtain information selected by their individual eyewear.

The vehicle can include an internal panel 702, such as (for an automobile) a divider between the driver's and the passengers' compartment, onto which a motion picture image is displayed, similar to the display 701 described with respect to Panel 7A. The passengers can view the display 701 and each see a motion picture selected by their individual eyewear. This can have the effect that multiple passengers can different motion pictures at full size, even though only one such display 701 is available for viewing.

FIG. 8—Hybrid Personalization

FIG. 8 shows a conceptual drawing of an example eyewear used to provide hybrid personalization.

An example eyewear 800 can include one or more elements as shown in the figure, including at least

- one or more lenses 810, such as lenses mounted on a frame, or such as contact lenses disposed for wearing by a user (not shown);
- one or more regions 820 disposed on at least one lens, such as a close-vision region 821, disposed to provide distinct corrections or enhancements to vision in a region where the wearer is looking at a close object, or a distant vision region 822, disposed to provide distinct corrections or enhancements to vision in a region where the wearer is looking at a distant object.

As shown in the figure, the close-vision region 821 can occupy a location through which the user will look when the user is gazing at a relatively close object, such as a book, a computer monitor, a smartphone or other mobile device, or otherwise. Similarly, the distant vision region 822 can occupy a location through which the user will look when the user is gazing at a relatively distant object, such as across or down a street, through a window, or otherwise.

Alternatively, the lenses 810 can include regions in addition to or in lieu of the close-vision region 821 or the distant vision region 822, such as a mid-range region (not shown) disposed to provide distinct corrections or enhancements to vision in a region where the wearer is looking at a mid-range object. For example, the mid-range region can be disposed to occupy a location through which the user would look when the user is gazing at a relatively mid-range object, such as an object in the same indoor room, a person with whom the user is speaking, or otherwise.

Urging the User to Use an Appropriate Region

The one or more regions 820 can combine distinct corrections or enhancements to vision, in combination with one or more other techniques to urge the user to direct their gaze in a direction through those locations when gazing at an object at an associated distance. For example, when the user gazes at an object at a close distance, the one or more regions 820 can be disposed to urge the user to look through the close-vision region 821. Similarly, when the user gazes at an object at a close distance, the one or more regions 820 can be disposed to urge the user to look through the close-vision region 821.

In one embodiment, the one or more regions 820 can each include one or more techniques to urge the user to direct their gaze appropriately. For example, the eyewear 800 can determine when the user's gaze is directed at a close distance, (A) such as by determining the user's gaze direction, and using object recognition to determine an object at which the user is looking; (B) such as by using pupil width or stereoscopy to determine a distance at which the user's eyes are focusing; or otherwise.

Having determined a distance at which the user's gaze is focused, the eyewear 800 can determine which one of the one or more regions 820 is best suited for the correction or enhancement of the user's vision when focusing at that distance. For example, when the user gazes at an object at a close distance, the one or more regions 820 can be disposed to urge the user to look through the close-vision region 821.

In one embodiment, the eyewear 800 can be disposed to urge the user, such as under the control of a computing device, an electronic circuit, or otherwise, to look through a selected region 820 by one or more of:

- shading other unselected regions 820, so as to discourage the user from looking through the unselected regions 820;
- altering one or more chromatic responses of the unselected regions 820, so as to discourage the user from looking through the unselected regions 820, or so as to emphasize to the user that the unselected regions 820 are discouraged;
- altering one or more prismatic responses of the unselected regions 820, so as to alter the field of view (FOV) of the user when looking through the unselected regions 820, such as to direct that FOV to one or more objects appropriate to the unselected regions 820;
- or otherwise.

In one embodiment, the eyewear 800 can include one or more regions 820 disposed for close-order vision, such as a close-vision region that provides +1 diopter (or another adjustment for correction of vision) when the user is gazing at an object disposed at a relatively close location. Such a close-vision region 821 is sometimes disposed for reading or otherwise examining close-order objects and is typically disposed to correct for the user's ability to view objects at close range. Similarly, the eyewear 800 can include one or more regions 820 disposed for relatively distant vision, such as a distant region that provides+0 diopters (or another adjustment for correction of vision) when the user is gazing at an object disposed at a relatively distant location. Such a distant region 822 is sometimes disposed for examining distant objects (that is, other than close-order objects) and is typically disposed to correct for the user's ability to view objects at ranges other than close range.

Hybrid Alteration of Unselected Regions

In such cases, the eyewear 800 can alternatively apply a different hybrid alteration to the unselected region 820, such as a chromatic alteration, a prismatic alteration, a polarization alteration, or otherwise.

(Shading/Inverse-Shading)

In such cases, when the eyewear 800 determines that the user is gazing at a close-range object, the eyewear 800 can shade the distant region 822 (or inverse-shade the close-order region 821), so as to encourage the user to look through the close-order region 821. For example, the eyewear 800 can include a shading element disposed to shade the unselected region (that is, the distant region 822) or inverse-shade the selected region (that is, the close-order region 821). This can have the effect that the user is encouraged to look through the close-order region 821. When the unselected region 820 is 100% shaded, that is, it is made completely dark or otherwise opaque, the user can be required to look through the selected region to be able to see, thus would be required to use the selected region.

Thus, when the user's gaze is directed to a close object, the eyewear 800 can require the user to use the close-order region 821 to view that object. Similarly, when the user's gaze is directed to a distant object, the eyewear 800 can require the user to use the distant region 822 to view that object. Similar principles apply to mid-range objects, to objects in an area of the user's peripheral vision, to objects that are partially obscured in the user's field of view (FOV), or otherwise.

In one embodiment, the eyewear 800 can apply shading/inverse-shading by polarization of the selected region 820 or the unselected region 820. For example, the eyewear 800 can apply shading by polarizing the unselected region 820 so as to remove much of its luminance; this can have the effect that the unselected region 820 can appear less bright than the selected region 820, thus encouraging the user to look through the selected region 820. For another example, the eyewear 800 can apply shading by polarizing the selected region 820 so as to remove glare or excessive light; this can have the effect that the selected region 820 can appear without glare or otherwise undisturbed by visual artifacts, thus (again) encouraging the user to look through the selected region 820.

(Chromatic Alteration)

For example, the eyewear 800 can apply a first chromatic alteration to the unselected region 820, such as by altering colors in the unselected region 820 to appear black-and-white to the user. This can have the effect that the user would immediately see that the unselected region 820 was disfavored, thus that the user was encouraged to use the selected region 820. However, the user would still be able to use the disfavored unselected region 820, only without color resolution.

For another example, the eyewear 800 can apply a second chromatic alteration to the unselected region 820, such as by altering colors in the unselected region 820 to remove (or to enhance) one or more colors from the color gamut available to the user when looking through the unselected region. For example, the eyewear 800 can filter colors in the unselected region 820 so as to remove blue frequencies from the unselected region 820. This can have the effect that the user would see colors in the unselected region 820 as substantially skewed toward the red end of the visible spectrum, possibly thus appearing more orange in color, and providing the user with a clear hint that unselected region 820 is disapproved by the eyewear 800.

(Prismatic Alteration)

For another example, the eyewear 800 can apply a prismatic alteration to one or more regions 820, such as by altering a direction of view through those regions 820 to direct the user's view toward an object at the distance associated with those regions 820. In such cases, the eyewear 800 can direct the user's view through those regions 820 toward an object at the appropriate distance. In such cases, when the user has eyewear 800 with both a close-order region 821 and a distant region 822, the eyewear 800 can use a prismatic effect to cause the user to see, when the user looks through the close-order region 821, a book, smartphone or other mobile device, or other near object that the user would generally look down to see. This could apply even if the user's field of view (FOV) through the close-order region 821 was not directed at the near object. Similarly, the eyewear 800 can use a prismatic effect to cause the user to see, when the user looks through the distant region 822, an object or FOV associated with a relatively distant view.

For another example, the eyewear 800 can apply a prismatic alteration to one or more regions 820, such as by altering a direction of view through those regions 820 associated with the user's peripheral vision. In such cases, the eyewear 800 can direct the user's view through those regions 820 toward an object otherwise appearing in the user's peripheral FOV, where the user's vision can be relatively imprecise, to cause that object to appear in the user's central FOV, where the user's vision can have better accuracy. This can have the effect that regions 820 ordinarily associated with peripheral vision can be directed toward the user's central vision, allowing the user to better perceive peripheral regions when appropriate.

Multiple Lenses and Hybrid Personalization

In one embodiment, the eyewear 800 can include multiple lenses to provide hybrid personalization. A first lens 831 can provide for correction or enhancement of the user's vision, while a second lens 832, overlaying at least a part of the first lens, can provide for hybrid personalization of the first lens. For example, the second lens 832 can include a hybrid element, such as having electronically induced shading, or inverse-shading, electronically induced chromatic alteration, electronically induced prismatic alteration, or otherwise. The hybrid element can be responsive to a programmable computing device. In such cases, the programmable computing device can be responsive to a sensor responsive to infalling light, a sensor responsive to the user's medical or other condition, a sensor responsive to a user input, or otherwise.

Alternatively, the hybrid element can include a device responsive to the infalling light itself, such as a chemical or other device. The response to infalling light can be in response to a heat or thermal effect thereof, to an amount of ultraviolet (UV), to an electric or electromagnetic field thereof, or otherwise. In such cases, the hybrid element can be responsive to infalling luminance to chemically cause shading or chromatic alteration, such as performed by sunglasses responsive to UV or other luminance. Or, in such cases, the hybrid element can be responsive to infalling luminance to polarize the infalling light, with the effect that shading can be performed, such as performed by polarizing sunglasses.

In one embodiment, the eyewear 800 can include, between the first lens 831 and the second lens 832, an electronic transmitter 840, such as a microwave transmitter, disposed to receive energy from the infalling light or from a voltage differential between the first lens and the second lens. The electronic transmitter can include a power harvester 841, such as further described herein, so as to provide power to the transmitter. In such cases, the electronic transmitter can be disposed to send information to a computer device or other remote device 842, such as for processing, for reporting on the status of the eyewear 800 or the user, for controlling the eyewear or the hybrid element thereof, or otherwise.

In one embodiment, the eyewear 800 can include, in response to the first lens 831 or the second lens 832, or the electronic transmitter, a circuit 850 disposed to adjust one or more of: the first lens, the second lens, the electronic transmitter, or another aspect of the eyewear. The circuit 850 can be coupled to and responsive to the computing device or other remote device 842, such as a device on the eyewear 800, remotely coupleable to the eyewear, or otherwise.

For example, the eyewear 800 can adjust a correction or enhancement of the user's eyesight (such as using the first lens 831 or the second lens 832) in response to the circuit 850. This can have the effect that the eyewear 800 can respond to sensory information from the user, from user input, from the ambient environment, from one or more input images available at or near the user, from one or more objects near the eyewear, from predictive information available from a computing device, or otherwise. In such cases, the eyewear 800 can adjust the correction or enhancement of the user's eyesight in response to an object at which the user is looking, in response to a user input, in response to an ambient environment (such as an ambient light level), in response to a medical condition or other condition of the user, or otherwise.

Emulation of User's Field of View

For another example, the eyewear 800 can include a camera or other input element 860, such as a CCD, an infrared (IR) or ultraviolet (UV) receiver, an electromagnetic antenna, or otherwise, disposed to receive one or more inputs from a field of view (FOV) associated with the user's eye(s). For example, a camera or other input element 860 disposed to receive an image similar to the user's eye can be coupled to the computing device or other remote device 842 and customized to have a substantially identical response to the input image as the user's eye(s). In such cases, the eyewear 800 can be controlled by the computing device or other remote device 842, coupled to the camera. This can have the effect that the correction or enhancement applied by the eyewear 800 can be automatically adjusted in response to the image seen by the camera or other input element 860.

(Shading Alteration)

In one such case, the eyewear 800 can determine an amount of shading required in response to an amount of light infalling on the camera or other input element 860, representing the amount of light infalling on the user's eye. In response thereto, the eyewear 800 can cause one or more lens regions 820 to be shaded, or to be shaded or inverse-shaded with respect to an object being viewed by the user, so as to optimize a clarity of the user's view.

In another such case, the eyewear 800 can determine whether there is an excess of ultraviolet (UV) light infalling from the environment. When this occurs, the eyewear 800 can perform shading with respect to the excess UV light, inverse-shading with respect to a selected object being viewed by the user, or other actions to ameliorate the possible effects of excess UV light on the user. For example, some users might be sensitive to excess UV light, such as possibly being subject to migraines, photophobia, or other neurological conditions in response thereto.

(Color Alteration)

In another such case, the eyewear 800 can determine an amount of infalling light in each visible frequency range and compare the infalling light with the user's ability to distinguish each color. If the user has any color blindness, either complete color blindness or a more common form such as red-green color blindness, the eyewear 800 can adjust the colors presented to the user's eye in response to one or more of:

optimizing clarity of the user's field of view (FOV) after accounting for the user's color blindness;

presenting a false color image of the user's FOV so as to alert the user with respect to the presence of colors the user is not able, or not easily able, to distinguish;

or otherwise.

For example, when the user has red-green color blindness, the eyewear 800 can present additional brightness over and above the actual infalling light in a selected set of frequencies (such as in blue) to outline red areas of the image and other additional brightness over and above the actual infalling light (such as in yellow) to outline green areas of the image. This can have the effect that the user can see brightly outlined those areas that would otherwise appear grey due to color blindness.

Alternatively, when the user has red-green color blindness, the eyewear 800 can present additional brightness over and above the actual infalling light in a selected set of frequencies (such as in blue) to saturate red areas of the image, so as to allow the user to distinguish red areas of the image from green areas of the image, despite the user's natural color blindness.

Alternatively, when the user has red-green color blindness, the eyewear 800 can present grey areas of the image to indicate red and green areas of the image, along with chyrons or other markers to indicate whether the greyed-out areas should be red or green. When the user has a different type of color blindness, the eyewear 800 can present other types of indicators to the user.

In another such case, the eyewear 800 can determine a type of weather in the user's field of view (FOV), such as by using the outward-facing camera or other input element 860, or such as by receiving a weather report from a remote device (not shown) in response to a GPS device or other location device (not shown). For example, when the weather is very sunny, the eyewear 800 can perform shading or color alteration, so as to emulate sunglasses or otherwise protect the user's eyes from excess sunline, and so as to allow the user to see more clearly in that environment. For another example, when the weather is very cloudy, hazy, or otherwise dark, the eyewear 800 can perform inverse-shading or color alteration, so as to allow the user to see more clearly in that environment.

(Focus Alteration)

In another such case, the eyewear 800 can determine whether the image being presented to the user's eye is in focus. The eyewear 800 can adjust the correction to the image made by one or more lens regions 820 so as to optimize clarity of the image. This can have the effect that unclear images are adjusted by the eyewear 800 so as to present them clearly to the user's eye. In such cases, the eyewear 800 can perform an autofocus function on the image, such as in response to the gaze direction and focal length of the user's eye; in response to object recognition of an object being viewed by the user; in response to motion blur, object blur, or visual noise with respect to an object interacting with its background, or otherwise. In such cases, the user can In another such case, the eyewear 800 can determine a moving object being viewed by the user. For example, when the user is a participant or a view of a sporting event, the moving object can be a baseball, golf ball, or other sporting equipment. For another example, when the user is a law enforcement officer or military personnel, or is engaged in a search-and-rescue operation, the moving object can be a distant person. The eyewear 800 can determine the location of the object in the user's field of view (FOV), such as using an artificial intelligence (AI) or machine learning (ML) technique, as further described herein with respect to other figures. Having identified the object, the eyewear 800 can determine a distance to the object and can alter the presentation of the object to the user so as to enhance the user's depth perception thereof.

User Control of Hybrid Personalization

In one embodiment, the eyewear 800 can receive user input, so as to affect the hybrid personalization. For example, when the user is viewing a selected object or a selected portion of the user's field of view (FOV), the user can perform eye gestures, facial gestures, hand or finger gestures, or other bodily movements, so as to provide inputs to the eyewear 800 that the user desires one or more selected actions by the eyewear.

(Gestures)

For example, the eye gestures can include one or more eye blinks, eye rolls or other pupillary movements, movements of gaze direction, or otherwise, or combinations thereof. The user can blink twice or more in multiple succession, can look up, look down, look right, look left, or in another selected direction, one or more in succession. In some examples: the user can look left and blink twice; the user can look upward-left three times in succession; the user can look upward-left, upward-right, and then down; or otherwise.

For example, the facial gestures can include one or more squints, frowns or smiles, nose wiggles, chin movements, teeth clenching, or otherwise. The user can combine one or more facial gestures, can combine one or more facial gestures with one or more eye gestures, or otherwise.

For example, the hand or finger gestures can include any type of hand or finger movement or positioning, and can be presented within the user's field of view;
within an image capture region of the eyewear 800;
within an image capture region of an auxiliary outward-facing camera, such as one mounted on a side or rear of the eyewear 800;
or otherwise. The eyewear 800 can determine that the user has performed one or more hand or finger gestures, and which one, using an artificial intelligence (AI) or machine learning (ML) technique. The hand or finger gestures can be combined with any other gestures available to the user.

(Other User Inputs)

The user can also provide other inputs to the eyewear 800 using a touch control or other input device 870. For example, the input device 870 can include a button, capacitive sensor, motion sensor, slide, switch, touchpad, another device responsive to touch or to proximity of the user's hand or fingers, or otherwise. When the user activates the input device 870, the eyewear 800 can determine that the user desires one or more selected actions by the eyewear. The selected actions can be predetermined when the eyewear 800 is configured or can be altered by the user.

The user can also provide other inputs to the eyewear 800 using a Bluetooth™ control, smartphone, smart watch, or another mobile device. For example, the user can invoke an application (sometimes called an "app") on a smartphone or other mobile device, which can communicate with the computing device to provide inputs to, or otherwise control, the eyewear 800.

FIG. 9—Dynamic Adjustment of Polarization

FIG. 9 shows a conceptual drawing of an example eyewear used to provide dynamic adjustment of polarization.

An example eyewear 900 can include one or more elements as shown in the figure, including at least one or more lenses 910, such as lenses mounted on a frame, or such as contact lenses disposed for wearing by a user (not shown);
one or more regions 920 disposed on at least one lens, the regions being controllable to adjust polarization in real time;
one or more polarizers 930 disposed on at least one region, the polarizers being controllable to adjust the polarization of their associated regions;
one or more sensors 940 disposed to determine an angle of the lenses or the regions, the sensors being coupled to the polarizers;
(optionally) one or more processors 950 disposed to determine a difference between (A) the polarization provided by the polarizers, and (B) a desired polarization.

As further described herein with respect to other and further embodiments, the one or more regions 920 can cover an entire lens 910. In such cases, when polarization of a region 920 is adjusted, the polarization of the entire lens 910 can be adjusted.

As further described herein with respect to other and further embodiments, the one or more regions 920 can each cover a section of an entire lens 910 defined by a portion of the wearer's field of view (FOV), such as a close-vision region, a distant vision region, or a mid-range vision region. Alternatively, the portion of the wearer's FOV can include a central region of vision or a peripheral region of vision.

As further described herein with respect to other and further embodiments, the one or more regions 920 can each cover a section of an entire lens 910 defined by an individual small portion of the wearer's field of view (FOV), such as an individual pixel. One or more such pixels can be combined to define a larger region. As further described herein, these larger regions can include sets of pixels that are defined statically or dynamically.

As further described herein with respect to other and further embodiments, each such region 920 can be dynamically controlled, such as in real time, to adjust the polarization thereof. For example, each such region 920 can include an electrically controlled polarizer disposed to alter an angle of polarization in real time.

In one embodiment, the one or more polarizers 930 can be adjusted in real time in response to changes in a relative angle between the wearer's eye and a direction of infalling glare. When light is reflected from a surface, it can become polarized in a plane. For example, this can apply when the reflective surface includes a body of water or a solid object such as glass or metal. When the polarizers 930 are adjusted in response to the polarization plane of the infalling glare, this can have the effect that glare infalling to the wearer's eye can be mitigated. Accordingly, the polarizers 930 can be adjusted so as to reduce or eliminate the amount of glare allowed to reach the wearer's eye.

In one embodiment, the polarizers 930 can be electrically controlled to make desired adjustments. When the polarizing plane is misaligned with respect to infalling glare, the polarizers 930 can be adjusted so that the alignment is improved. For example, when it is desired that the polarizers 930 are aligned at right angles to the plane of the infalling glare, it might occur, due to the wearer's motion or due to a change in angle or direction of the infalling glare, that the polarizers 930 are no longer aligned properly. In such cases, the plane of personalization can be adjusted to a proper angle.

In one embodiment, the polarizers 930 can be electrically controlled to alter the plane of personalization. One or more sensors 940 can determine an angle at which the glare is being viewed. One or more processors 950 can determine a difference between (A) the angle at which the glare is being viewed and (B) a desired angle. The processors 950 can generate an electronic control signal (not shown), such as at an output pin of a processor chip or circuit board (not shown). The electronic control signal can be coupled to one or more of the electrically controlled polarizers 930. This can have the effect of altering one or more of the polarizer's plane of personalization.

In one embodiment, the one or more sensors 940 can include one or more gyroscope or magnetometers, another device suitable to determine a relative orientation of the eyewear with respect to the infalling glare, or a combination thereof. For example, one or more sensors 940 can be mounted on the eyewear, such as on a frame disposed to hold the lenses 910 in place. In such cases, a single sensor 940 can be mounted on the frame near one of the lenses 910, or a pair of sensors can be mounted on the frame near each one of a pair of lenses. Alternatively, a set of sensors 940 can be mounted about one of the lenses 910, such as in a circle or ellipse surrounding a lens, or two sets of sensors can be mounted about two of the lenses, such as in a circle or ellipse associated with and surrounding each lens.

In one embodiment, when the wearer moves their head, the frame can alter their angle with respect to the infalling glare. This can have the effect that the sensors 940 determine that the angle of the wearer's lenses 910 with respect to a reference, and thus with respect to the plane of the infalling glare, has changed. Thus, the polarization angle of the lenses 910 should be changed to maintain the effectiveness of glare reduction.

Alternatively, the one or more sensors 940 can be disposed within the eyewear (such as mounted between the wearer's eye and a lens 910) and can include a sensor disposed to measure an amount of infalling light. For example, the sensor 940 can include a light sensor, an infrared (IR) sensor, a camera, or another device suitable to determine an amount of infalling glare. When so disposed, the sensor 940 can measure an amount of infalling glare at one or more polarization angles, in response to which a processor 950 in the eyewear can select an optimum polarization angle at which to minimize the amount of infalling glare.

In one embodiment, when the one or more processors 950 determine the difference between the two specified angles, this can have the effect of determining a difference between (A) the polarization provided by the polarizers 930, and (B) a desired polarization. The one or more processors 950 can determine this difference periodically, aperiodically, or otherwise from time to time, in real time. This can have the effect that the polarization provided by the polarizers 930 can be adjusted in real time to maintain a desired polarization, such as an optimum polarization for minimizing an amount of infalling glare. For example, when the actual polarization differs from the desired polarization, the one or more sensors 940 can detect that infalling glare is more than a measured minimum amount, and the one or more processors 950 can determine an appropriate correction. This can have the effect that the actual polarization is maintained substantially equal to the desired polarization, or at least close enough that the wearer does not notice a difference.

Figure 10:
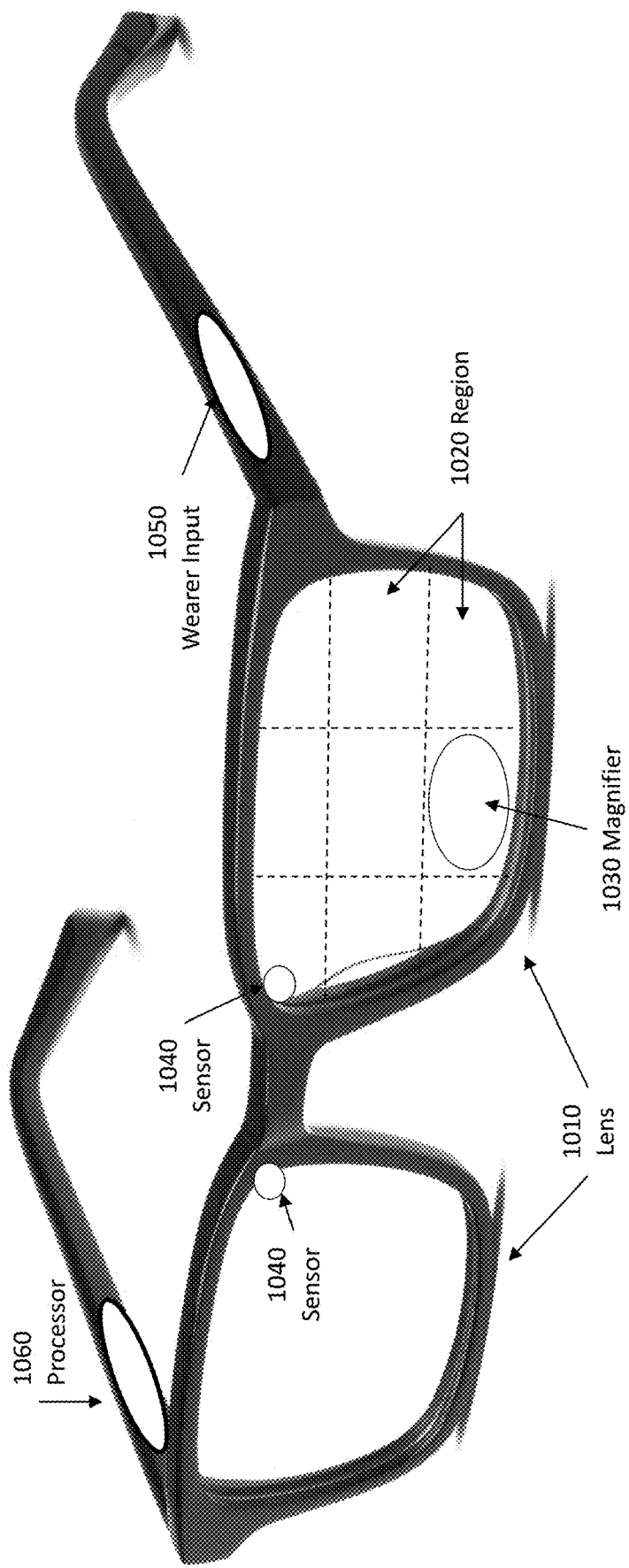
FIG. 10 shows a conceptual drawing of an example eyewear used to provide dynamic adjustment of magnification.

FIG. 10—Adjustment of Magnification

FIG. 10 shows a conceptual drawing of an example eyewear used to provide dynamic adjustment of magnification.

An example eyewear 1000 can include one or more elements as shown in the figure, including at least—one or more lenses 1010, such as lenses mounted on a frame, or such as contact lenses disposed for wearing by a user (not shown);

one or more regions 1020 disposed on at least one lens, the regions being controllable to adjust polarization in real time;

one or more magnifiers 1030 disposed on at least one region, the magnifiers being controllable to adjust the magnification of their associated regions;

one or more sensors 1040 disposed to determine a gaze direction and/or focal length of the wearer's eye with respect to the regions, the sensors being coupled to the magnifiers;

one or more wearer inputs 1050 disposed to receive one or more input controls from the wearer, such as an eye gesture, a touch input, or otherwise;

(optionally) one or more processors 1060 coupled to the sensors, the wearer inputs, a combination thereof, or otherwise.

As further described herein with respect to other and further embodiments, the one or more regions 1020 can cover an entire lens 1010. In such cases, when magnification of a region 1020 is adjusted, the magnification of the entire lens 1010 can be adjusted.

As further described herein with respect to other and further embodiments, the one or more regions 1020 can each cover a section of an entire lens 1010 defined by a portion of the wearer's field of view (FOV), such as a close-vision region, a distant vision region, or a mid-range vision region. Alternatively, the portion of the wearer's FOV can include a central region of vision or a peripheral region of vision.

As further described herein with respect to other and further embodiments, the one or more regions 1020 can each cover a section of an entire lens 1010 defined by an individual small portion of the wearer's field of view (FOV), such as an individual pixel. One or more such pixels can be combined to define a larger region. As further described herein, these larger regions can include sets of pixels that are defined statically or dynamically.

As further described herein with respect to other and further embodiments, each such region 1020 can be dynamically controlled, such as in real time, to adjust the magnification thereof. For example, each such region 1020 can include an electrically controlled magnifier disposed to alter an amount of magnification, such as in real time.

In one embodiment, the one or more magnifiers 1030 can be adjusted (such as in real time) in response to one or more of (A) changes in gaze direction and/or focal length of the wearer's eye, (B) inputs from the wearer, (C) object recognition, or otherwise. For example, when the wearer's gaze is directed to a selected object, the eyewear can adjust its magnification with respect to the selected object so as to make that object easier for the wearer to distinguish. This might involve increasing or decreasing an amount of magnification of a portion of the wearer's field of view (FOV) in which that object is found.

For example, this can apply when the wearer directs their gaze to a particular drawing, symbol, or word on a display (whether a printed page, a physical sign, a computer display, a smartphone or mobile device display, or a heads-up display). Alternatively, this can apply when the wearer directs their gaze to a particular object or person (whether nearby or distant). When the magnifiers 1030 are adjusted in response to selection of a particular object, that object can be made more easily visible to the wearer.

For another example, this can apply when the wearer desires to apply a binocular effect to their field of view (FOV), such as when the wearer desires to see a distant object more clearly. This can also apply when the wearer desires to see a distant object at a larger magnification, such as when that distant object occupies only a small portion of the wearer's FOV.

For another example, this can also apply when the eyewear attempts to draw the wearer's attention to a particular object, such as an object or person that the eyewear has recognized as of interest to the wearer. In such cases, the eyewear can draw the wearer's attention to the object in one or more of

- highlighting the object/person using shading or inverse-shading;
- highlighting the object/person using color, outlining, artificial phosphorescence (such as by emphasizing the color of the object/person, or altering the color of the object/person to increase contrast with its/their background);
- magnifying the object/person with respect to its/their surroundings;
- magnifying the region in the wearer's FOV with respect to the object/person;
- or otherwise.

In one embodiment, the magnifiers 1030 can be electrically controlled to make desired adjustments, such as to increase/decrease the amount of magnification. For example, the one or more sensors 1040 can determine one or more of (A) a gaze direction and/or focal length by the wearer, (B) one or more inputs by the wearer, (C) one or more circumstances statistically correlated or otherwise corresponding to circumstances in which the wearer desires an increase/decrease in the amount of magnification, such as when a particular object or person is recognized, or (D) other circumstances in which an increase/decrease in the amount of magnification is desirable. In response thereto, the processors 1060 can generate an electronic control signal (not shown), such as at an output pin of a processor chip or circuit board (not shown). The electronic control signal can be coupled to one or more of the electrically controlled magnifiers 1030. This can have the effect of altering an amount of magnification.

In one embodiment, the one or more sensors 1040 can be disposed within the eyewear (such as mounted between the wearer's eye and a lens 1010) and can include a sensor disposed to measure a gaze direction and/or a focal length by the wearer's eye. For example, the sensor 1040 can include an infrared (IR) sensor or a camera directed at the wearer's eye (such as their pupil), or another device suitable to determine gaze direction and/or focal length. When so disposed, the sensor 1040 can determine an object the wearer's gaze is directed to. In response to this information, the processor 1060 can select an optimum amount of magnification to maximize the visibility of the object.

Alternatively, the one or more sensors 1040 can be disposed on the eyewear (such as mounted on an externally accessible surface) and can include touchable surface disposed to receive an input by the wearer. For example, the sensor 1040 can include a button, a capacitive touch sensor, a slider, a proximity sensor, a voice input, or otherwise, disposed to detect when the wearer provides an input indicating the wearer's desire to increase/decrease magnification. When so disposed, the sensor 1040 can determine that the wearer desires to increase/decrease an amount of magnification of the eyewear. In response to this information, the processors 1060 can increase/decrease the amount of magnification as directed by the wearer.

Alternatively, the one or more sensors 1040 can be disposed on the eyewear, such as mounted on a forward-looking camera directed at the wearer's field of view (FOV). In such cases, the sensors 1040 can be disposed to provide information from which the processors 1060 can determine an object or person in the wearer's FOV. In response to this information, the processors 1060 can increase/decrease the amount of magnification so as to make the detected object or person more visible to the wearer.

Alternatively, the processors 1060 can be disposed to receive information from one or more sensors 1040 and can combine that information so as to detect one or more circumstances in which the wearer has statistically desired a change in an amount of magnification. In response to this information, the processors 1060 can determine a reliability of whether or not the wearer would desire a change in an amount of magnification. When the processors 1060 determine a sufficient degree of confidence that the wearer would desire a change in an amount of magnification, the processors can increase/decrease the amount of magnification so as to conform to the wearer's predicted desire.

In one embodiment, when the processors 1060 determine that the amount of magnification should be changed, this can have the effect of making one or more images or objects in the wearer's field of view (FOV) more visible to the wearer. The one or more processors 1060 can determine whether to make such changes periodically, aperiodically, or otherwise from time to time, in real time or otherwise.

FIG. 11—Dynamic Adjustment of Reflection

FIG. 11 shows a conceptual drawing of an example eyewear used to provide dynamic adjustment with respect to reflection and partial reflection.

An example eyewear 1100 can include one or more elements as shown in the figure, including at least

- one or more lenses 1110, such as lenses mounted on a frame;
- one or more mirrors 1120 disposed to provide a reflective effect, so as to allow the wearer (not shown) to see at an angle not ordinarily available;
- one or more sensors 1130 disposed to determine a gaze direction and/or focal length of the wearer's eye with respect to the mirrors, the sensors being coupled to the mirrors;
- one or more wearer inputs 1140 disposed to receive one or more input controls from the wearer, such as an eye gesture, a touch input, or otherwise;
- (optionally) one or more processors 1150 coupled to the sensors, the wearer inputs, a combination thereof, or otherwise.

The mirrors 1120 can be coupled to the processors 1150. The processors 1150 can control the angle at which the mirrors 1120 are positioned, and where applicable, can electronically control a focal length of the mirrors 1120. The processors 1150 can determine an angle and distance at which the wearer is looking, such as by using the sensors 1130 to determine a gaze direction and/or focal length of the wearer's eye. The processors 1150 can adjust the angle and focal length of the mirrors 1120 in response thereto. This can have the effect that the wearer can see behind themselves, to the side, or otherwise, using the mirrors 1120.

For example, the mirrors 1120 can be disposed so as to provide a continuous image to the wearer that collectively shows a central vision region and a peripheral vision region. For another example, the mirrors 1120 can be disposed so as to provide a continuous image to the wearer that collectively shows a forward-looking view and a rearward-looking view. This can have the effect that the wearer's eye and brain can integrate the portions of the presentation by the lenses 1110 and the mirrors 1120 so as to present a full image to the wearer, without any disjoint breaks at edges of the lenses 1110 or at disjoint regions therein.

The wearer can also use the lenses 1110 and the mirrors 1120 to view a peripheral vision region of their field of view, using a central vision region of their retina. This can have the effect that the wearer can have as clear vision of the peripheral vision region of their field of view as they have of the central vision region of their field of view.

FIG. 12—Dynamic Adjustment of 3D Presentation

FIG. 12 shows a conceptual drawing of an example eyewear used to provide dynamic adjustment with respect to three-dimensional (3D) viewing of a display.

An example eyewear 1200 can include one or more elements as shown in the figure, including at least
- one or more lenses 1210, such as lenses mounted on a frame, or such as contact lenses disposed for wearing by a user (not shown);
- one or more 3D presentation devices 1220 disposed to provide a 3D presentation, such as a 3D still image (not shown) or a 3D moving image (not shown);
- one or more sensors 1230 disposed to determine a gaze direction and/or focal length of the wearer's eye with respect to the regions, the sensors being coupled to the magnifiers;
- one or more wearer inputs 1240 disposed to receive one or more input controls from the wearer, such as an eye gesture, a touch input, or otherwise;
- (optionally) one or more processors 1250 coupled to the sensors, the wearer inputs, a combination thereof, or otherwise.

As further described herein with respect to other and further embodiments, the 3D presentation devices 1220 can include one or more controllers with respect to the lenses 1210, so as to provide images to the wearer that collectively show a 3D presentation. As further described herein, the images can include portions of the 3D presentation at distinct depths of the wearer's field of view (FOV). This can have the effect that the wearer's eye and brain can integrate the portions of the 3D presentation so as to present a 3D image (still or moving) to the wearer.

For example, one or more 3D images (such as a 3D still image, a 3D moving image, or a combination thereof) can be presented with respect to a display. The display can include one or more of
- a smartphone or another mobile device display, a phablet or tablet display;
- a wearable or implantable device display;
- a computer display, an internet browser display;
- a gaming device display;
- a television display or another video display;
- a head-up display (HUD), a billboard display, a movie theater display, a window or other see-through display;
- a biomedical display or another telemedicine display;
- a computer-aided design (CAD) display, a modeling or presentation display, or another multi-viewer display;
- or otherwise.

In such cases, a 3D still image or a 3D moving image can be presented with respect to a smartphone or another mobile device display, such as might be presented with respect to a game "app" executing on the smartphone or mobile device, or such as might be presented with respect to an 3D video call using the smartphone or mobile device.

Alternatively, a 3D still image or a 3D moving image can be presented with respect to a gaming device display, a computer device, or a related type of display, such as might be presented with respect to a game being played by one player, or between or among more than one player, or such as might be presented with respect to a game being played using the internet or another long-distance communication link.

Alternatively, a 3D still image or a 3D moving image can be presented with respect to a 3D presentation being made to an audience, such as might occur with respect to a live-action show, a movie theater, a news event, a sports activity (in which an individual player's action can be focused-upon and presented to the audience), or otherwise. Similarly, a 3D presentation can be made to a class of students, or another audience.

Alternatively, a 3D still image or a 3D moving image can be presented with respect to a telemedicine activity or another relatively long-distance expert activity. For example, an expert can provide oversight to a student or another individual performing an activity under the aegis of an expert who is unable to attend physically, or for whom personal attendance is infeasible.

When the display is disposed to provide a 3D presentation and the wearer alters their gaze from/to the display, the eyewear can turn on/off a 3D presentation in response thereto. For example, when the eyewear is disposed to provide a 3D presentation at the display and the wearer moves their gaze from the display, the eyewear can turn off its 3D presentation and allow the wearer to see their normal field of view (FOV) without any 3D adjustment. When the wearer moves their gaze to the display, the eyewear can turn on its 3D presentation and allow the wearer to see the display using 3D viewing.

As further described herein with respect to other and further embodiments, the 3D presentation devices 1220 can provide the portions of the 3D presentation using one or more of
- time-division multiplexing, in which the distinct portions are interlaced with respect to time;
- color-division multiplexing, in which the distinct portions are distinguished by a color (such as red/blue);
- spatial-division multiplexing, in which the distinct portions are distinguished by a spatial offset or an angle at which they are presented;
- lens-division multiplexing, in which the distinct portions are distinguished by which one of the lenses 1210 (or interlaced pixels or regions of the lenses) at which they are presented;
- or otherwise.

As further described herein with respect to other and further embodiments, the eyewear can determine, in response to the wearer's gaze direction and/or focal length, or in response to an input by the wearer, or in response to a predictive measure in response to circumstances from which a statistical inference can be drawn, or otherwise, whether the wearer is directing their gaze to a display. When the eyewear is disposed to provide a 3D image with respect to the display, the eyewear can determine when the wearer adjusts their gaze to/from the display. When the wearer adjusts their gaze to/from the display, the eyewear can adjust whether it provides a 3D image, or alternatively, whether it allows normal sight of the wearer's normal field of vision (FOV) without providing a 3D image. This can have the effect that the wearer can view the 3D image at the display without suffering blur when looking away from the display.

Method of Adapting to Changes in Light/Dark Viewing

The eyewear and systems described herein can provide a method of adapting to changes in light/dark viewing, such as by adjusting shading/inverse-shading to activate (or maintain activated) the wearer's rods in their retina. This can be relevant when, for example, the wearer of eyewear described herein transitions from a bright to a dark viewing environment, such as when exiting a bright police car into a dark nighttime environment, or such as when entering a bright indoor location from a dark night-time environment;

the wearer of eyewear described herein transitions from a dark to a bright viewing environment, such as when driving or flying from a dark night-time environment to a bright daytime environment.

In such cases, the wearer's rods (which can provide detailed viewing in a dark viewing environment) de-activate relatively quickly and re-activate relatively slowly. The eyewear can be disposed to determine when the wearer is about to transition from a dark to a bright viewing environment; in such cases, the eyewear can shade the bright viewing environment so as to prevent the wearer from losing the activation of their rods (losing their "night vision"). If the bright viewing environment is expected to last substantial time, the eyewear can allow the shading effect to fade, so as to activate the wearer's cones in their retina (gaining "color vision"). This can have the effect that relatively brief exposure to bright light does not cause the wearer to lose their night vision, a phenomenon sometimes called "night blindness".

The eyewear can also be disposed to determine when the wearer is about to transition from a bright to a dark viewing environment; in such cases, the eyewear can shade the bright viewing environment for a relatively long time, so as to allow the wearer's rods to activate (thus, providing the wearer with "night vision"). This can be particularly effective when the wearer is driving a car or piloting an aircraft in the direction of sunset; when the sun is low on the horizon, it can shine directly in the wearer's eyes, degrading the wearer's night vision at a time when it is about to be most needed.

Method of Protecting Eyesight from Changes in Light/Dark Environments

Example ambient luminance cases. The eyewear and systems described herein can provide a method of protecting the wearer's eyesight from changes in relative light/dark environments, such as by adjusting shading/in-verse-shading to prevent excessive ambient luminance from penetrating to the wearer's retina. This can be relevant when, for example, the wearer of eyewear described herein is subject to a sudden increase in ambient luminance, such as when transitioning from a relatively dark ambient environment to a relatively bright ambient environment;

the wearer of eyewear described herein is subject to a sudden increase in ambient luminance, such as when the wearer receives sudden glare or other bright light directed at their eye(s);

the wearer of eyewear described herein is subject to a sudden increase in background luminance, such as when the wearer is tracking a moving object that moves in front of a bright light source, such as a floodlight or the sun;

the wearer of eyewear described herein is subject to a sudden increase in sensitivity to ambient luminance, such as when the wearer has recently been the subject of a medical procedure that has the effect of causing the eyes to become more light-sensitive;

the wearer of eyewear described herein is subject to a sudden increase in ambient luminance, in which the change in ambient luminance is too fast for the wearer's eyes to react;

the wearer of eyewear described herein is subject to a sudden increase in ambient luminance, such as when using a "night vision" device or another type of device that amplifies luminance;

the wearer of eyewear described herein is subject to an increase in ambient luminance with respect to only one of two eyes, such as when the wearer attempts to keep track of multiple objects, one of which has a bright background and one of which does not;

the wearer of eyewear described herein is subject to an increase in ambient luminance with respect to only a subset of colors, such as when the wearer is subject to an increase in ambient luminance with respect to only blue or ultraviolet, only green, or only red or infrared;

the wearer of eyewear described herein is subject to a short pulse, or multiple short pulses, of change in ambient luminance, such as a sequence of short pulses of greatly increased ambient luminance.

In one embodiment, the eyewear and systems described herein can include an ambient luminance sensor, as further described herein, that can determine an amount of ambient luminance to which the wearer's eye is subject. For example, the ambient luminance sensor can be coupled to a computing device, which can control a shading element so as to protect the wearer's eye against excessive ambient luminance. The computing device can compare the amount of ambient luminance against a threshold value and can determine whether to provide shading in response to that comparison.

For example, this process can be useful when the wearer is subject to a sudden increase in ambient luminance, such as when transitioning from a relatively dark ambient environment to a relatively bright ambient environment. In such cases, the transition can trigger the computing device to provide a different amount of shading, so as to prevent the wearer from being temporarily blinded or subject to eye pain by the newly-bright ambient environment.

For another example, this process can be useful when the wearer is subject to a sudden increase in ambient luminance, such as when the wearer receives sudden glare or other bright light directed at their eye(s). The sudden glare can be from a "flashbang" grenade, as further described herein, from a reflection of a floodlight or the sun from a reflective surface, as further described herein, from revealing a bright background light such as a floodlight or the sun, as further described herein, or otherwise. This can occur when a shiny object moves so as to cause a reflection of light into the wearer's eyes, or when a cloud moves away from the sun to reveal bright light. The sudden glare can also result from the wearer tracking a moving object that moves in front of a bright light source, such as a floodlight or the sun, as further described herein. This can occur when the wearer is involved in a sport, such as a baseball player who is tracking a ball with a floodlight or the sun as background.

For another example, this process can be useful when the wearer is subject to a sudden increase in sensitivity to ambient luminance, such as when the wearer has recently been the subject of a medical procedure that has the effect of causing the eyes to become more light-sensitive. Examples of such medical procedures can include (A) cataract surgery, (B) surgery with respect to de-tachment of the retina, (C) eye dilation from an optometrist visit, or otherwise. This can occur when the wearer has had their eyes dilated at an optometrist visit and becomes very sensitive to sunlight or other bright light.

For another example, this process can be useful when the wearer is subject to a sudden increase in ambient luminance, in which the change in ambient luminance is too fast for the wearer's eyes to react. In such cases, the wearer's eyes can generally only reach with respect to a turn-off or turn-on time for the wearer's cone or rod cells, while the eyewear can react electronically. Similarly, the wearer's eyes can generally only react within about 300-500 milliseconds, while the eyewear can react electronically within about 5-50 milliseconds. Thus, the eyewear can react sufficiently fast that bright light, glare, or other debilitating visual input, can be shaded by the eyewear against damage or pain to the wearer.

For another example, this process can be useful when the wearer is using a "night vision" device or another type of device that amplifies luminance, and there is a sudden increase in ambient luminance. In such cases, the device that amplifies luminance can make the error of rapidly increasing luminance as viewed by the wearer, with the possible effects of (A) making it difficult for the wearer to see, (B) debilitating the wearer's night vision, or otherwise. For example, when using a "night vision" device, the wearer might be subject to adverse effects when their target shines a light in their direction; in such cases, it can be useful for the eyewear to rapidly shade the wearer against that light. Moreover, in such cases, the shading element can be disposed between the wearer's eye and the "night vision" device itself.

For another example, this process can be useful when the wearer is subject to an increase in ambient luminance with respect to only one of two eyes. This can occur when the wearer is involved in a sport, such as a baseball player who is (with one eye) tracking a ball with a floodlight or the sun as background, and who is (with another eye) concurrently tracking another player who is moving. In such cases, the wearer's view of the ball might need to be shaded, while the wearer's view of the other player might not need to be shaded.

For another example, this process can be useful when the increase in ambient luminance is only with respect to a particular set of frequency, such as a particular range of colors (e.g., blue/ultraviolet, green, red/infrared, or otherwise). In such cases, the eyewear can shade only with respect to the color(s) for which there is a substantial increase in luminance; thus, the eyewear can restrict its shading to only those color(s). For example, when the increase in ambient luminance is only with respect to blue, the eyewear can shade only blue light, thus reducing the amount of blue light injected into the wearer's eyes.

For another example, this process can be useful when the increase in ambient luminance is only applied for a very short time duration, such as a short pulse, or multiple short pulses, of change in ambient luminance. For example, the wearer can be subject to a sequence of short pulses of greatly increased ambient luminance. Without shading, this can have a deleterious effect on the wearer's visual acuity or other visual capabilities; with shading, the wearer can be protected against this effect.

Multiple ambient luminance thresholds. For example, the computing device can maintain two independent ambient luminance threshold values, such as $\theta_1$ and $\theta_2$, at which an amount of shading is altered, such as to provide shading or to remove shading. Similarly, the computing device can maintain two independent amounts of shading, such as $\sigma_1$ and $\sigma_2$, which represent amounts of shading that are provided (or removed).

For example, without loss of generality, $\theta_1 > \theta_2$ and $\sigma_1 > \sigma_2$. The threshold amounts $\theta_1$ and $\theta_2$ can be separated by an amount of ambient luminance sufficiently large that the wearer would otherwise recognize the difference. Similarly, without loss of generality, $\sigma_1$ and $\sigma_2$ can be separated by an amount of shading sufficiently large that the wearer would otherwise recognize the difference.

In such cases, when the amount of ambient luminance becomes more than $\theta_1$, the computing device can increase the amount of shading to $\sigma_1$, so as to reduce the amount of luminance reaching the wearer's eyes to a limit that does not impair the wearer's sight even temporarily. The amount of shading can then be maintained at $\sigma_1$, so as to provide the wearer with a relatively stable viewing environment, at least until the amount of ambient luminance is significantly re-duced. When the amount of ambient luminance later becomes less than $\theta_2$, the computing device can decrease the amount of shading to $\sigma_2$, so as to increase the amount of luminance reaching the wearer's eyes, again so that the wearer's sight is not impaired even temporarily. This can effectively provide a hysteresis loop, refraining from unnecessary changes in shading, so as to provide that the amount of shading can be dependent not only on the amount of ambient luminance, but also on the recent history of the amount of ambient luminance.

In one embodiment, the computing device can maintain a third independent ambient luminance threshold value, such as $\theta_3$, at which an amount of shading is altered, such as to provide shading or to remove shading. Similarly, the computing device can maintain a third independent amounts of shading, such as $\sigma_3$, which represents an amount of shading that is provided (or removed).

For example, without loss of generality, $\theta_1 > \theta_3 > \theta_2$ and $\sigma_1 > \sigma_3 > \sigma_2$. As further described herein with respect to the pair of threshold values $\theta_1$ and $\theta_2$, the pair of threshold values $\theta_1$ and $\theta_3$, and the pair of threshold values $\theta_3$ and $\theta_2$, can be separated by an amount of ambient luminance sufficiently large that the wearer would otherwise recognize the difference. Similarly, without loss of generality, the pair of shading values $\sigma_1$ and $\sigma_3$, and the pair of shading values $\sigma_3$ and $\sigma_2$, can be separated by an amount of shading sufficiently large that the wearer would otherwise recognize the difference.

In such cases, when the amount of ambient luminance becomes more than the intermediate value $\theta_3$, the computing device can increase the amount of shading to the intermediate value $\sigma_3$. Thereafter, when the amount of ambient luminance increases to more than $\theta_1$, the computing device can increase the amount of shading to $\sigma_1$, or when the amount of ambient luminance decreases to less than $\theta_2$, the computing device can decrease the amount of shading to $\sigma_2$. With three or more such values $\theta_i$ and $\sigma_j$, the amount of shading can be maintained so as to provide a relatively stable viewing environment, at least until the amount of ambient luminance changes significantly, while also continuously adjusting the amount of shading so that the wearer's sight is not impaired even temporarily. This can effectively provide a sequence of hysteresis loops, so as to make only necessary changes in shading and to otherwise maintain a relative constant amount of shading for only small changes in the amount of ambient luminance.

In one embodiment, the first and the second ambient luminance thresholds can be set to optimize an amount of visual acuity by the wearer's eye. For example, the wearer's color sensitivity, the wearer's contrast sensitivity, the wearer's night vision, or the wearer's vision sensitivity, can be optimized. Thus, the amount of shading applied to the ambient light can be set so as to allow the wearer the best possible visual acuity, for example, by providing the best possible contrast between a targeted object and a background, between a targeted object and another object, or otherwise.

In one embodiment, the amount of ambient luminance can be determined for the viewing environment separately with respect to each eye. Thus, the amount of shading applied to the ambient light can be set separately with respect to each eye, so as to allow the wearer (for example) to pay attention to different target objects with each eye. Similarly, this technique can provide a hysteresis loop of shading, separately with respect to each eye, between the first and second ambient luminance threshold, or between any adjacent pair of ambient luminance thresholds.

Combination of Functions

In one embodiment, the eyewear can combine two or more such functions, such as in response to an input from the wearer designating that those functions should be combined, or such as in response to the eyewear recognizing a circumstance in which the wearer typically requests that those functions should be combined. For example, the wearer can designate that those functions should be combined using an eye gesture or other input. For another example, the eyewear can recognize a circumstance in which the wearer typically requests that those functions should be combined in response to a machine learning technique, such as a statistical response to sensory parameters, wearer parameters, environmental parameters, or otherwise. In such cases, the sensory parameters or wearer parameters can include information with respect to the wearer's medical or other status; the environmental parameters or can include information with respect to the scene in the wearer's field of view (FOV). The eyewear can also be responsive to other information, or to a combination of factors, such as the eyewear being more/less sensitive to selected parameters (or to particular wearer inputs) when sensory parameters or wearer parameters indicate particular medical or other status, or otherwise.

ALTERNATIVE EMBODIMENTS

While this Application primarily describes a systems and techniques that relate to dynamic adjustment of eyewear, including at least one or more of:
dynamically adjusting the eyewear in response to wearer commands, such as when the wearer recognizes that a change in eyewear parameters is desirable;
dynamically adjusting the eyewear in response to commands from an over-seer or other party, such as when other party recognizes that the wearer is undergoing a medical or other sensory condition;
dynamically adjusting the eyewear in response to one or more other eyewear devices, such as when multiple wearers are cooperating to each identify information available to any one of them; or otherwise;
dynamically adjusting the eyewear in response to one or more personalization parameters;
dynamically adjusting the eyewear in response to one or more hybrids of environmental factors or wearer commands.

After reading this Application, those skilled in the art will recognize that the techniques described herein are applicable to a wide variety of different types of eyewear and substitutes for eyewear; to a wide variety of facts about the wearer and their eyewear, and any relationship to their environment; to a wide variety of different ways in which the eyewear could be dynamically adjusted; to a wide variety of other devices that could be used with the eyewear, or ways in which the eyewear could be used; or otherwise.

This Application describes a preferred embodiment with preferred process steps and, where applicable, preferred data structures. After reading this Application, those skilled in the art would recognize that, where any calculation or computation is appropriate, embodiments of the description can be imple-mented using general purpose computing devices or switching processors, special purpose computing devices or switching processors, other circuits adapted to particular process steps and data structures described herein, or combinations or conjunctions thereof, and that implementation of the process steps and data structures described herein would not require undue experimentation or further invention.

The claims are incorporated into the specification as if fully set forth herein.

The invention claimed is:
1. Eyewear including
a color-alterable element, the color-alterable element including one or more of: a frame or a lens;
the color-alterable element being disposed to change color in response to one or more of:
when the eyewear is transferred to the wearer,
an input from the wearer,
the wearer's eye color, hair color, or skin tone,
a medical condition of the wearer,
a clothing item worn by the wearer,
an ambient environment,
a color-alterable element of an external device, or
a signal to or from an external device;
wherein the ambient environment includes a local lighting condition;
wherein the color-alterable element is disposed to change color in response to one or more of
a measure of ambient light, wherein the measure of ambient light includes a comparison of a scene available within the wearer's field of view with one or more of: natural sunlight, indoor lighting, infrared or ultraviolet, a lighting at a selected time of day, a measure of a time of day in response to lighting, a measure of a seasonal time of year in response to lighting, or
an observation of luminosity, an observation of color, an observation of glare, or an observation of infrared or ultraviolet light;
or whether the local lighting condition includes one or more of: indoor or outdoor lighting, or nighttime or daytime.
2. Eyewear including
a color-alterable element, the color-alterable element including one or more of: a frame or a lens;
wherein the color-alterable element is disposed to provide a visible color change;

wherein the lens includes only that portion of a lens outside of those portions capable of being within the wearer's gaze direction.

3. Eyewear as in claim 2, wherein the portion of the lens disposed to change color includes only a portion covering only the wearer's iris or sclera.

4. Eyewear as in claim 2, wherein the color-alterable element is disposed to change color when the eyewear is transferred to the wearer, in response to one or more of: an initial sale or rental to the wearer, or a capability or setting associated with the eyewear.

5. Eyewear as in claim 4, wherein the capability or setting is associated with a selected type of display to be viewed by the wearer in response to a plurality of displays that are concurrently presented.

6. Eyewear as in claim 2, wherein the color-alterable element is disposed to change color in response to a medical condition of the wearer, to identify that condition to an observer.

7. Eyewear as in claim 6, wherein at least one observer includes one or more of:
the wearer, so as to inform the wearer of the medical condition;
an observer other than the wearer, so as to prompt the observer inform the wearer of the medical condition; or
a device disposed to communicate with one or more of: an emergency responder, or medical personnel, in response to the color-alterable element.

8. Eyewear as in claim 6, wherein the medical condition includes one or more of:
a need for medical assistance; an allergic reaction or anaphylaxis; a seizure or epileptic effect; a heatstroke or dehydration effect; or an overdose of alcohol, a drug, or another type of poisoning, or being under the influence of alcohol or another substance.

9. Eyewear as in claim 1, wherein the color-alterable element is disposed to change color in response to one or more of: a mood, or an emotional condition, of the wearer.

10. Eyewear as in claim 1, wherein the condition of the ambient environment includes one or more of: an ambient temperature, an atmospheric condition, a presence or absence of an allergen, a presence or absence of a pollutant, an amount of smoke or soot or other airborne poisons, a measure of air quality, a presence or absence of absorbable/inhalable hazards, a presence of hazardous biological/chemical substances, a presence of an ambient drug hazard, or a presence of a pathogen.

11. Eyewear as in claim 2, wherein the color-alterable element is disposed to change color to make the eyewear brighter or dimmer, in response to the measure of ambient light.

12. Eyewear as in claim 2, wherein the color-alterable element is disposed to change color to make the eyewear match an external device.

13. Eyewear as in claim 12, wherein the external device includes an eyewear worn by a different person.

14. Eyewear as in claim 12, wherein the external device includes an accessory.

15. Eyewear as in claim 2, wherein the color-alterable element is disposed to change color to make the eyewear brighter or dimmer, in response to the measure of ambient light.

16. Eyewear as in claim 2, wherein the color-alterable element is disposed to make the wearer more visible or less visible, using one or more of: a color change, a time-altering pattern.

17. Eyewear as in claim 2, wherein the color-alterable element includes the frame disposed with one or more of: an LCD material, an LED material, an OLED material, a PLED material, a phosphorescent material, or a material responsive to an electromagnetic signal or an electronic signal deposited thereon.

18. Eyewear as in claim 2, wherein the change of color includes a change in one or more of: hue, color pattern.

19. Eyewear including
a color-alterable element, at least a portion of which is disposed to change color in response to one or more of:
an input from the wearer,
the wearer's eye color, hair color, or skin tone,
a clothing item worn by the wearer;
wherein the color-alterable element consists of a portion of the eyewear not visible from the wearer's pupil while the eyewear is in use by the wearer.

20. Eyewear as in claim 19, wherein the color-alterable element includes one or more of: a frame, an earpiece, or an attachment to a frame or earpiece,
the color-alterable element is disposed on a substantially opaque portion of the eyewear.

* * * * *